US012659464B2

(12) United States Patent
Laroche et al.

(10) Patent No.: US 12,659,464 B2
(45) Date of Patent: Jun. 16, 2026

(54) VIDEO CODING AND DECODING INVOLVING MODIFYING LIST OF PREDICTORS

(71) Applicant: CANON KABUSHIKI KAISHA, Tokyo (JP)

(72) Inventors: Guillaume Laroche, Saint Aubin d'Aubigné (FR); Patrice Onno, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/855,183

(22) PCT Filed: Apr. 11, 2023

(86) PCT No.: PCT/EP2023/059427
§ 371 (c)(1),
(2) Date: Oct. 8, 2024

(87) PCT Pub. No.: WO2023/198699
PCT Pub. Date: Oct. 19, 2023

(65) Prior Publication Data
US 2025/0254290 A1 Aug. 7, 2025

(30) Foreign Application Priority Data

Apr. 11, 2022 (GB) ...................................... 2205319
Jun. 9, 2022 (GB) ...................................... 2208470

(51) Int. Cl.
*H04N 19/107* (2014.01)
*H04N 19/137* (2014.01)
*H04N 19/70* (2014.01)

(52) U.S. Cl.
CPC ......... *H04N 19/107* (2014.11); *H04N 19/137* (2014.11); *H04N 19/70* (2014.11)

(58) Field of Classification Search
CPC .... H04N 19/107; H04N 19/137; H04N 19/70; H04N 19/176; H04N 19/46; H04N 19/51; H04N 19/105
See application file for complete search history.

(56) References Cited

U.S. PATENT DOCUMENTS

2017/0041616 A1 2/2017 Ramamurthy
2020/0053361 A1 2/2020 Robert
(Continued)

FOREIGN PATENT DOCUMENTS

EP 3496406 A1 6/2019
EP 4399876 A1 7/2024
(Continued)

OTHER PUBLICATIONS

Moonmo Koo, et al., Description of SDR video coding technology proposal by LG Electronics, Joint Video Experts Team (JVET) of ITU-T SG 16 WP 3 and ISO/IEC JTC 1/SC 29/WG 11, 10th Meeting, Apr. 2018, Doc. No. JVET-J0017-v1, XP30151177.
(Continued)

*Primary Examiner* — Francis Geroleo
(74) *Attorney, Agent, or Firm* — Canon U.S.A., Inc. IP Division

(57) ABSTRACT

Improvements to the processing of predictors is disclosed. A list of predictors is obtained, the list of predictors having at least two predictors. It is determined whether to modify the list of predictors based on a criterion using a first cost related to a first predictor in the list and a second cost related to a second predictor in the list. The list of predictors is modified based on the determination. The criterion is based on a threshold value.

18 Claims, 38 Drawing Sheets

(56) References Cited

U.S. PATENT DOCUMENTS

| 2020/0068218 A1* | 2/2020 | Chen | H04N 19/82 |
|---|---|---|---|
| 2021/0037238 A1 | 2/2021 | Park | |
| 2023/0217013 A1* | 7/2023 | Nien | H04N 19/593 |
| | | | 375/240.12 |
| 2024/0364904 A1* | 10/2024 | Kang | H04N 19/44 |
| 2025/0247547 A1* | 7/2025 | Kim | H04N 19/119 |

FOREIGN PATENT DOCUMENTS

| WO | 2007020569 A2 | 2/2007 |
|---|---|---|
| WO | 2018205914 A1 | 11/2018 |
| WO | 2019201264 A1 | 10/2019 |

OTHER PUBLICATIONS

Guillaume Laroche, et al., EE2-2.5: ARMC improvements, Joint Video Experts Team (JVET) of ITU-T SG 16 WP 3 and ISO/IEC JTC 1/SC 29, 27th Meeting, Jul. 2022, Doc. No. JVET-AA0092-v1, XP30302870.
Muhammed Coban, Algorithm description of Enhanced Compression Model 7 (ECM 7), Joint Video Experts Team (JVET) of ITU-T SG 16 WP 3 and ISO/IEC JTC 1/SC 29, 28th Meeting, Oct. 2022, Doc. No. JVET-AB2025, XP30306363.
Guillaume Laroche, et al., On ARMC improvements, Joint Video Experts Team (JVET) of ITU-T SG 16 WP 3 and ISO/IEC JTC 1/SC 29, 26th Meeting, Apr. 2022, Doc. No. JVET-Z0103-v1.

* cited by examiner

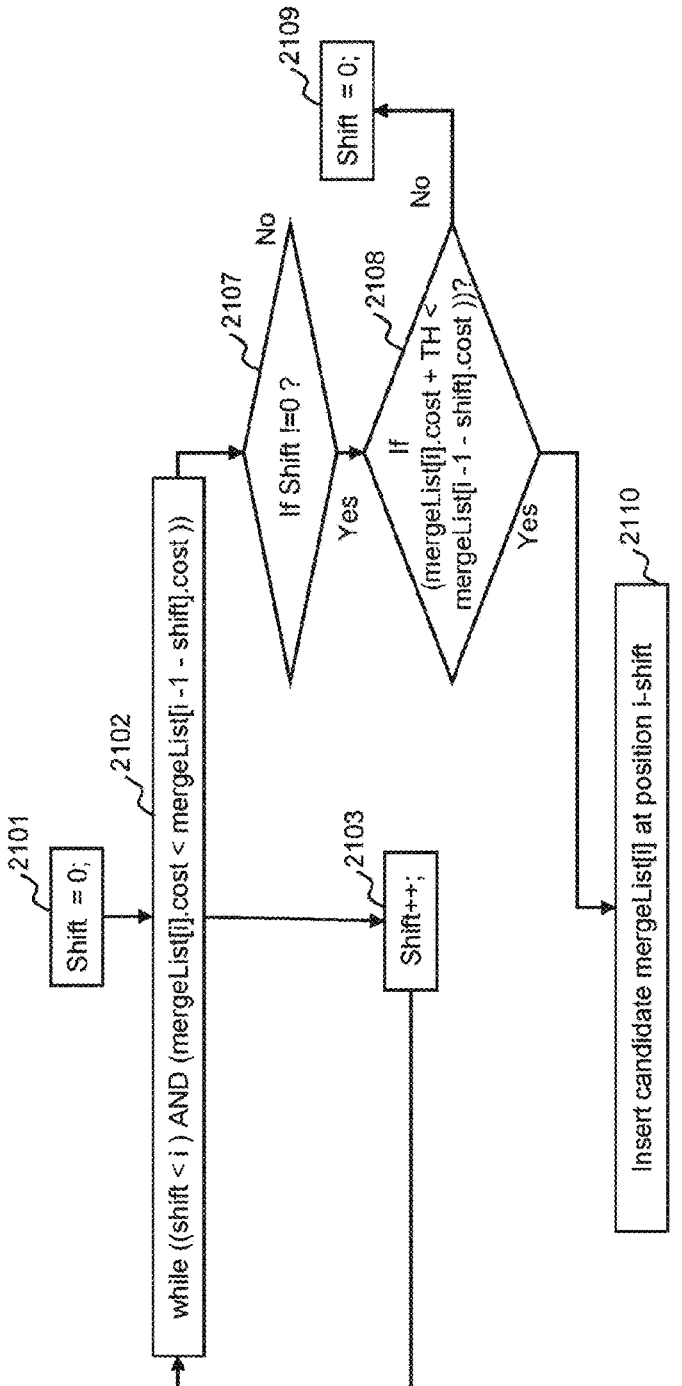
Figure 21

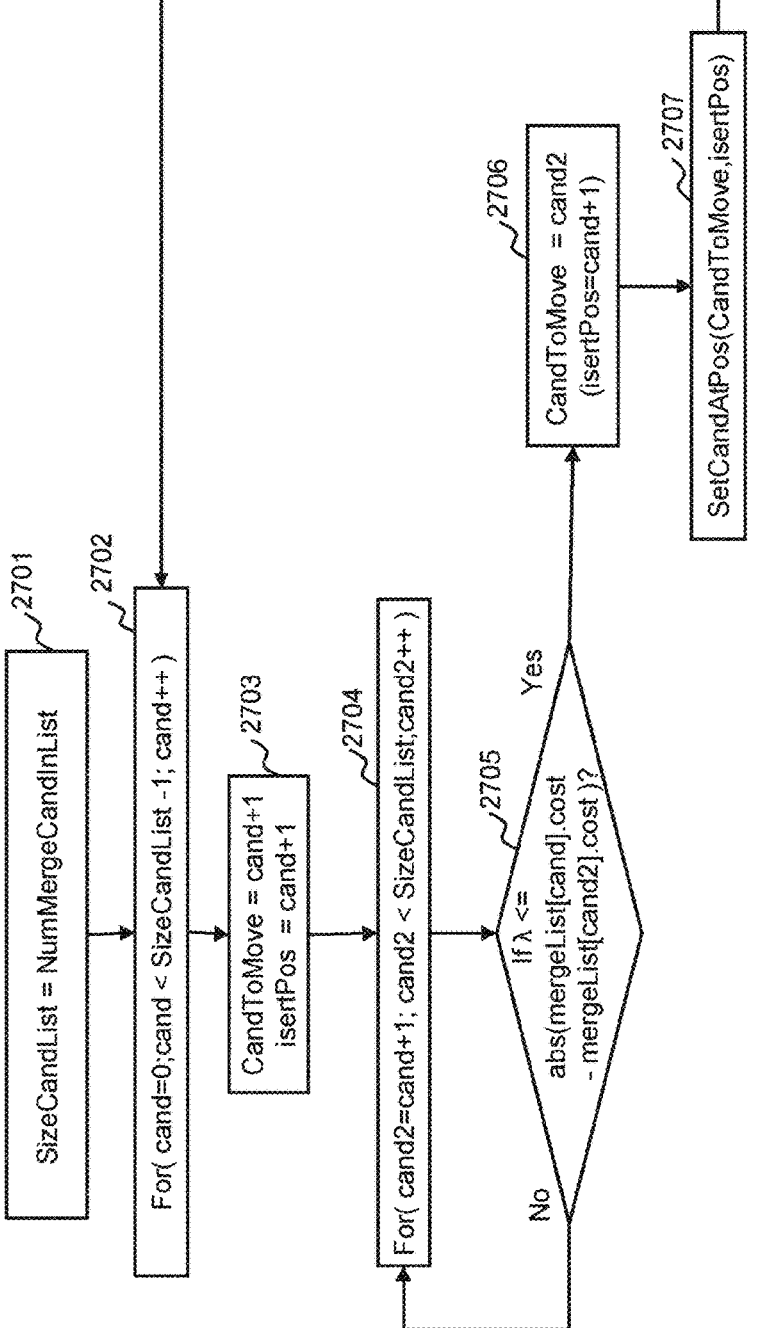
SizeCandList = NumMergeCandInList          2701
For( cand=0;cand < SizeCandList -1; cand++ )          2702
CandToMove = cand+1
isertPos = cand+1          2703
For( cand2=cand+1; cand2 < SizeCandList;cand2++ )          2704
If λ <=
abs(mergeList[cand].cost
- mergeList[cand2].cost )?          2705
Yes
No
CandToMove = cand2
(isertPos=cand+1)          2706
SetCandAtPos(CandToMove,isertPos)          2707
Figure 27

Step 1

| Absolute costs difference |
| --- |
| mergeList[0].cost = 2264 | |
| mergeList[1].cost = 2272 | 8 |
| mergeList[2].cost = 2282 | 10 |
| mergeList[3].cost = 2366 | 84 |
| mergeList[4].cost = 2371 | 5 |
| mergeList[5].cost = 2750 | 379 |

Step 2

| Absolute costs difference |
| --- |
| mergeList[0].cost = 2264 | |
| mergeList[1].cost = 2272 | 8 |
| mergeList[2].cost = 2282 | 10 |
| mergeList[3].cost = 2366 | 84 |
| mergeList[4].cost = 2750 | 384 |
| mergeList[5].cost = 2371 | |

Step 3

| Absolute costs difference |
| --- |
| mergeList[0].cost = 2264 | |
| mergeList[1].cost = 2282 | 18 |
| mergeList[2].cost = 2366 | 84 |
| mergeList[3].cost = 2750 | 384 |
| mergeList[4].cost = 2272 | |
| mergeList[5].cost = 2371 | |

Figure 29

STMVP
Aff1
Aff2
Aff3
Aff4
Aff5
Aff6
Aff7
Aff8
Aff9
Aff10
Aff11
Aff12
Aff13
Aff14

ARMC

NewCand0 = STMVP
NewCand1 = Aff11
NewCand2 = Aff4
NewCand3 = Aff3
NewCand4 = Aff2
NewCand5 = Aff12
NewCand6 = Aff10
NewCand7 = Aff13
NewCand8 = Aff6
NewCand9 = Aff7
NewCand10 = Aff1
NewCand11 = Aff5
NewCand12 = Aff8
NewCand13 = Aff9
NewCand14 = Aff14

VIDEO CODING AND DECODING INVOLVING MODIFYING LIST OF PREDICTORS

CROSS REFERENCE TO RELATED APPLICATION

This application is the National Phase application of PCT Application No. PCT/EP2023/059427, filed on Apr. 11, 2023 and titled "DATA CODING AND DECODING". This application claims the benefit under 35 U.S.C. § 119(a)-(d) of United Kingdom Patent Application No. 2205319.3, filed on Apr. 11, 2022 and titled "DATA CODING AND DECODING", and United Kingdom Patent Application No. 2208470.1, filed on Jun. 9, 2022 and titled "DATA CODING AND DECODING". Each of the above cited patent applications are incorporated herein by reference in its entirety.

FIELD OF INVENTION

The present invention relates to coding and decoding of predictors.

BACKGROUND

The Joint Video Experts Team (JVET), a collaborative team formed by MPEG and ITU-T Study Group 16's VCEG, released a new video coding standard referred to as Versatile Video Coding (VVC). The goal of VVC is to provide significant improvements in compression performance over the existing HEVC standard (i.e., typically twice as much as before). The main target applications and services include—but not limited to—360-degree and high-dynamic-range (HDR) videos. Particular effectiveness was shown on ultra-high definition (UHD) video test material. Thus, we may expect compression efficiency gains well-beyond the targeted 50% for the final standard.

Since the end of the standardisation of VVC v1, JVET has launched an exploration phase by establishing an exploration software (ECM). It gathers additional tools and improvements of existing tools on top of the VVC standard to target better coding efficiency.

Amongst other modifications, compared to HEVC, VVC has a modified set of 'merge modes' for motion vector prediction which achieves greater coding efficiency at a cost of greater complexity. Motion vector prediction is enabled by deriving a list of 'motion vector predictor candidates' with the index of the selected candidate being signalled in the bitstream. The merge candidate list is generated for each coding unit (CU). But CUs may be split into smaller blocks for Decoder-side Motion Vector Refinement (DMVR) or other methods.

The make-up and order of this list can have significant impact on coding efficiency as an accurate motion vector predictor reduces the size of the residual or the distortion of the block predictor, and having such a candidate at the top of the list reduces the number of bits required to signal the selected candidate. The present invention aims to improve at least one of these aspects.

Modifications incorporated into VVC v1 and ECM mean there can be up to 10 motion vector predictor candidates; this enables a diversity of candidates, but the bitrate can increase if candidates lower down the list are selected. The present invention broadly relates to improvements to the derivation and ordering of one or more 'pairwise' motion vector predictor candidates in the list of motion vector predictor candidates. A 'pairwise' motion vector predictor candidate is a candidate which is combined or averaged from two or more other candidates in the list of candidates.

SUMMARY OF INVENTION

The present invention relates to an improvement to the processing of lists of predictors (or predictor candidates), which leads to an improved ordering of the predictors that provides coding efficiency at the cost of some increased complexity. For example, the present methods try to prevent redundant candidates which have similar costs being adjacent in a list of candidates by comparing the candidate costs with each other. In embodiments a balance is struck between the amount of reorderings of candidates versus the potential gains in cost diversity of the resulting list to which the processing according to the invention is applied. The present invention may be applied in particular, but not exclusively, to predictors (or predictor candidates) for motion prediction of image portions in image or video coding. However, the invention has broad applicability to any coding when one data unit or item of data may be predicted from another and lists of candidate predictors are generated for that purpose. For example, it is envisaged that the invention may have applicability to at least point cloud data, mesh data and audio data in additional to still and video image data.

According to an aspect of the invention, there is provided a method of processing predictors, the method comprising: obtaining a list of predictors, the list of predictors having at least two predictors; determining whether to modify the list of predictors based on a criterion using a first cost related to a first predictor in the list and a second cost related to a second predictor in the list; modifying (or not) the list of predictors based on the determination, wherein the criterion is based on a threshold value. The first and second predictors may be adjacent predictors in the list (in other words, one follows the other). The predictors may be candidates. For example, motion information predictor candidates for an inter mode such as a Merge mode or block predictor candidates in an Intra mode.

The determination may comprise adding the threshold value to the first or second cost and the criterion relates to a comparison of the result with the one of the first cost and second cost to which the threshold value was not added.

The criterion may be whether the result of adding the threshold value to the first cost is less than the second cost.

The criterion may be whether a difference between the first cost and the second cost crosses the threshold value.

Optionally, the difference is calculated as an absolute value and the criterion is whether it is less than the threshold value.

Optionally, modifying the list comprises removing the first candidate or second candidate from the list of predictors.

Optionally, modifying the list comprises changing a position of one or more predictors in the list.

Optionally, changing the position of one or more candidates comprises moving the first predictor or second predictor to a different position in the list.

Changing the ordering may comprise moving the first predictor or second predictor to a position considered to be the end of the list.

Optionally, the first predictor and the second predictor are subsequent to a zeroth predictor at a position considered to be the beginning of the list. In some examples, the zeroth predictor may be excluded from the step of modifying the list of predictors (e.g. the zeroth predictor may be fixed in a position at the beginning of the list, regardless of the reordering of the other predictors in the list). In some examples, the method may further comprise a step of comparing a zeroth cost related to the zeroth predictor to a zeroth threshold, wherein the zeroth predictor is included in the step of modifying the list of predictors if the zeroth cost exceeds the zeroth threshold. The step of comparing a zeroth cost related to the zeroth predictor to a zeroth threshold may performed in a first set of modes, and not performed in a second set of modes. In other words, the inclusion of the zeroth predictor in the step of modifying the list of predictors may be mode dependent. In examples where the step of comparing a zeroth cost related to the zeroth predictor to a zeroth threshold is performed, the threshold may be inferior to the threshold used in respect of the first predictor and second predictor. In other examples, the thresholds may be the same.

In other examples, the first predictor may be at a position considered to be the beginning of the list. In such examples, the first cost may be set to zero. That is, regardless of the true, computed cost associated with the first predictor, the method may comprise the step of overwriting this value as a zero cost. Alternatively, the first cost may be set as zero without computing the cost at all.

Optionally, the first and second costs comprise a template matching cost based on neighbouring samples of an image portion to be encoded or decoded and neighbouring samples of an image portion associated with the predictor.

Optionally, the first and second costs comprise a difference between sample values of two block predictors associated with the predictor.

Optionally, the first and second costs comprise a difference between the samples associated with the predictor and at least one other predictor in the list.

Optionally, the first and second costs are based on a sub-set of neighboring samples or samples of the predictors Optionally, the first and second costs are based on samples corresponding to another image from a different resolution Optionally, the values of samples used to compute the first and second costs are pre-processed.

Optionally, the first and second costs are based on a coding rate.

Optionally, the first and second costs are based on a distortion cost. The distortion cost may be any one of a Sum of Absolute Difference (SAD), Sum of Absolute Transformed Differences (SATD), Sum of Square Errors (SSE) and a Structural Similarity Index Measure (SSIM).

The cost may be proportional to a proportional to a number of samples in a unit (image portion/prediction unit/unit of data to be predicted) being processed. The cost may be proportional to a number of samples in a template (for example, a template of neighbouring samples). The cost may be based on the samples used for determining a distortion cost and the block size.

Optionally, the method further comprises deriving the threshold value. Alternatively, or additionally, the method further comprises receiving information indicating the threshold value.

The threshold value may be based on a quantization parameter, QP, value. The threshold value may be based on a Picture Order Count, POC, distance or a temporal distance between a current frame and one or more other frames.

Alternatively, or additionally, the threshold value may be based on a temporal ID of a frame. Alternatively, or additionally, the threshold value may be based on a temporal direction of a reference frame. Alternatively, or additionally, the threshold value is based on whether bi-direction prediction is used or not for the block. The threshold value may depend on one or more QP values of available reference frames. The threshold value may depend on a type of distortion used as at least one of the first and second costs. The threshold value may be based on type of the samples used to compute a distortion as a measure of at least one of the first and second costs. The threshold value may be based on whether an Intra or Inter prediction used to encode or decode an image portion to be predicted using the list of predictors. The threshold value may be based on which of one or more of a Random-Access configuration, RA, a Low Delay configuration, and an Intra only configuration is used for encoding or decoding.

The threshold value may be based on a formula used for encoding and is obtained by a decoder to use to calculate the threshold value.

Additionally, or alternatively, the threshold value may be based on a shifted quantization parameter, QP, value. The shifted QP value may be used to determine a Lagrangian parameter, λ, as the threshold value. The shifted quantization parameter may be used to obtain the Lagrangian parameter (e.g. lambda) from a table, where entries in the table associate Lagrangian parameter (e.g. lambda) values with quantization parameter values.

Additionally, or alternatively, the threshold may be determined as a minimum cost difference as a difference between consecutive predictors in the list that are not the first predictor and second predictor.

Additionally, or alternatively, the threshold may be determined using the cost values of all candidates in the list or a first N candidates, wherein N is a maximum number of candidates permitted in the list.

Using the cost values may comprise calculating an average of differences of consecutive candidate costs from among the candidates used to determine the threshold.

The threshold value may be based on a Lagrangian parameter, λ, and the criterion is whether an absolute difference between first and second distortion costs is less than the Lagrangian parameter. For example, the threshold value may be the Lagrangian parameter multiplied by a rate difference between the first predictor and the second predictor.

Optionally, at least one of the first and second distortion costs is multiplied by the threshold.

Optionally, the criterion is applied after a first ordering process. The first ordering process may be based on an ordering of costs. The costs may be a template matching distortion cost.

Optionally, the threshold value is added to the result of the difference between the first and second distortion costs that result from the multiplication Optionally, the determination is made according to the criterion during a process of ordering candidates according to their distortion costs.

Optionally, the determination of whether to modify the list is based on a minimum distortion difference and a threshold. The maximum number of reorderings may be limited to a predefined number. For example, the maximum number of reorderings may be the maximum permitted number of candidates in the list.

Optionally, the determination is based on a minimum distortion difference and is limited to a maximum number of reorderings.

Optionally, modifying the list comprises only removing candidates. Optionally, the number of candidates after removal must greater than or equal to a maximum permitted number of candidates in the list. In an embodiment, the maximum number of candidates permitted in the list is decremented when the list is modified by moving a candidate.

Optionally, if the criterion is met the second predictor is moved to the first position at which a difference in costs with respect to a subsequent predictor in the list is higher than the threshold. If the maximum number of possible reorderings is greater than the maximum number of candidates permitted in a final list, the modifying may comprise limiting the position at which the first or second predictor is moved to the end of the current list. Optionally, said processing of the predictors is applied to at least one of a Regular Merge mode, a template matching Merge mode a block matching (BM) merge mode and an Intra Block Copy, IBC, mode.

In an embodiment, the second predictor immediately follows the first predictor (in the list) and if it is determined that the criterion is not met the second predictor is inserted after a subsequent predictor in the list. Optionally, if it is determined that the criterion is not met the criterion is applied to the second cost and the individual costs of previous candidates in the list, and, wherein if it is determined that the criterion is not met for the second cost and respective costs of previous candidates the insertion of the second predictor after the subsequent predictor is not made. The maximum possible number of reorderings may be set to a permitted number of candidates in a final list of processed candidates. Additionally, the processing of the predictors may be applied to at least one of a Merge with MVD, Affine Merge with MVD, a MVD sign prediction of motion vector residual.

The list of predictors may be a sub-list of predictors (combinable with another sub-list to form a final list, intermediate list or other sub-list), an intermediate list or a final list of predictors.

In an embodiment, when template matching is used and one of at least two templates is available the cost for all predictors (candidates) in the list may be calculated based on using a weighted cost of the available template as the cost for the unavailable template. For example, the weighting may be so that the cost is in proportion to the height and width of the missing template. The templates may be left or above templates.

In an embodiment, when template matching is used and one of at least two templates is available, the Lagrangian or lambda is modified in proportion to the missing template.

In an embodiment, the motion vector, MV threshold for derivation is the same for all merge predictor (candidate) types. Such an embodiment may be advantageously applied to Merge modes where a different motion vector threshold is applied based on the type of predictor (candidate), for example, regular, template matching (TM), or block matching (BM) Merge modes.

In one embodiment, when the method of the invention as set out in any of the aspects and embodiments mentioned above is usable (or enabled), the ARMC process is applied for all predictors (candidates) derived and ordered with ARMC.

In an embodiment when the proposed method is usable (or enabled), pairwise predictors (candidates) are added during or after the ordering process.

In a further aspect of the invention, there is provided a method of processing a list of predictors comprising: determining a minimum cost difference between two consecutive predictors (or predictor candidates) in the list. if this minimum difference is less than a threshold (lambda) relocate one of the candidate at a last position in the list. Optionally, the last position is before candidates in the list considered redundant, The cost may be a distortion. The cost difference may be an absolute cost difference.

According to another further aspect of the invention, there is provided a method of processing a list of predictors comprising: —determining the minimum cost difference between two consecutive predictors (or predictor candidates), if the minimum difference is less than a threshold (Lambda), compare the distortion of one of the (redundant) predictors to the distortion of a (further) following predictor in the list, identify a position of the first following predictor which has a distortion difference higher than lambda, locate the predictor at this identified position. The cost may be a distortion. The cost difference may be an absolute cost difference.

According to another further aspect of the invention, there is provided a method of processing a list of predictors comprising: for a candidate, determining a first, following, non-redundant predictor (or predictor candidate) in the list, inserting this non-redundant predictor after the candidate. A redundant candidate may be a candidate which has been determined to have a cost difference less than a threshold, for example. The cost may be a distortion. The cost difference may be an absolute cost difference.

According to another further aspect of the invention, there is provided a method of processing a list of predictors comprising:—for a predictor (or predictor candidate), determine a first, following, non-redundant predictor in the list, insert this non-redundant candidate after the candidate unless this non-redundant candidate is determined to be redundant compared to all candidates prior to the candidate. A redundant candidate may be a candidate which has been determined to have a cost difference less than a threshold, for example. The cost may be a distortion. The cost difference may be an absolute cost difference.

According to another further aspect of the invention, there is provided a method of processing predictors comprising: obtaining a list of predictors, determining whether the absolute distortion cost difference between a first distortion cost of a first predictor and a second distortion cost of a second predictor is less than a lambda value (e.g. Lagrangian), wherein the second predictor immediately follows the first predictor in the list; and if—the absolute distortion cost difference is less than the lambda value, moving the position of the first predictor in the list. The second predictor may be moved to a position where it immediately follows the last candidate in the list currently deemed as non-redundant and before any redundant candidate. A redundant candidate may be a candidate which has previously been determined to have an absolute distortion difference with a preceding candidate that is less than lambda, for example. The lambda value may be derived based on a QP value or a shifted QP value. For example, the lambda value may be obtained from a table with entries indexed or associated with shifted QP values.

According to another further aspect of the invention, there is provided a method of processing a list of predictors comprising: obtaining a list of predictors, the list of predictors having at least two predictors, determining whether to modify the list of predictors based on a comparison of a first cost, related to a first predictor in the list, to a threshold value, and modifying the list of predictors based on the determination. In some examples, the step of determining whether to modify the list of predictors is based on comparisons of respective costs, related to each predictor in the list, to a threshold value. That is, respective costs, each related to respective predictor in the list, may be compared to a threshold value. In some examples, the step of modifying the list comprises removing from the list of predictors the or each candidate whose cost is inferior to the threshold value. Additionally, or alternatively, the step of modifying the list may comprise moving the or each candidate in the list whose cost is inferior to the threshold value to a position in the list subsequent to a candidate whose cost is greater than the threshold value. In yet further examples, the step of modifying the list may comprise moving the or each candidate in the list whose cost is inferior to the threshold value to a position considered to be the end of the list. In all examples, the step of modifying the list of predictors may performed in a first set of modes, and not performed in a second set of modes. That is, the reordering of the predictors in the list may be mode dependent.

These further aspects may be usefully combined with any of the preceding statements or embodiments already mentioned above.

The following optional features may be applied in combination with any of the aspects and optional features mentioned above. Optionally, the list of predictors are for predicting motion in an image portion. The predictors in the list may be any one of intra block predictor candidates and inter motion information predictor candidates. Alternatively, the list of predictors in the list may be for any one of: predicting positions in a point cloud, coding a mesh, predicting audio data, predicting still image data and predicting video data. The method may further comprise associating at least one syntax element with one or more predictors in the list of predictors.

In an aspect according to the invention, there is provided a method of encoding image data into a bitstream comprising processing a list of predictors according to any aspect or embodiment recited above.

In an aspect according to the invention, there is provided a method of decoding image data from a bitstream comprising processing a list of predictors according to processing a list of predictors according to any aspect or embodiment recited above.

In an aspect according to the invention, there is provided an apparatus for encoding image data into a bitstream, said apparatus being configured to process list of predictors according to any aspect or embodiment recited above.

In an aspect according to the invention, there is provided an apparatus for decoding image data from a bitstream, said apparatus being configured to process list of predictors according to any aspect or embodiment recited above.

In another aspect according to the invention, there is provide a (computer) program which when upon execution causes a programmable apparatus to perform a method according to any aspect or embodiment recited above. The program may be store on a computer readable storage medium.

The program may be provided on its own or may be carried on, by or in a carrier medium. The carrier medium may be non-transitory, for example a storage medium, in particular a computer-readable storage medium. The carrier medium may also be transitory, for example a signal or other transmission medium. The signal may be transmitted via any suitable network, including the Internet. Further features of the invention are characterised by the independent and dependent claims Any feature in one aspect of the invention may be applied to other aspects of the invention, in any appropriate combination. In particular, method aspects may be applied to apparatus aspects, and vice versa.

Furthermore, features implemented in hardware may be implemented in software, and vice versa. Any reference to software and hardware features herein should be construed accordingly Any apparatus feature as described herein may also be provided as a method feature, and vice versa. As used herein, means plus function features may be expressed alternatively in terms of their corresponding structure, such as a suitably programmed processor and associated memory.

It should also be appreciated that particular combinations of the various features described and defined in any aspects of the invention can be implemented and/or supplied and/or used independently.

BRIEF DESCRIPTION OF THE DRAWINGS

Reference will now be made, by way of example, to the accompanying drawings, in which:

FIG. 21 illustrates the ordering process of predictors based on distortion values of an embodiment of the present invention;

FIG. 27 illustrates one reordering process of predictors based on distortion values of an embodiment of the present invention;

FIG. 29 illustrates an illustration of a reordering process of predictors based on distortion values according to embodiments of the present invention.

DETAILED DESCRIPTION

Figure 1:
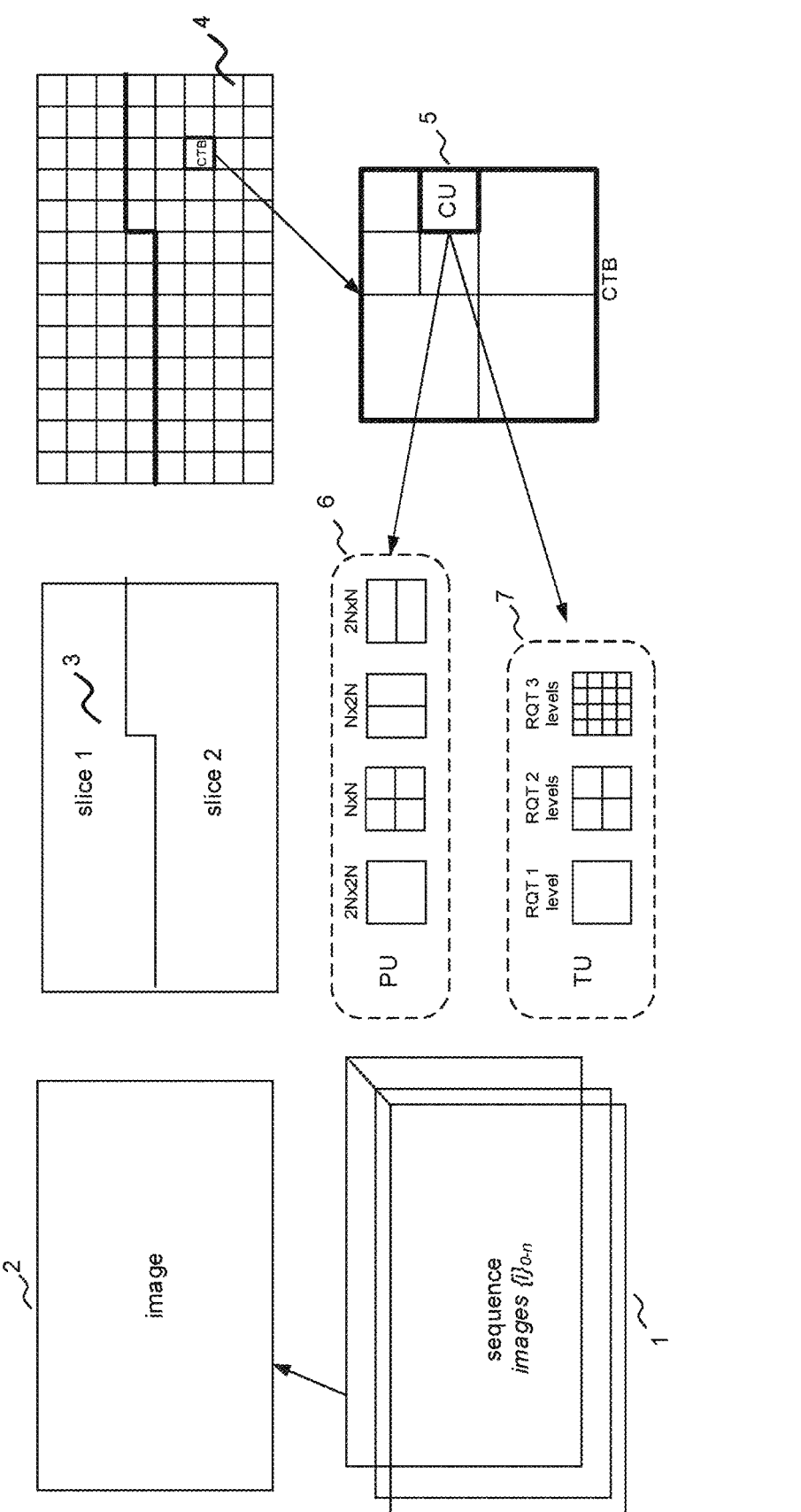
FIG. 1 is a diagram for use in explaining a coding structure used in HEVC.

FIG. 1 relates to a coding structure used in the High Efficiency Video Coding (HEVC) video and Versatile Video Coding (VVC) standards. A video sequence 1 is made up of a succession of digital images i. Each such digital image is represented by one or more matrices. The matrix coefficients represent pixels.

An image 2 of the sequence may be divided into slices 3. A slice may in some instances constitute an entire image. These slices are divided into non-overlapping Coding Tree Units (CTUs). A Coding Tree Unit (CTU) is the basic processing unit of the High Efficiency Video Coding (HEVC) video standard and conceptually corresponds in structure to macroblock units that were used in several previous video standards. A CTU is also sometimes referred to as a Largest Coding Unit (LCU). A CTU has luma and chroma component parts, each of which component parts is called a Coding Tree Block (CTB). These different color components are not shown in FIG. 1.

A CTU is generally of size 64 pixels×64 pixels for HEVC, yet for VVC this size can be 128 pixels×128 pixels. Each CTU may in turn be iteratively divided into smaller variable-size Coding Units (CUs) 5 using a quadtree decomposition.

Coding units are the elementary coding elements and are constituted by two kinds of sub-unit called a Prediction Unit (PU) and a Transform Unit (TU). The maximum size of a PU or TU is equal to the CU size. A Prediction Unit corresponds to the partition of the CU for prediction of pixels values. Various different partitions of a CU into PUs are possible as shown by 606 including a partition into 4 square PUs and two different partitions into 2 rectangular PUs. A Transform Unit is an elementary unit that is subjected to spatial transformation using DCT. A CU can be partitioned into TUs based on a quadtree representation 607.

Each slice is embedded in one Network Abstraction Layer (NAL) unit. In addition, the coding parameters of the video sequence are stored in dedicated NAL units called parameter sets. In HEVC and H.264/AVC two kinds of parameter sets NAL units are employed: first, a Sequence Parameter Set (SPS) NAL unit that gathers all parameters that are unchanged during the whole video sequence. Typically, it handles the coding profile, the size of the video frames and other parameters. Secondly, a Picture Parameter Set (PPS) NAL unit includes parameters that may change from one image (or frame) to another of a sequence. HEVC also includes a Video Parameter Set (VPS) NAL unit which contains parameters describing the overall structure of the bitstream. The VPS is a type of parameter set defined in HEVC, and applies to all of the layers of a bitstream. A layer may contain multiple temporal sub-layers, and all version 1 bitstreams are restricted to a single layer. HEVC has certain layered extensions for scalability and multiview and these will enable multiple layers, with a backwards compatible version 1 base layer.

Other ways of splitting an image have been introduced in VVC including subpictures, which are independently coded groups of one or more slices.

Figure 2:
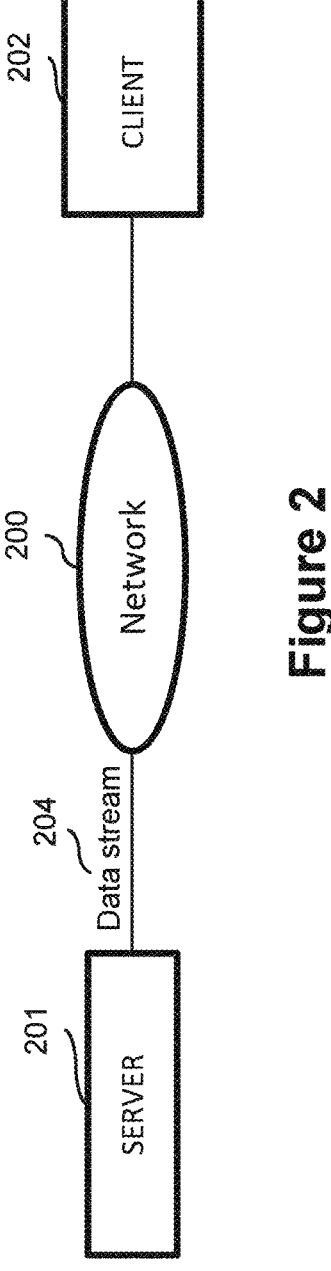
FIG. 2 is a block diagram schematically illustrating a data communication system in which one or more embodiments of the invention may be implemented.

FIG. 2 illustrates a data communication system in which one or more embodiments of the invention may be implemented. The data communication system comprises a transmission device, in this case a server 201, which is operable to transmit data packets of a data stream to a receiving device, in this case a client terminal 202, via a data communication network 200. The data communication network 200 may be a Wide Area Network (WAN) or a Local Area Network (LAN). Such a network may be for example a wireless network (Wifi/802.11a or b or g), an Ethernet network, an Internet network or a mixed network composed of several different networks. In a particular embodiment of the invention the data communication system may be a digital television broadcast system in which the server 201 sends the same data content to multiple clients.

The data stream 204 provided by the server 201 may be composed of multimedia data representing video and audio data. Audio and video data streams may, in some embodiments of the invention, be captured by the server 201 using a microphone and a camera respectively. In some embodiments data streams may be stored on the server 201 or received by the server 201 from another data provider, or generated at the server 201. The server 201 is provided with an encoder for encoding video and audio streams in particular to provide a compressed bitstream for transmission that is a more compact representation of the data presented as input to the encoder.

In order to obtain a better ratio of the quality of transmitted data to quantity of transmitted data, the compression of the video data may be for example in accordance with the HEVC format or H.264/AVC format or VVC format.

The client 202 receives the transmitted bitstream and decodes the reconstructed bitstream to reproduce video images on a display device and the audio data by a loud speaker.

Although a streaming scenario is considered in the example of FIG. 2, it will be appreciated that in some embodiments of the invention the data communication between an encoder and a decoder may be performed using for example a media storage device such as an optical disc.

In one or more embodiments of the invention a video image is transmitted with data representative of compensation offsets for application to reconstructed pixels of the image to provide filtered pixels in a final image.

Figure 3:
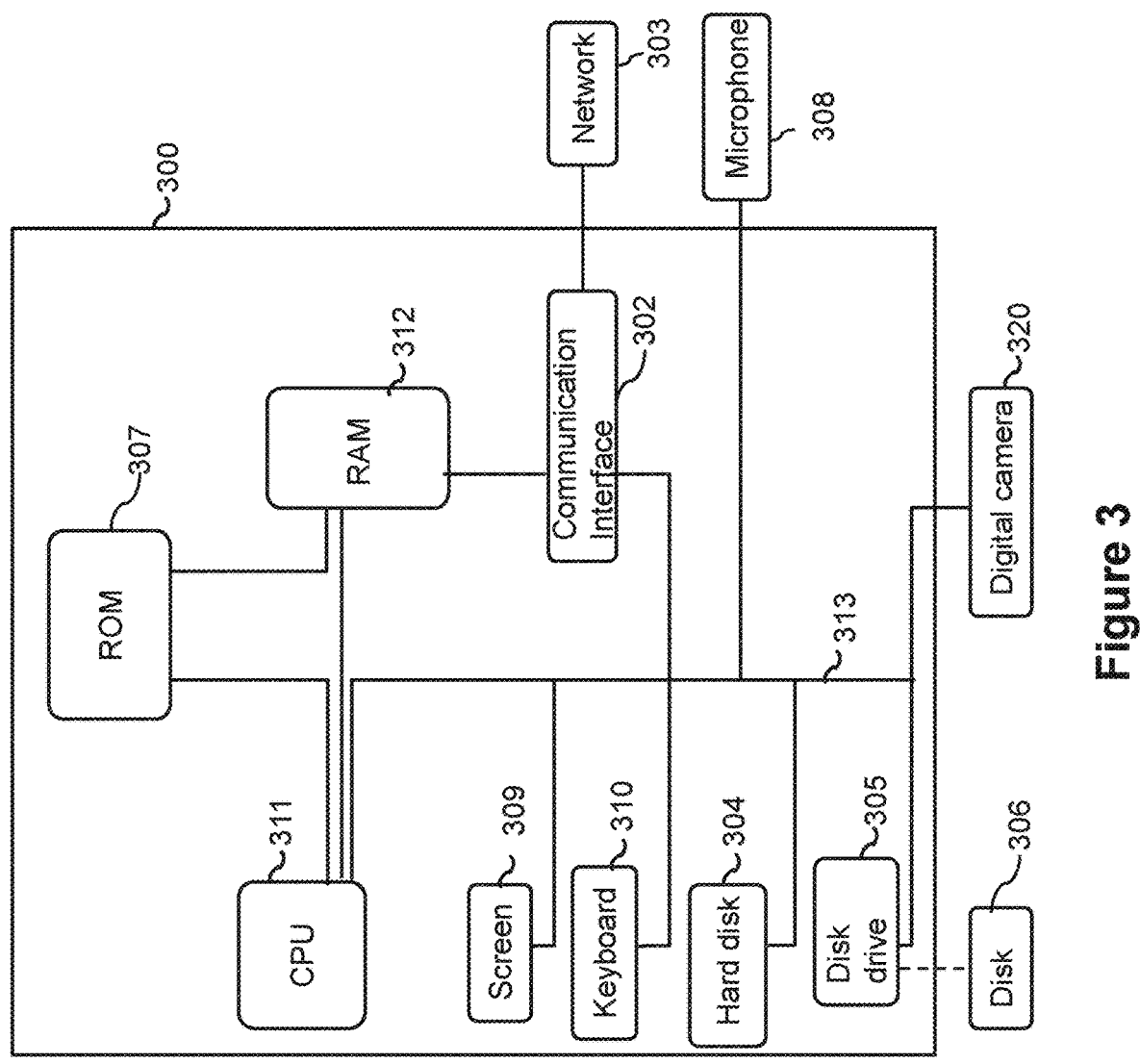
FIG. 3 is a block diagram illustrating components of a processing device in which one or more embodiments of the invention may be implemented.

FIG. 3 schematically illustrates a processing device 300 configured to implement at least one embodiment of the present invention. The processing device 300 may be a device such as a micro-computer, a workstation or a light portable device. The device 300 comprises a communication bus 313 connected to:

a central processing unit 311, such as a microprocessor, denoted CPU;

a read only memory 306, denoted ROM, for storing computer programs for implementing the invention;

a random access memory 312, denoted RAM, for storing the executable code of the method of embodiments of the invention as well as the registers adapted to record variables and parameters necessary for implementing the method of encoding a sequence of digital images and/or the method of decoding a bitstream according to embodiments of the invention; and a communication interface 302 connected to a communication network 303 over which digital data to be processed are transmitted or received Optionally, the apparatus 300 may also include the following components:

a data storage means 304 such as a hard disk, for storing computer programs for implementing methods of one or more embodiments of the invention and data used or produced during the implementation of one or more embodiments of the invention;

a disk drive 305 for a disk 306, the disk drive being adapted to read data from the disk 306 or to write data onto said disk;

a screen 309 for displaying data and/or serving as a graphical interface with the user, by means of a keyboard 310 or any other pointing means.

The apparatus 300 can be connected to various peripherals, such as for example a digital camera 320 or a microphone 308, each being connected to an input/output card (not shown) so as to supply multimedia data to the apparatus 300.

The communication bus provides communication and interoperability between the various elements included in the apparatus 300 or connected to it. The representation of the bus is not limiting and in particular the central processing unit is operable to communicate instructions to any element of the apparatus 300 directly or by means of another element of the apparatus 300.

The disk 306 can be replaced by any information medium such as for example a compact disk (CD-ROM), rewritable or not, a ZIP disk or a memory card and, in general terms, by an information storage means that can be read by a microcomputer or by a microprocessor, integrated or not into the apparatus, possibly removable and adapted to store one or more programs whose execution enables the method of encoding a sequence of digital images and/or the method of decoding a bitstream according to the invention to be implemented.

The executable code may be stored either in read only memory 306, on the hard disk 304 or on a removable digital medium such as for example a disk 306 as described previously. According to a variant, the executable code of the programs can be received by means of the communication network 303, via the interface 302, in order to be stored in one of the storage means of the apparatus 300 before being executed, such as the hard disk 304.

The central processing unit 311 is adapted to control and direct the execution of the instructions or portions of software code of the program or programs according to the invention, instructions that are stored in one of the aforementioned storage means. On powering up, the program or programs that are stored in a non-volatile memory, for example on the hard disk 304 or in the read only memory 306, are transferred into the random access memory 312, which then contains the executable code of the program or programs, as well as registers for storing the variables and parameters necessary for implementing the invention.

In this embodiment, the apparatus is a programmable apparatus which uses software to implement the invention. However, alternatively, the present invention may be implemented in hardware (for example, in the form of an Application Specific Integrated Circuit or ASIC).

Figure 4:
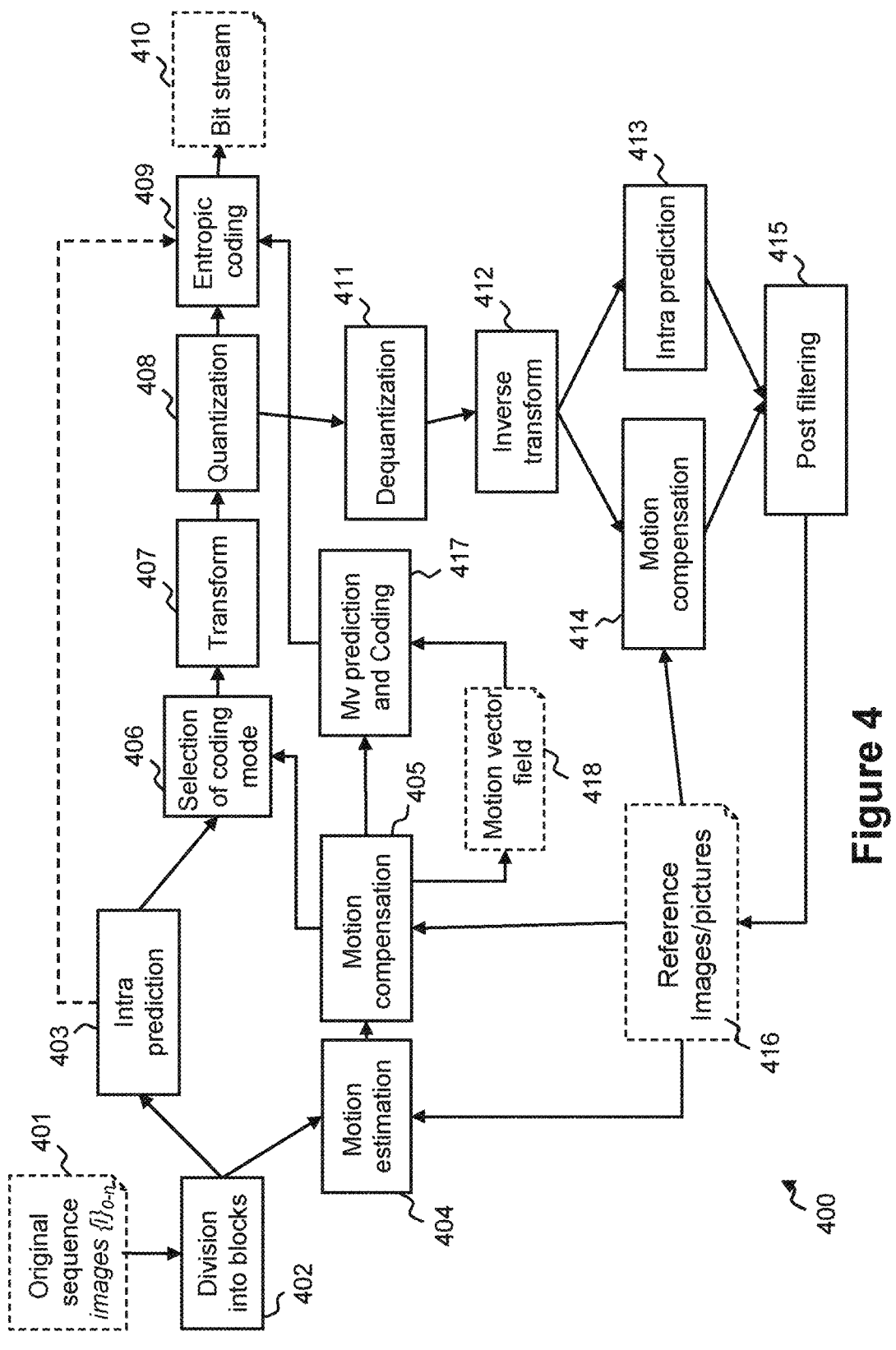
FIG. 4 is a flow chart illustrating steps of an encoding method according to embodiments of the invention.

FIG. 4 illustrates a block diagram of an encoder according to at least one embodiment of the invention. The encoder is represented by connected modules, each module being adapted to implement, for example in the form of programming instructions to be executed by the CPU 311 of device 300, at least one corresponding step of a method implementing at least one embodiment of encoding an image of a sequence of images according to one or more embodiments of the invention.

An original sequence of digital images i0 to in 401 is received as an input by the encoder 400. Each digital image is represented by a set of samples, sometimes also referred to as pixels (hereinafter, they are referred to as pixels).

A bitstream 410 is output by the encoder 400 after implementation of the encoding process. The bitstream 410 comprises a plurality of encoding units or slices, each slice comprising a slice header for transmitting encoding values of encoding parameters used to encode the slice and a slice body, comprising encoded video data.

The input digital images i0 to in 401 are divided into blocks of pixels by module 402. The blocks correspond to image portions and may be of variable sizes (e.g. 4×4, 8×8, 16×16, 32×32, 64×64, 128×128 pixels and several rectangular block sizes can be also considered). A coding mode is selected for each input block. Two families of coding modes are provided: coding modes based on spatial prediction coding (Intra prediction), and coding modes based on temporal prediction (Inter coding, Merge, SKIP). The possible coding modes are tested.

Module 403 implements an Intra prediction process, in which the given block to be encoded is predicted by a predictor computed from pixels of the neighbourhood of said block to be encoded. An indication of the selected Intra predictor and the difference between the given block and its predictor is encoded to provide a residual if the Intra coding is selected.

Temporal prediction is implemented by motion estimation module 404 and motion compensation module 405. Firstly a reference image from among a set of reference images 416 is selected, and a portion of the reference image, also called reference area or image portion, which is the closest area (closest in terms of pixel value similarity) to the given block to be encoded, is selected by the motion estimation module 404. Motion compensation module 405 then predicts the block to be encoded using the selected area. The difference between the selected reference area and the given block, also called a residual block, is computed by the motion compensation module 405. The selected reference area is indicated using a motion vector.

Thus, in both cases (spatial and temporal prediction), a residual is computed by subtracting the predictor from the original block.

In the INTRA prediction implemented by module 403, a prediction direction is encoded. In the Inter prediction implemented by modules 404, 405, 416, 418, 417, at least one motion vector or data for identifying such motion vector is encoded for the temporal prediction.

Information relevant to the motion vector and the residual block is encoded if the Inter prediction is selected. To further reduce the bitrate, assuming that motion is homogeneous, the motion vector is encoded by difference with respect to a motion vector predictor. Motion vector predictors from a set of motion information predictor candidates is obtained from the motion vectors field 418 by a motion vector prediction and coding module 417.

The encoder 400 further comprises a selection module 406 for selection of the coding mode by applying an encoding cost criterion, such as a rate-distortion criterion. In order to further reduce redundancies a transform (such as DCT) is applied by transform module 407 to the residual block, the transformed data obtained is then quantized by quantization module 408 and entropy encoded by entropy encoding module 409. Finally, the encoded residual block of the current block being encoded is inserted into the bitstream 410.

The encoder 400 also performs decoding of the encoded image in order to produce a reference image (e.g. those in Reference images/pictures 416) for the motion estimation of the subsequent images. This enables the encoder and the decoder receiving the bitstream to have the same reference frames (reconstructed images or image portions are used). The inverse quantization ("dequantization") module 411 performs inverse quantization ("dequantization") of the quantized data, followed by an inverse transform by inverse transform module 412. The intra prediction module 413 uses the prediction information to determine which predictor to use for a given block and the motion compensation module 414 actually adds the residual obtained by module 412 to the reference area obtained from the set of reference images 416.

Post filtering is then applied by module 415 to filter the reconstructed frame (image or image portions) of pixels. In the embodiments of the invention an SAO loop filter is used in which compensation offsets are added to the pixel values of the reconstructed pixels of the reconstructed image. It is understood that post filtering does not always have to performed. Also, any other type of post filtering may also be performed in addition to, or instead of, the SAO loop filtering.

Figure 5:
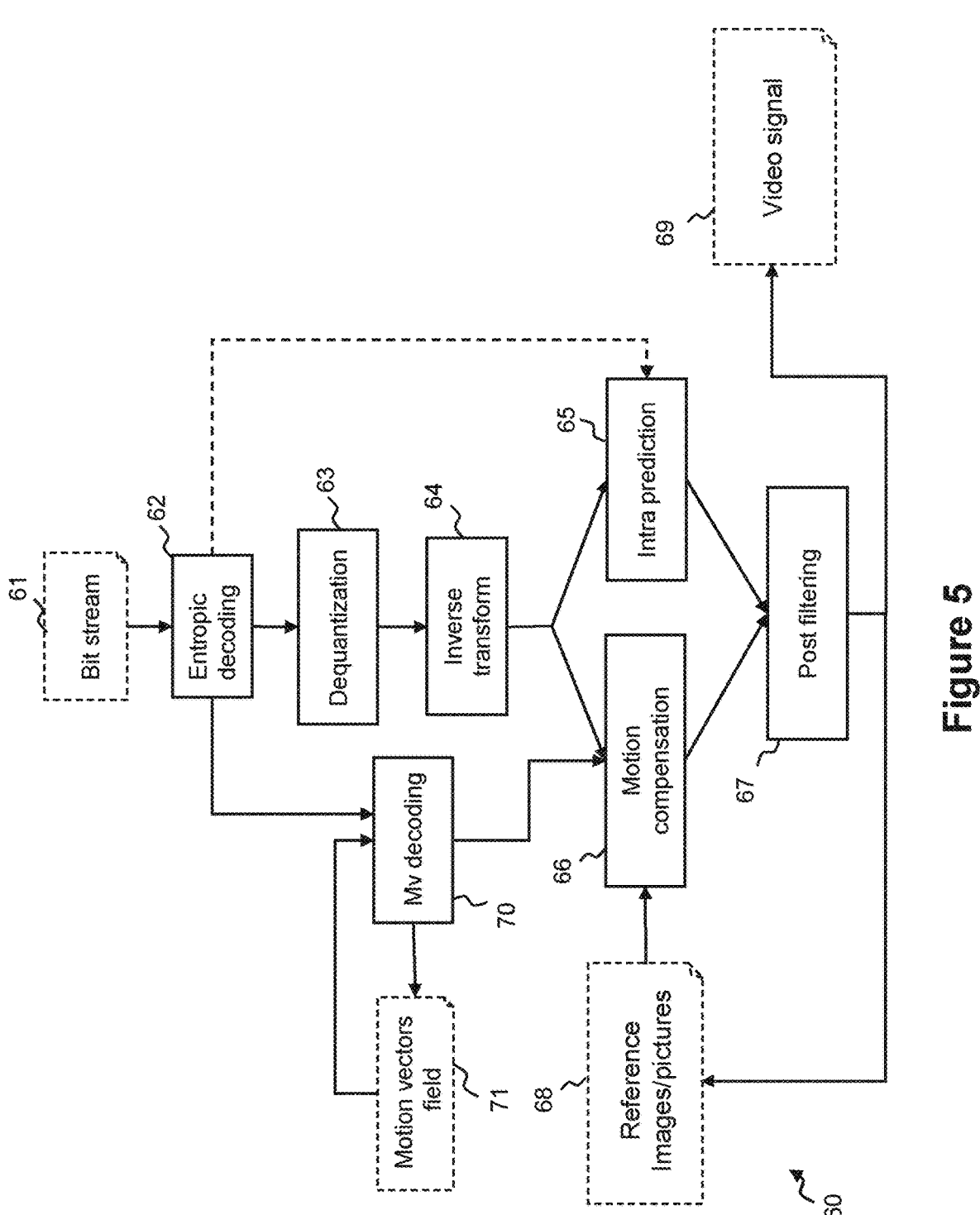
FIG. 5 is a flow chart illustrating steps of a decoding method according to embodiments of the invention.

FIG. 5 illustrates a block diagram of a decoder 60 which may be used to receive data from an encoder according an embodiment of the invention. The decoder is represented by connected modules, each module being adapted to implement, for example in the form of programming instructions to be executed by the CPU 311 of device 300, a corresponding step of a method implemented by the decoder 60.

The decoder 60 receives a bitstream 61 comprising encoded units (e.g. data corresponding to a block or a coding unit), each one being composed of a header containing information on encoding parameters and a body containing the encoded video data. As explained with respect to FIG. 4, the encoded video data is entropy encoded, and the motion vector predictors' indexes are encoded, for a given block, on a predetermined number of bits. The received encoded video data is entropy decoded by module 62. The residual data are then dequantized by module 63 and then an inverse transform is applied by module 64 to obtain pixel values.

The mode data indicating the coding mode are also entropy decoded and based on the mode, an INTRA type decoding or an INTER type decoding is performed on the encoded blocks (units/sets/groups) of image data.

In the case of INTRA mode, an INTRA predictor is determined by intra prediction module 65 based on the intra prediction mode specified in the bitstream.

If the mode is INTER, the motion prediction information is extracted from the bitstream so as to find (identify) the reference area used by the encoder. The motion prediction information comprises the reference frame index and the motion vector residual. The motion vector predictor is added to the motion vector residual by motion vector decoding module 70 in order to obtain the motion vector. The various motion predictor tools used in VVC are discussed in more detail below with reference to FIGS. 6-10.

Motion vector decoding module 70 applies motion vector decoding for each current block encoded by motion prediction. Once an index of the motion vector predictor for the current block has been obtained, the actual value of the motion vector associated with the current block can be decoded and used to apply motion compensation by module 66. The reference image portion indicated by the decoded motion vector is extracted from a reference image 68 to apply the motion compensation 66. The motion vector field data 71 is updated with the decoded motion vector in order to be used for the prediction of subsequent decoded motion vectors.

Finally, a decoded block is obtained. Where appropriate, post filtering is applied by post filtering module 67. A decoded video signal 69 is finally obtained and provided by the decoder 60.

Motion Prediction (INTER) Modes

HEVC uses 3 different INTER modes: the Inter mode (Advanced Motion Vector Prediction (AMVP)), the "classical" Merge mode (i.e. the "non-Affine Merge mode" or also known as "regular" Merge mode) and the "classical" Merge Skip mode (i.e. the "non-Affine Merge Skip" mode or also known as "regular" Merge Skip mode). The main difference between these modes is the data signalling in the bitstream. For the Motion vector coding, the current HEVC standard includes a competitive based scheme for Motion vector prediction which was not present in earlier versions of the standard. It means that several candidates are competing with the rate distortion criterion at encoder side in order to find the best motion vector predictor or the best motion information for respectively the Inter or the Merge modes (i.e. the "classical/regular" Merge mode or the "classical/regular" Merge Skip mode). An index corresponding to the best predictors or the best candidate of the motion information is then inserted in the bitstream, together with a 'residual' which represents the difference between the predicted value and the actual value. The decoder can derive the same set of predictors or candidates and uses the best one according to the decoded index. Using the residual, the decoder can then recreate the original value.

In the Screen Content Extension of HEVC, the new coding tool called Intra Block Copy (IBC) is signalled as any of those three INTER modes, the difference between IBC and the equivalent INTER mode being made by checking whether the reference frame is the current one. This can be implemented e.g. by checking the reference index of the list L0, and deducing this is Intra Block Copy if this is the last frame in that list. Another way to do is comparing the Picture Order Count of current and reference frames: if equal, this is Intra Block Copy.

The design of the derivation of predictors and candidates is important in achieving the best coding efficiency without a disproportionate impact on complexity. In HEVC two motion vector derivations are used: one for Inter mode (Advanced Motion Vector Prediction (AMVP)) and one for Merge modes (Merge derivation process—for the classical Merge mode and the classical Merge Skip mode). The following describes the various motion predictor modes used in VVC.

Figure 6:
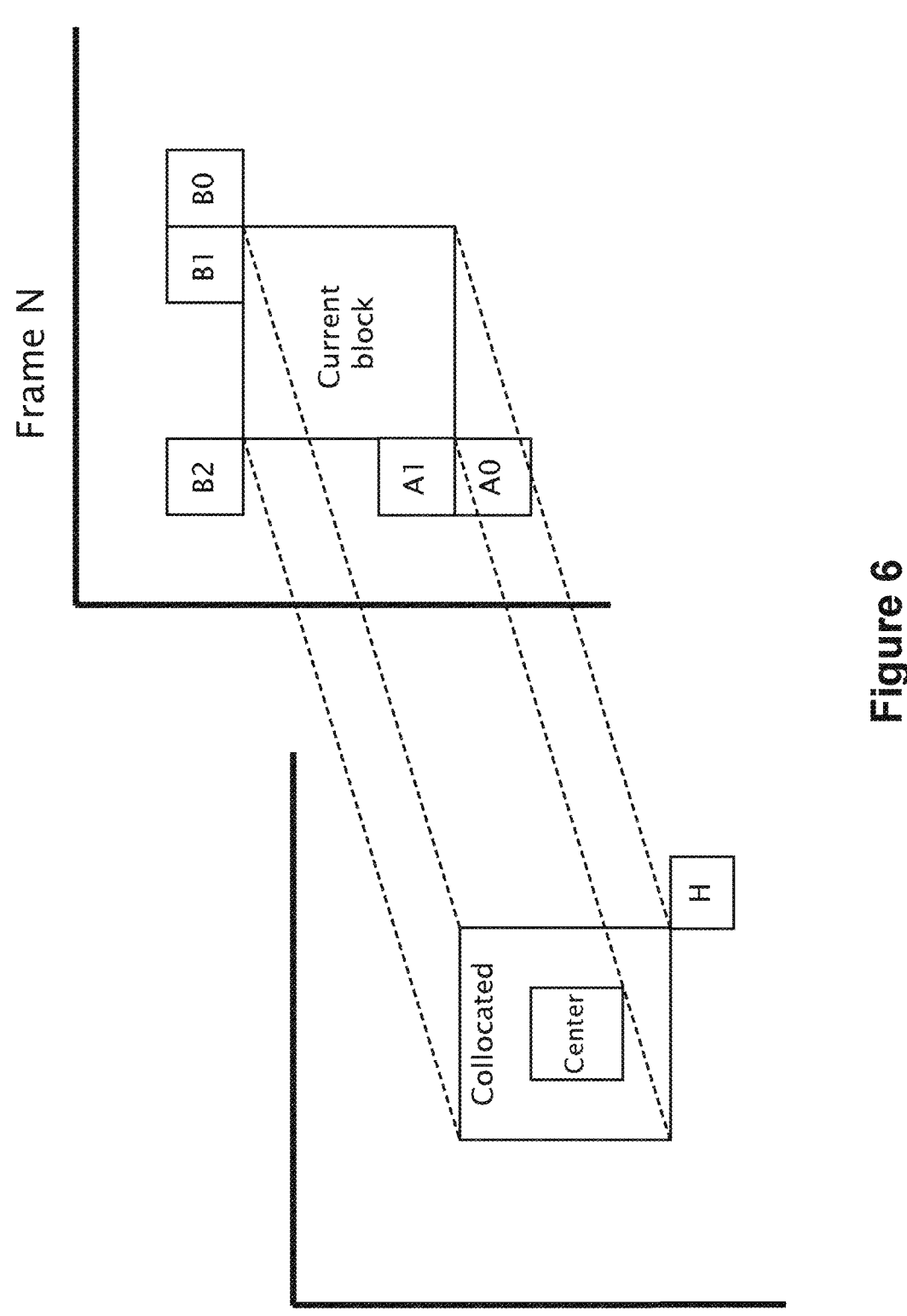
FIGS. 6 and 7 show the labelling scheme used to describe blocks situated relative to a current block.

FIG. 6 show the labelling scheme used herein to describe blocks situated relative to a current block (i.e. the block currently being en/decoded) between frames (FIG. 6).

VVC Merge Modes

In VVC several inter modes have been added compared to HEVC. In particular, new Merge modes have been added to the regular Merge mode of HEVC.

Affine Mode (SubBlock Mode)

In HEVC, only translation motion model is applied for motion compensation prediction (MCP). While in the real world, there are many kinds of motion, e.g. zoom in/out, rotation, perspective motions and other irregular motions.

In the JEM, a simplified affine transform motion compensation prediction is applied and the general principle of Affine mode is described below based on an extract of document JVET-G1001 presented at a JVET meeting in Torino at 13-21 Jul. 2017. This entire document is hereby incorporated by reference insofar as it describes other algorithms used in JEM.

Figure 8:
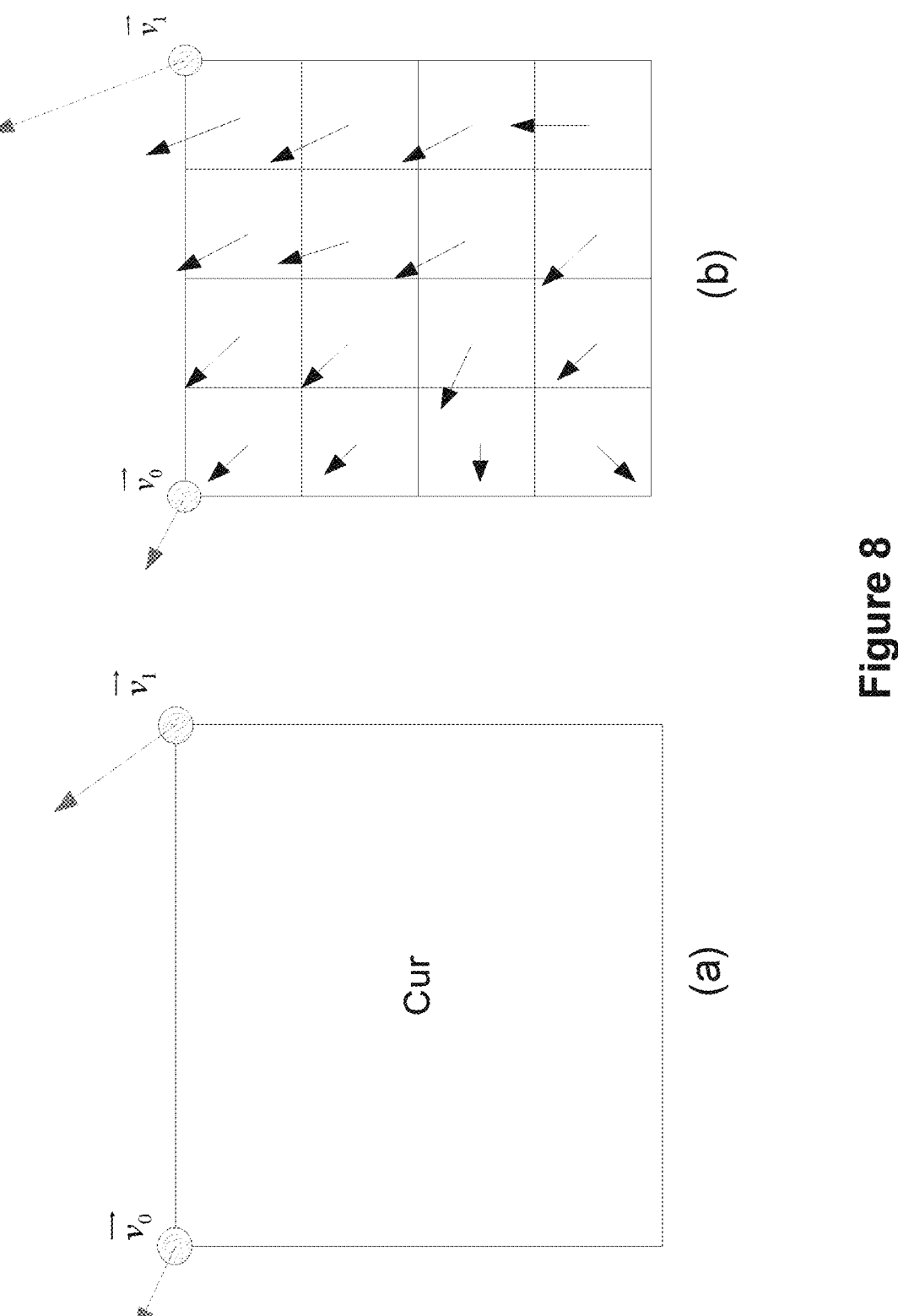
FIGS. 8 (a) and (b) illustrate the Affine (SubBlock) mode.

As shown in FIG. 8 (*a*), the affine motion field of the block is described by two control point motion vectors.

The affine mode is a motion compensation mode like the Inter modes (AMVP, "classical" Merge, or "classical" Merge Skip). Its principle is to generate one motion information per pixel according to 2 or 3 neighbouring motion information. In the JEM, the affine mode derives one motion information for each 4×4 block as depicted in FIG. 8 (*a*) (each square is a 4×4 block, and the whole block in FIG. 8 (*a*) is a 16×16 block which is divided into 16 blocks of such square of 4×4 size—each 4×4 square block having a motion vector associated therewith). The Affine mode is available for the AMVP mode and the Merge modes (i.e. the classical Merge mode which is also referred to as "non-Affine Merge mode" and the classical Merge Skip mode which is also referred to as "non-Affine Merge Skip mode"), by enabling the affine mode with a flag.

In the VVC specification the Affine Mode is also known as SubBlock mode; these terms are used interchangeably in this specification.

The subblock Merge mode of VVC contains a subblock-based temporal merging candidates, which inherit the motion vector field of a block in a previous frame pointed by a spatial motion vector candidate. This subblock candidate is followed by inherited affine motion candidate if the neighboring blocks have been coded with an inter affine mode of subblock merge and then some as constructed affine candidates are derived before some zero Mv candidate.

CIIP

In addition to the regular Merge mode and subblock Merge mode, the VVC standard contains also the Combined Inter Merge/Intra prediction (CIIP) also known as Multi-Hypothesis Intra Inter (MHII) Merge mode.

Figure 10:
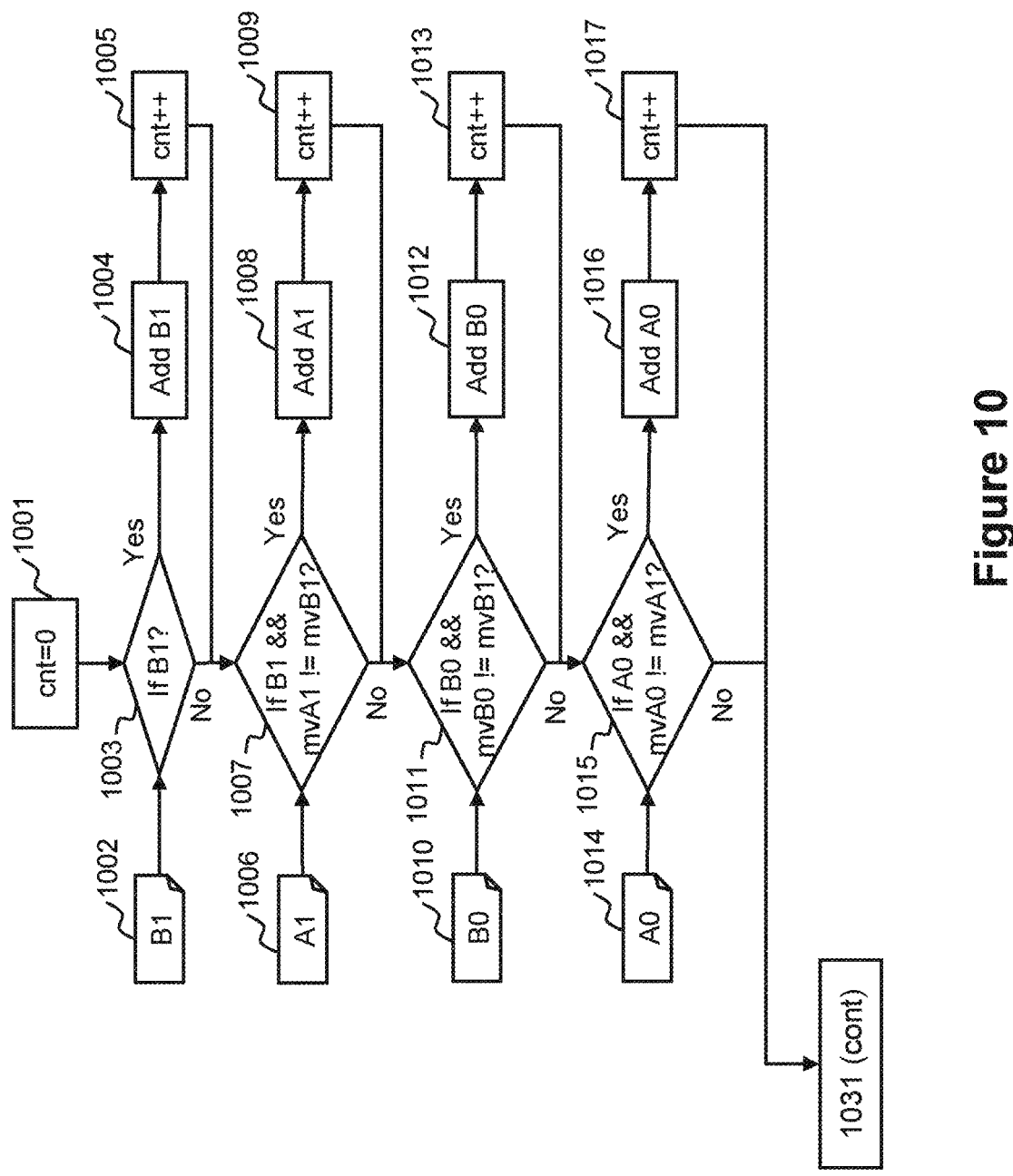
FIG. 10 illustrates the first steps of the Merge candidates list derivation of VVC.
Figure 10:
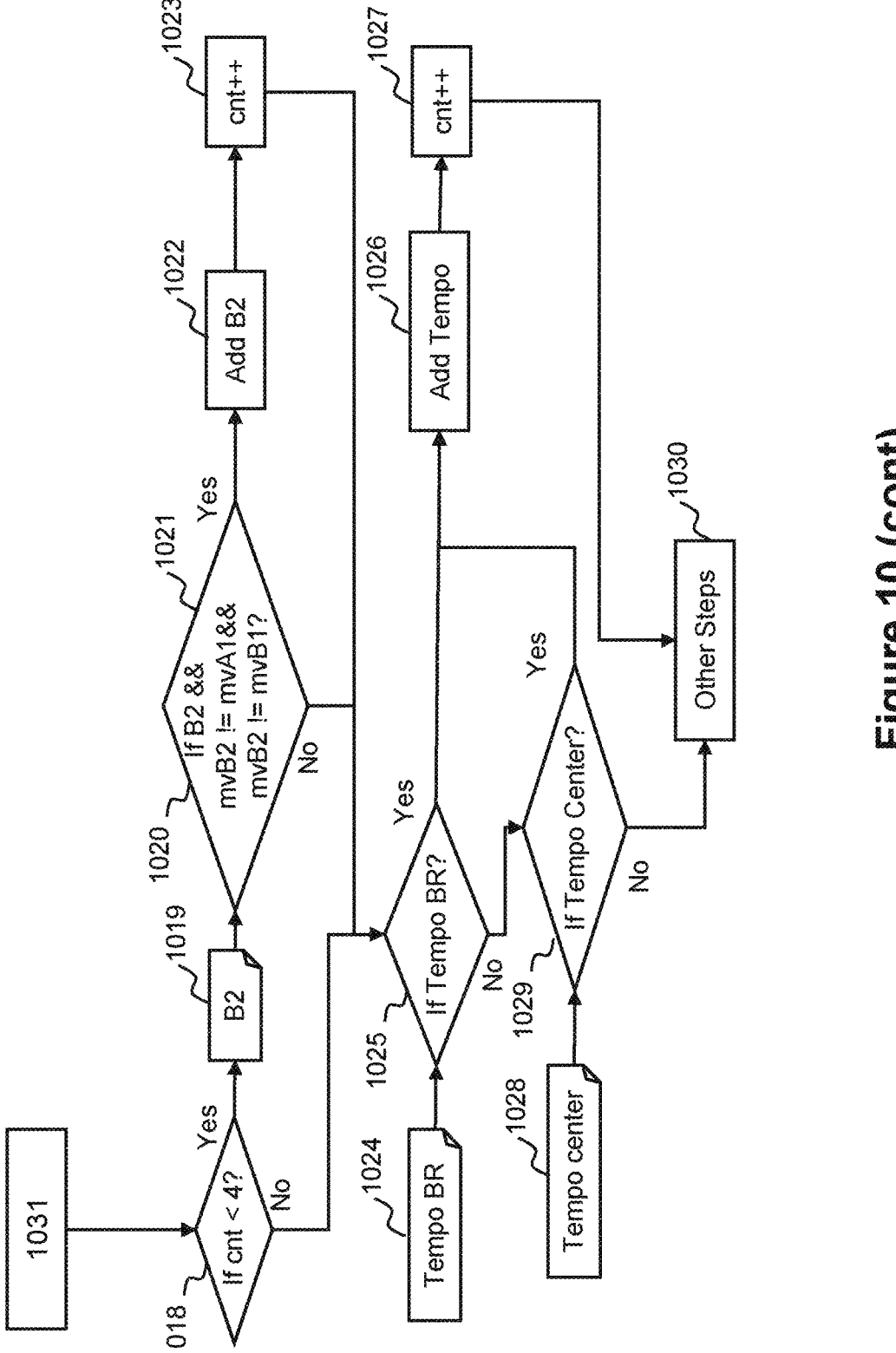

The Combined Inter Merge/Intra prediction (CIIP) Merge can be considered as a combination of the regular Merge mode and the Intra mode and is described below with reference to FIG. 10. The block predictor for the current block (1001) of this mode is an average between a Merge predictor block and an Intra predictor block as depicted in FIG. 10. The Merge predictor block is obtained with exactly the same process of the Merge mode so it is a temporal block (1002) or bi-predictor of 2 temporal blocks. As such, a Merge index is signalled for this mode in the same manner as the regular Merge mode. The Intra predictor block is obtained based on the neighbouring sample (1003) of the current block (1001). The amount of available Intra modes for the current block is however limited compared to an Intra block. Moreover, there is no Chroma Intra predictor block signalled for a CIIP block. The Chroma predictor is equal to the Luma predictor. As a consequence, 1, 2 or 3 bits are used to signal the Intra predictor for a CIIP block.

The CHIP block predictor is obtained by a weighted average of the Merge block predictor and the Intra block predictor. The weighting of the weighted average depends on the block size and/or the Intra predictor block selected.

The obtained CIIP predictor is then added to the residual of the current block to obtain the reconstructed block. It should be noted that the CIIP mode is enabled only for non-Skipped blocks. Indeed, use of the CIIP Skip typically results in losses in compression performance and an increase in encoder complexity. This is because the CIIP mode has often a block residual in opposite to the other Skip mode. Consequently its signalling for the Skip mode increases the bitrate.—when the current CU is Skip, the CIIP is avoided. A consequence of this restriction is that the CIIP block can't have a residual containing only 0 value as it is not possible to encode a VVC block residual equal to 0. Indeed, in VVC the only way to signal a block residual equal to 0 for a Merge mode is to use the Skip mode, this is because the CU CBF flag is inferred to be equal to true for Merge modes. And when this CBF flag is true, the block residual can't be equal to 0.

In such a way, CIIP should be interpreted in this specification as being a mode which combines features of Inter and Intra prediction, and not necessarily as a label given to one specific mode.

The CIIP used the same Motion vector candidates list as the regular Merge mode.

MMVD

The MMVD MERGE mode is a specific regular Merge mode candidate derivation. It can be considered as an independent Merge candidates list. The selected MMVD Merge candidate, for the current CU, is obtained by adding an offset value to one motion vector component (mvx or mvy) to an initial regular Merge candidate. The offset value is added to the motion vector of the first list L0 or to the motion vector of the second list L1 depending on the configuration of these reference frames (both backward, both forward or forward and backward). The initial Merge candidate is signalled thanks to an index. The offset value is signalled thanks to a distance index between the 8 possible distances (¼-pel, ½-pel, 1-pel, 2-pel, 4-pel, 8-pel, 16-pel, 32-pel) and a direction index giving the x or the y axis and the sign of the offset.

In VVC, only the 2 first candidates of the regular Merge list are used for the MMVD derivation and signalling by one flag.

Geometric Partitioning Mode

Figure 9:
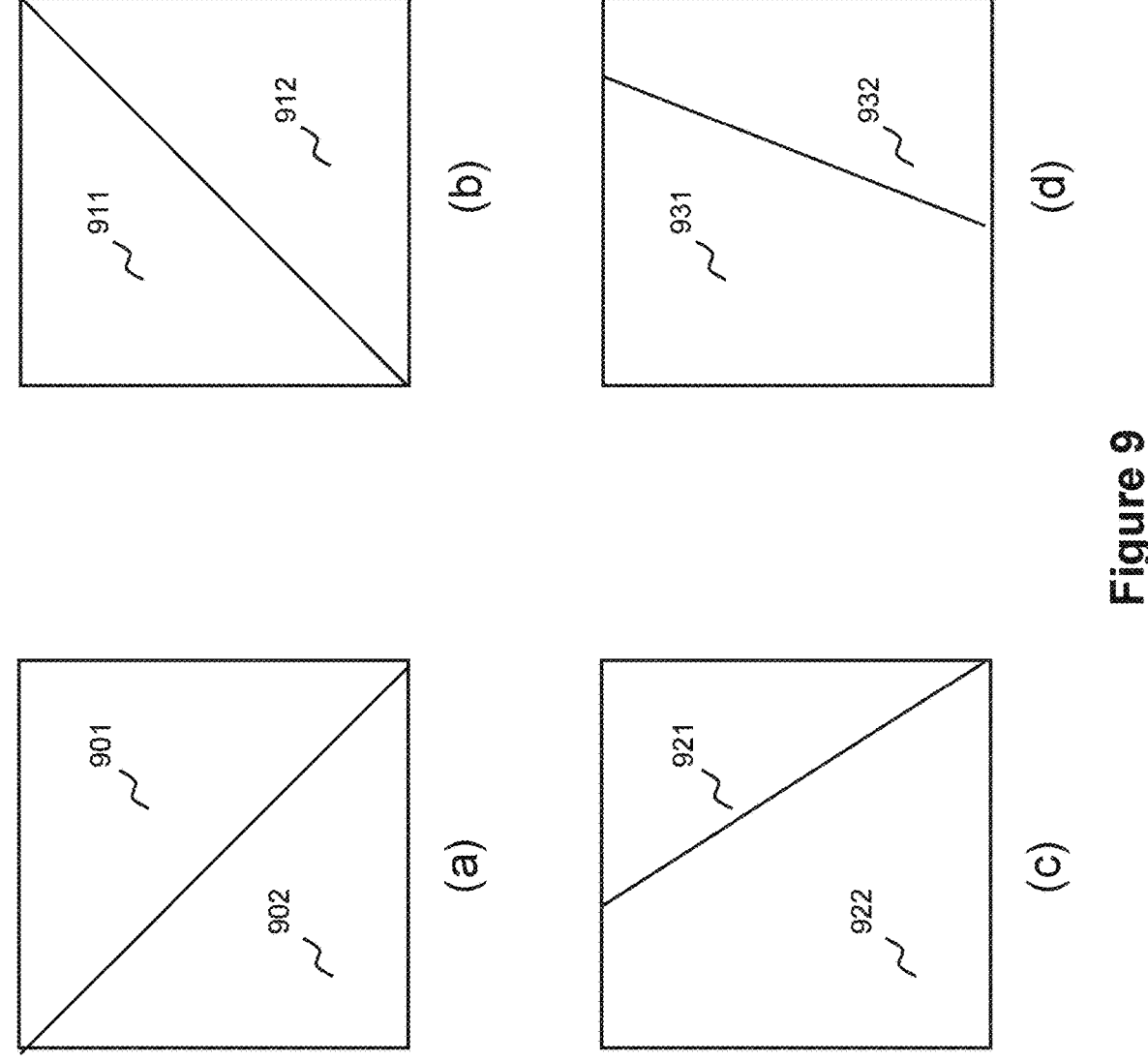
FIGS. 9 (a), (b), (c), (d) illustrate the geometric mode.

The Geometric (GEO) MERGE mode is a particular bi-prediction mode. FIG. 9 illustrates this particular block predictor generation. The block predictor contains one triangle from a first block predictor (901 or 911) and a second triangle from a second block predictor (902 or 912). But several other possible splits of the block are possible as depicted in FIG. 9 (c) and FIG. 9 (d). The Geometric Merge should be interpreted in this specification as being a mode which combines features of two Inter non square predictors, and not necessarily as a label given to one specific mode.

Each partition (901 or 902), in the example of FIG. 9 (a), has a motion vector candidate which is a unidirectional candidate. And for each partition an index is signalling to obtain at decoder the corresponding motion vector candidate in a list of unidirectional candidates. And the first and the second can't use the same candidate. This list of candidates are the same. As its name indicates, the BDOF mode is based on the optical flow concept, which assumes that the motion of an object is smooth. For each 4×4 subblock, a motion refinement (v_x, v_y) is calculated by minimizing the difference between the L0 and L1 prediction samples. The motion refinement is then used to adjust the bi-predicted sample values in the 4×4 subblock.

PROF

Similarly, Prediction refinement with optical flow (PROF) is used for affine mode.

AMVR and hpelIfIdx

VVC also includes Adaptive Motion Vector Resolution (AMVR). AMVR allows the motion vector difference of the CU to be coded in different precision. For example for AMVP mode: quarter-luma-sample, half-luma-sample, integer-luma-sample or four-luma-sample are considered. The following table of the VVC specification gives the AMVR shift based on different syntax elements.

| | | AmvrShift | | |
| --- | --- | --- | --- | --- |
| amvr_flag | amvr_precision_idx | inter_affine_ flag[ x0 ][ y0 ] == 1 | CuPredMode[ chType ][ x0 ][ y0 ] == MODE_IBC ) | inter_affine_flag[ x0 ][ y0 ] ==0 && CuPredMode[ chType ][ x0 ][ y0 ] ! = MODE IBC |
| 0 | — | 2 (¼ luma sample) | — | 2 (¼ luma sample) |
| 1 | 0 | 0 (1/16 luma sample) | 4 (1 luma sample) | 3 (½ luma sample) |
| 1 | 1 | 4 (1 luma sample) | 6 (4 luma samples) | 4 (1 luma sample) |
| 1 | 2 | — | — | 6 (4 luma samples) | comes from the regular Merge candidates list where for each candidate, one of the 2 components (L0 or L1) have been removed.

IBC

In VVC, it is also possible to enable the Intra block Copy (IBC) merge mode. IBC has an independent merge candidate derivation process.

Other Motion Information Improvements

DMVR

The decoder side motion vector derivation (DMVR), in VVC, increases the accuracy of the MVs of the Merge mode. For this method, a bilateral-matching (BM) based decoder side motion vector refinement is applied. In this bi-prediction operation, a refined MV is searched around the initial MVs in the reference picture list L0 and reference picture list L1. The BM method calculates the distortion between the two candidate blocks in the reference picture list L0 and list L1.

BDOF

VVC integrates also a bi-directional optical flow (BDOF) tool. BDOF, previously referred to as BIO, is used to refine the bi-prediction signal of a CU at the 4×4 subblock level. BDOF is applied to a CU if it satisfies several conditions, especially if the distances (i.e. Picture Order Count (POC) difference) from two reference pictures to the current picture AMVR can have an impact on the coding of the other modes than those using motion vector differences coding as the different Merge mode. Indeed, for some candidates the parameter hpelIfIdx, which represent an index on the luma interpolation filter for half pel precision, is propagated for some Merge candidate. For AMVP mode, for example, the hpelIfIdx is derived as follows:

$$hpelIfIdx = AmvrShift == 3\,?\,1:\,0$$

Bi-Prediction with CU-Level Weight (BCW)

In VVC, the bi-prediction mode with CU-level weight (BCW) is extended beyond simple averaging (as performed in HEVC) to allow weighted averaging of the two prediction signals $P_0$ and $P_1$ according to the following formula.

$$P_{bi-pred} = ((8 - w) * P_0 + w * P_1 + 4) \gg 3$$

Five weights are allowed in the weighted averaging bi-prediction, where $w \in \{-2, 3, 4, 5, 10\}$.

For a non-merge CU, the weight index, bcwIndex, is signalled after the motion vector difference.

For a Merge CU, the weight index is inferred from neighbouring blocks based on the merge candidate index.

BCW is used only for CUs with 256 or more luma samples. Moreover, for low-delay pictures, all 5 weights are used. And for non-low-delay pictures, only 3 weights ($w \in \{3,4,5\}$) are used.

Regular Merge List Derivation

Figure 7:
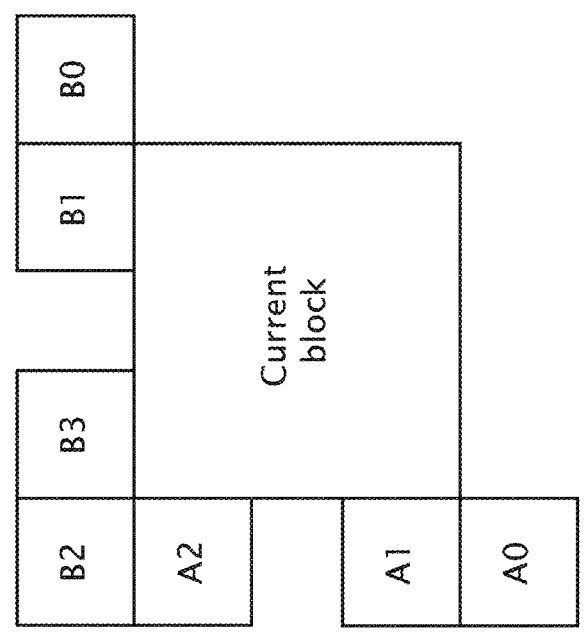
Figure 11:
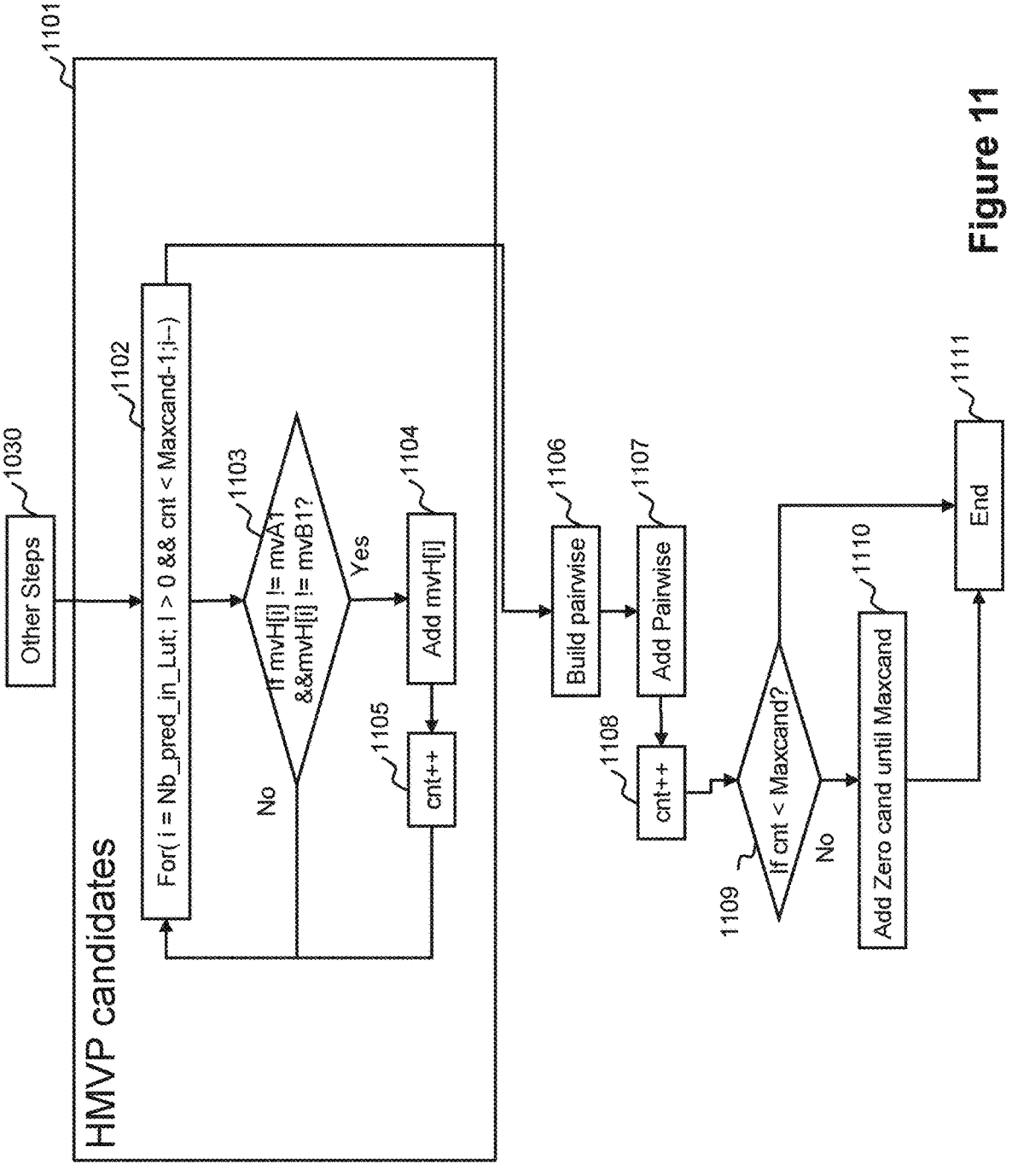
FIG. 11 illustrates further steps of the Merge candidates list derivation of VVC.

In VVC, the regular Merge list is derived as in FIG. 10 and FIG. 11. First the spatial candidates B1 (1002), A1 (1006), B0 (1010), A0 (1014) (as depicted in FIG. 7) are added if they exist. And a partial redundancies are performed, between the motion information of A1 and B1 (1007) to add A1 (1008), between the motion information of B0 and B1 (1011) to add B0 (1012) and between the motion information of A0 and A1 (1015) to add A0 (1016).

When a Merge candidate is added, the variable cnt is incremented (1015, 1009, 1013, 1017, 1023, 1027, 1115, 1108).

If the number of candidates in the list (cnt) is strictly inferior to 4 (1018), the candidate B2 (1019) is added (1022) if it has not the same motion information as A1 and B1 (1021).

Then the temporal candidate is added. The bottom right candidate (1024), if it is available (1025) is added (1026), otherwise the center temporal candidate (1028) is added (1026) if it exists (1029).

Then the history based (HMVP) are added (1101), if they have not the same motion information as A1 and B1 (1103). In addition the number of history based candidates can't exceed the maximum number of candidates minus 1 of the Merge candidates list (1102). So after the history based candidates there is at least one position missing in the merge candidates list Then, if the number of candidates in the list is at least 2, the pairwise candidate is built (1106) and added in the Merge candidates list (1107).

Then if there are empty positions (1109) in the Merge candidates list, the zero candidates are added (1110).

For spatial and history-based candidates, the parameters the parameters BCWidx and useAltHpelIf are set equal to the related parameters of the candidates. For temporal and zero candidates they are set equal to the default value, 0. These default values in essence disable the method.

For the pairwise candidate, BCWidx is set equal to 0 and hpelIfIdxp is set equal to the hpelIfIdxp of the first candidate if it is equal to the hpelIfIdxp of the second candidate, and to 0 otherwise.

Pairwise Candidate Derivation

Figure 12:
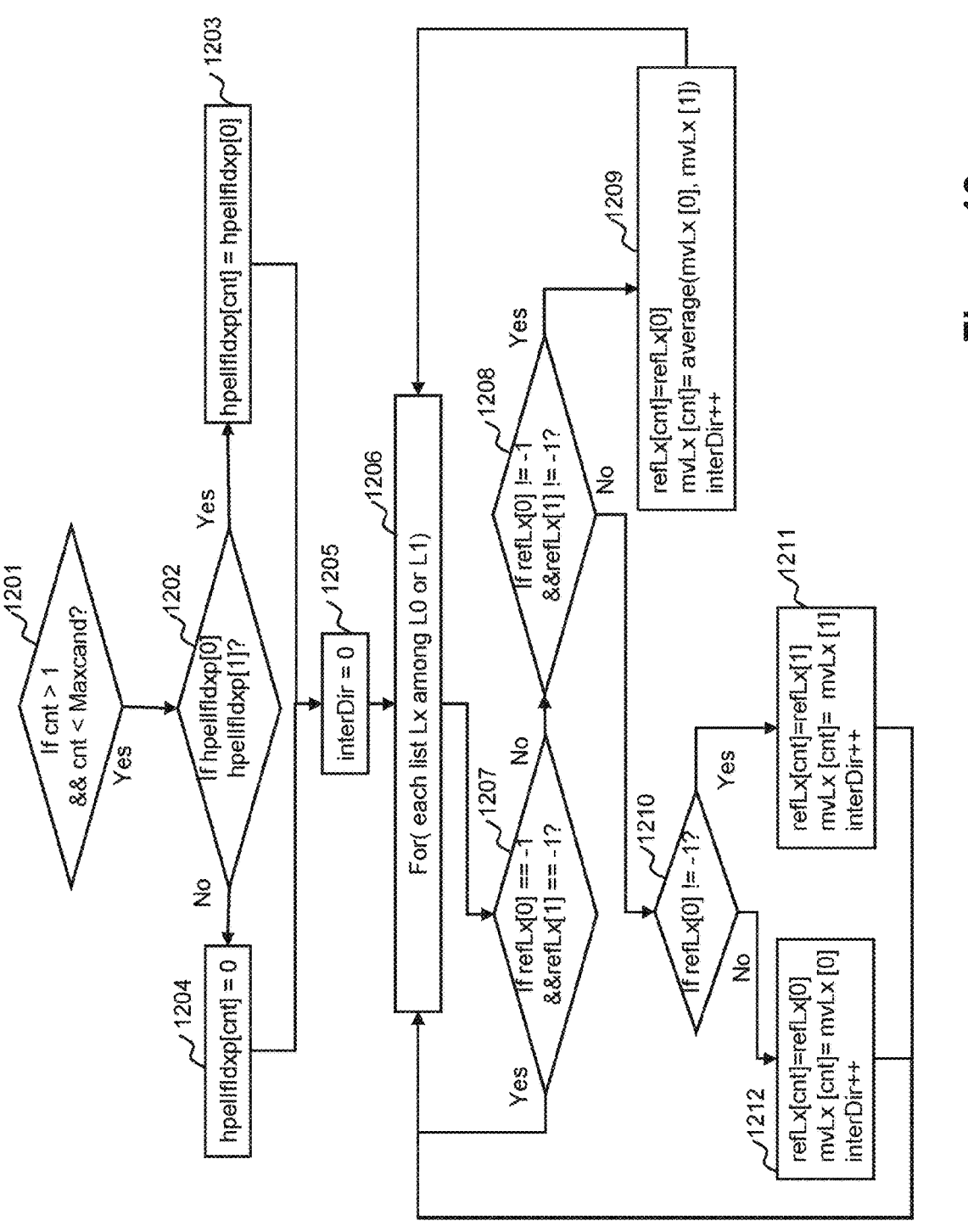
FIG. 12 illustrates the derivation of a pairwise candidate.

The pairwise candidate is built (1106) according to the algorithm of FIG. 12. As depicted, when 2 candidates are in the list (1201), the hpelIfIdxp is derived as mentioned previously (1204, 1202, 1203). Then the inter direction (interDir) is set equal to 0 (1205). For each list, L0 and L1, If at least one reference frame is valid (different to −1) (1207), the parameters will be set. If both are valid (1208), the mv information for this candidate is derived (1209) and set equal to the reference frame of the first candidate and the motion information is the average between the 2 motion vectors for this list and the variable interDir is incremented. If only one of the candidates has motion information for this list (1210), the motion information for the pairwise candidate is set equal to this candidate (1212, 1211) and the inter direction variable interDir is incremented.

ECM

Since the end of the standardization of VVC v1, JVET has launched an exploration phase by establishing an exploration software (ECM). It gathers additional tools and improvements of existing tools on top of the VVC standard to target better coding efficiency. The different additional tools compared to VVC are described in JVET-X2025.

ECM Merge Modes

Among all tools added, some additional Merge modes have been added. The Affine MMVD signal offsets for the Merge affine candidate as the MVVD coding for the regular Merge mode. Similarly, the GEO MMVD was also added. The CIIP PDPC is an extension of the CIIP. And 2 template matching Merge modes have been added: the regular template matching and the GEO template matching.

Figure 13:
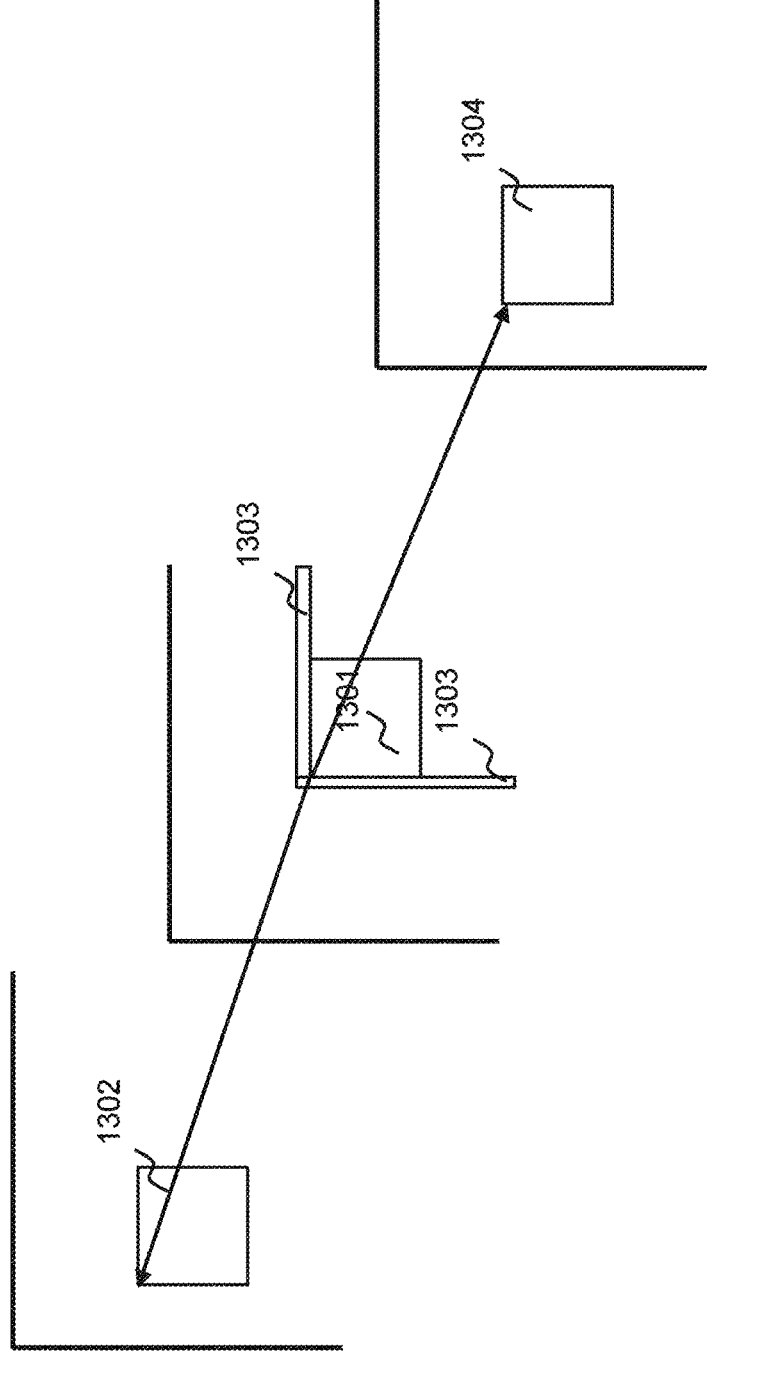
FIG. 13 illustrates the template matching method based on neighbouring samples.

The regular template matching is based on the template matching estimation as depicted in FIG. 13. At decoder side, for the candidate corresponding to the related Merge index and for both lists (L0, L1) available, a motion estimation based on the neighboring samples of the current block (1301) and based on the neighboring samples of the multiple corresponding block positions, a cost is computed and the motion information which minimized the cost is selected. The motion estimation is limited by a search range and several restrictions on this search range are also used to reduce the complexity.

In the ECM, the regular template matching candidates list is based on the regular Merge list but some additional steps and parameters have been added which means different Merge candidates lists for a same block may be generated. Moreover, only 4 candidates are available for the template matching regular Merge candidates list compared to the 10 candidates for the regular Merge candidates list in the ECM with common tests conditions defined by JVET.

Regular Merge List Derivation in ECM

Figure 14:
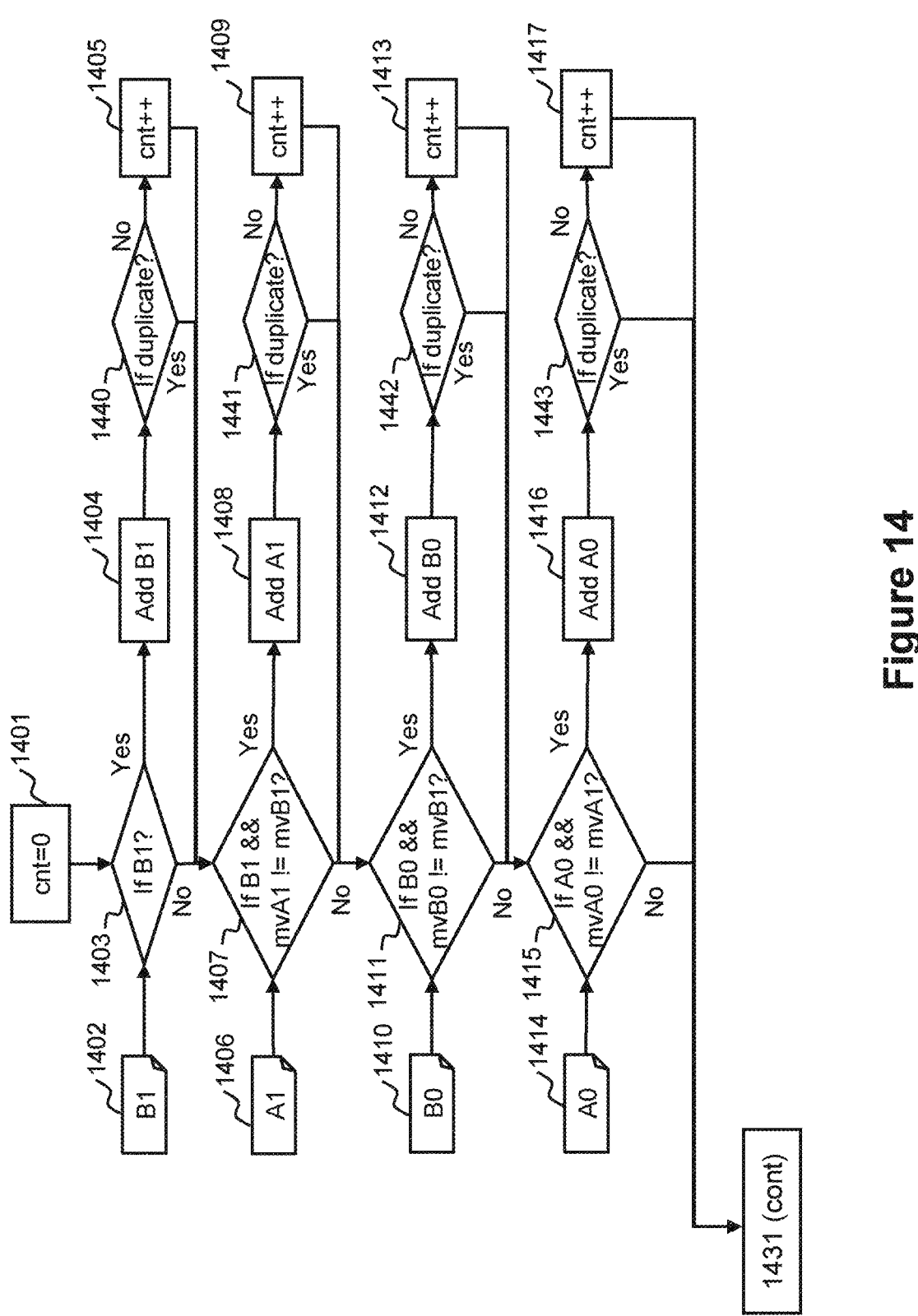
FIG. 14 illustrates a modification of the first steps of the Merge candidates list derivation shown in FIG. 10.
Figure 14:
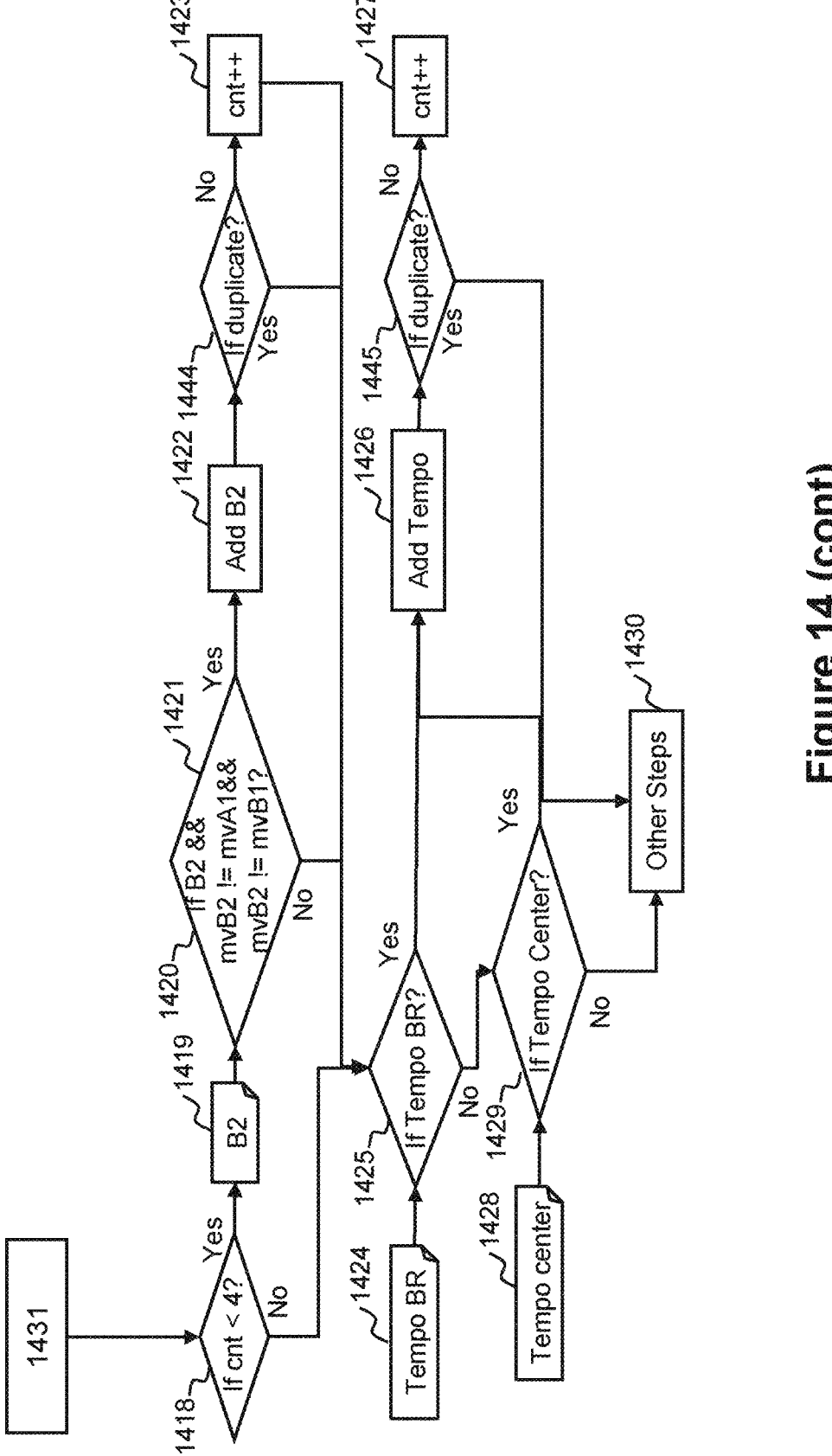
Figure 15:
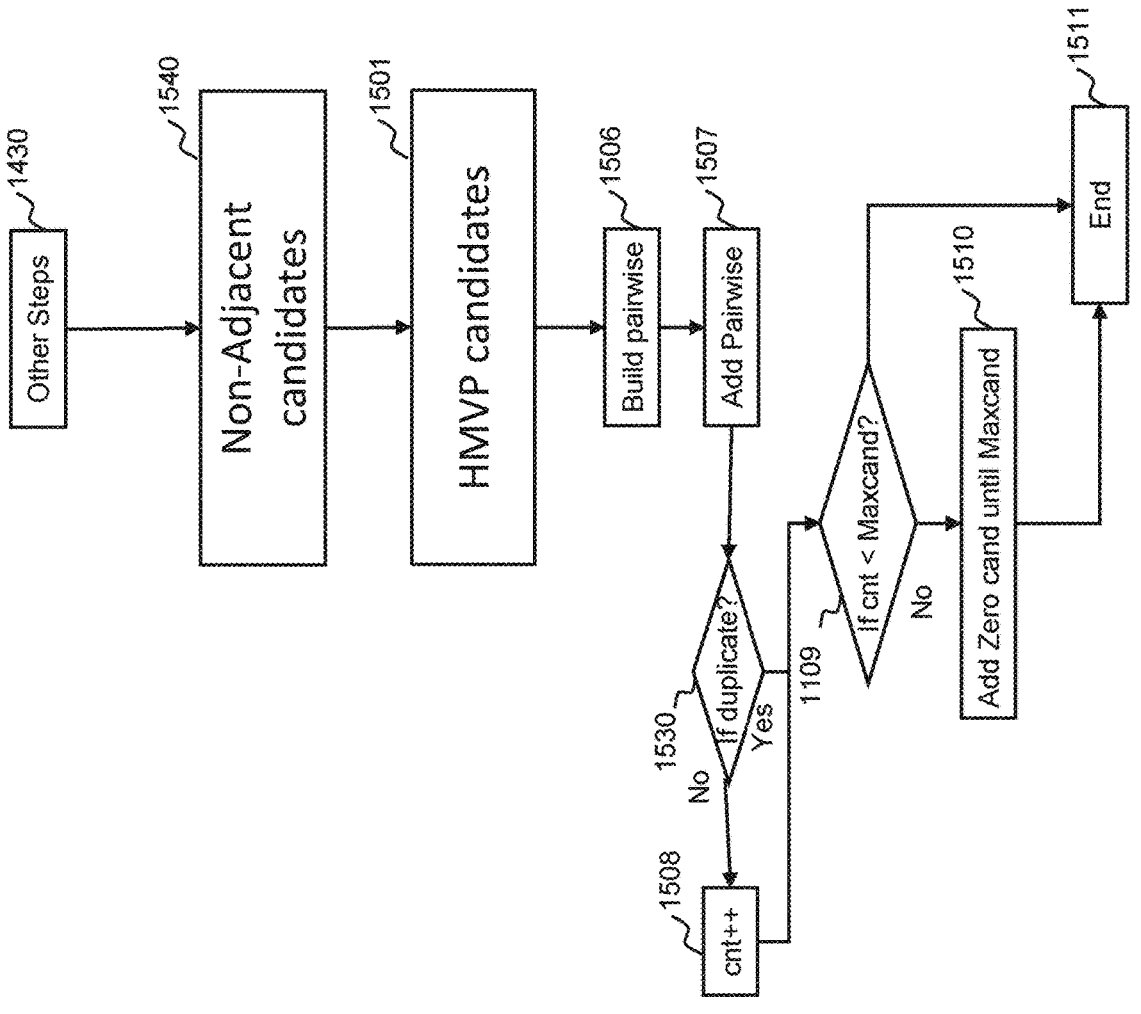
FIG. 15 illustrates a modification of the further steps of the Merge candidates list derivation shown in FIG. 11.

In the ECM, the regular Merge list derivation have been updated. FIGS. 14 and 15 show this update based on respectively FIGS. 10 and 11. But for clarity, the module for the history based candidates (1101) have been summarized in (1501).

In this FIG. 15, a new type of merge candidates has been added: the non-adjacent candidates (1540). These candidates come from blocks spatially located in the current frame but not the adjacent ones, as the adjacent are the spatial candidates. They are selected according to a distance and a direction. As for the history based the list of adjacent candidates can be added until the list reaches the maximum number of candidate minus 1, in order that the pairwise can still be added.

Zero Candidates

If the list still hasn't reached the maximum number of candidates (Maxcand) zero candidates are added to the list. The zero candidates are added according to the possible reference frames or pair of reference frames. The following pseudo code gives the derivation of such candidates:

```
int iNumRefIdx =slice.isInterB( )?min(MaxRefL0, MaxRefL1):
MaxRefL0;
int r=0
int refcnt=0;
while (nbCand < Maxcand)
  {
  if (slice.isInterB( ))
    {
    addZero(L0(Mv(0,0),Refix(r)), L1(Mv(0,0),Refix(r)) );
    }
```

-continued

```
    else
    {
      addZero(Mv(0,0),Refix(r));
    }
    nbCand++;
    if (refcnt == iNumRefIdx − 1)
    {
      r = 0;
    }
    else
    {
        ++r;
        ++refcnt;
    }
  }
}
```

This pseudo code can be summarized as: for each reference frame index (uni-direction), or pair of reference indexes (bi-prediction), a zero candidate is added. When all are added, only zero candidates with reference frames indexes 0 are added until that the number of candidates reaches its maximum value. In such a way, the Merge list can include multiple zero candidates. Indeed, it has been surprisingly found that this occurs frequently in real video sequences, particularly at the beginnings of slices or frames and sequences.

In a recent modification of the derivation of the merge candidates, the number of the candidates in the list can be greater than the maximum number of candidates in the final list Maxcand. Yet this number of candidates in the initial list, MaxCandInitialList, is used for the derivation. Consequently, the Zero candidates are added until the number of candidates is MaxCandInitialList and not until it is Maxcand.

BM Merge Mode

The BM Merge is Merge mode dedicated to the Adaptive decoder side motion vector refinement method which is an extension of multi-pass DMVR of the ECM. As described in JVET-X2025, this mode is equivalent to 2 Merge modes to refine the MV only in one direction. So, one Merge mode for L0 and one Merge mode for L1. So, the BM Merge is enabled only when the DMVR conditions can be enabled. For these two Merge modes only one list of Merge candidates is derived and all candidates respect the DMVR conditions.

The Merge candidates for the BM Merge mode are derived from spatial neighbouring coded blocks, TMVPs, non-adjacent blocks, HMVPs, pair-wise candidate, in a similar manner as for the regular Merge mode. A difference is that only those meet DMVR conditions are added into the candidate. Merge index is coded in a similar manner as for regular Merge mode.

AMVP Merge Mode

The AVMP Merge mode, also known as the bi-directional predictor, is defined as the following in JVET-X2025: It is composed of an AMVP predictor in one direction and a Merge predictor in the other direction. The mode can be enabled to a coding block when the selected Merge predictor and the AMVP predictor satisfy DMVR condition, where there is at least one reference picture from the past and one reference picture from the future relatively to the current picture and the distances from two reference pictures to the current picture are the same, the bilateral matching MV refinement is applied for the Merge MV candidate and AMVP MVP as a starting point. Otherwise, if template matching functionality is enabled, template matching MV refinement is applied to the Merge predictor or the AMVP predictor which has a higher template matching cost.

AMVP part of the mode is signalled as a regular uni-directional AMVP, i.e. reference index and MVD are signalled, and it has a derived MVP index if template matching is used or MVP index is signalled when template matching is disabled.

For AMVP direction LX, where X can be 0 or 1, the Merge part in the other direction (1−LX) is implicitly derived by minimizing the bilateral matching cost between the AMVP predictor and a Merge predictor, i.e. for a pair of the AMVP and a Merge motion vectors. For every Merge candidate in the Merge candidate list which has that other direction (1−LX) motion vector, the bilateral matching cost is calculated using the Merge candidate MV and the AMVP MV. The Merge candidate with the smallest cost is selected. The bilateral matching refinement is applied to the coding block with the selected Merge candidate MV and the AMVP MV as a starting point.

The third pass of multi pass DMVR which is 8×8 sub-PU BDOF refinement of the multi-pass DMVR is enabled to AMVP-merge mode coded block.

The mode is indicated by a flag, if the mode is enabled AMVP direction LX is further indicated by a flag.

MVD Sign Prediction

The sign prediction method is described in JVET-X0132. The motion vector difference sign prediction can be applied in regular inter modes if the motion vector difference contains non-zero component. In the current ECM version, it is applied for AMVP, Affine MVD and SMVD modes. Possible MVD sign combinations are sorted according to template matching cost and index corresponding to the true MVD sign is derived and coded with context model. At decoder side, the MVD signs are derived as following: 1/Parse the magnitude of MVD components. 2/Parse context-coded MVD sign prediction index. 3/Build MV candidates by creating combination between possible signs and absolute MVD value and add it to the MV predictor. 4/Derive MVD sign prediction cost for each derived MV based on template matching cost and sort. 5/Use MVD sign prediction index to pick the true MVD sign. 6/Add the true MVD to the MV predictor for final MV.

TIMD

The intra prediction, fusion for template-based intra mode derivation (TIMD) is described as the following in JVET-X2025: For each intra prediction mode in MPMs, The SATD between the prediction and reconstruction samples of the template is calculated. First two intra prediction modes with the minimum SATD are selected as the TIMD modes. These two TIMD modes are fused with the weights after applying PDPC process, and such weighted intra prediction is used to code the current CU. Position dependent intra prediction combination (PDPC) is included in the derivation of the TIMD modes.

Duplicate Check

In FIGS. 14 and 15, a duplicate check for each candidate was added (1440, 1441, 1442, 1443, 1444, 1445, and 1530). But, the duplicate is also for the Non-adjacent candidates (1540) and for the history based candidates (1501). It consists in comparing the motion information of the current candidate of the index cnt to the motion information of each other previous candidates. When this motion information is equal, it is considered as duplicate and the variable cnt is not incremented. Of course the motion information means inter direction, reference frame indexes and motion vectors for each list (L0, L1). Note that zero candidates corresponding to different reference frames are not considered duplicates.

MVTH

In the ECM, for the duplicate check a motion vector threshold was introduced. This parameter changes the equality check by considering that 2 motion vectors are equal if their absolute difference, for each component, is in less than or equal to the motion vector threshold MvTh. For the regular Merge mode the MvTh is set equal to 1 which corresponds to a traditional duplicate check without motion vector threshold.

The MvTh is equal to a value which depends on the number of luma sample nbSamples in the current CU for the template matching regular Merge mode as defined as the following:

```
if (nbSamples < 64) MvTh = 1<< MV_FRACTIONAL =16
else if (nbSamples < 256) MvTh = 2<< MV_FRACTIONAL =32
else MvTh = 4<< MV_FRACTIONAL =64
```

Where MV_FRACTIONAL corresponds to the inter resolution of the codec. So, in ECM currently, the 16th resolution is used so MV_FRACTIONAL is equal to 4.<< is the left shift operator. And where nbSamples-Height×Width (i.e. Height and Width for the current block).

There is, for example, another threshold, MvThBDMVRMvdThreshold, used for GEO Merge derivation and also for the duplicate check of the non-adjacent candidates as described below.

```
if (nbSamples < 64)
   MvThBDMVRMvdThreshold = (1 << MV_FRACTIONAL) >> 2 = 4
else if (nbSamples < 256)
   MvThBDMVRMvdThreshold = (1 << MV_FRACTIONAL) >> 1 = 8
else
   MvThBDMVRMvdThreshold = (1 << MV_FRACTIONAL) >> 0 = 16
```

ARMC

In the ECM, in order to reduce the number of bits for the Merge index, an Adaptive Reordering of Merge Candidates with Template Matching (ARMC) was added. According to the template matching cost computed as in FIG. 13, the candidates are reordered based on the cost of each candidate. In this method only one cost is computed per candidate. This method is applied after that this list has been derived and only on the 5 first candidates of the regular Merge candidates list. It should be appreciated that the number 5 was chosen to balance the complexity of the reordering process with the potential gains, and as such a greater number (e.g. all of the candidates) may be reordered.

Figure 18:
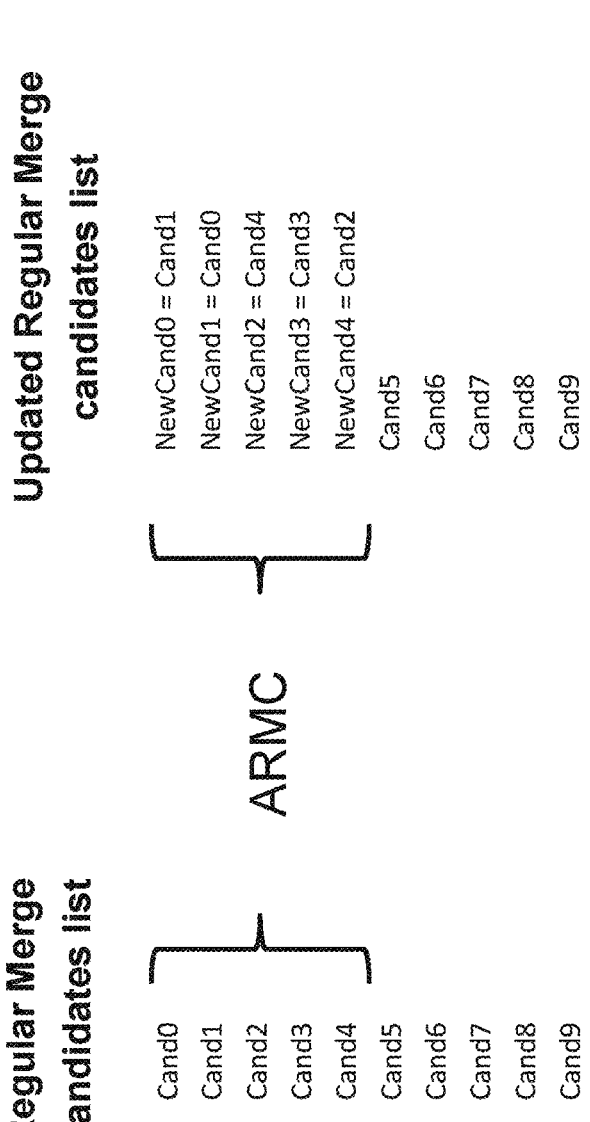
FIG. 18 illustrates the reordering process of the list of Merge mode candidates.

FIG. 18 gives an example of this method applied to a regular Merge candidate list containing 10 candidates as in the CTC.

This method is also applied to the subblock merge mode except for the temporal candidate and for the regular TM mode for all of the 4 candidates.

In a proposal, this method was also extended to reorder and select a candidate to be included in the final list of Merge mode candidates. For example, in JVET-X0087, all possible non-adjacent candidates (1540) and History based candidates (1501) are considered with temporal non-adjacent candidates in order to obtain a list of candidates. This list of candidates is built without considering the maximum number of candidates. This list candidates is then reordered. Only a correct number of candidates from this list are added to the final list of Merge candidates. The correct number of candidates corresponding to the first N candidates in the list. In this example, the correct number is the maximum number of candidates minus the number of spatial and temporal candidates already in the final list. In other words, the non-adjacent candidates and History based candidates are processed separately from the adjacent spatial and temporal candidates. The processed list is used to supplement the adjacent spatial and temporal Merge candidates already present in the Merge candidate list to generate a final Merge candidate list.

In JVET-X0091, ARMC is used to select the temporal candidate from among 3 temporal candidates bi-dir, L0 or L1. The selected candidate is added to the Merge candidate list.

In JVET-X0133, the Merge temporal candidate is selected from among several temporal candidates which are reordered using ARMC. In the same way, all possible Adjacent candidates are subject to ARMC and up to 9 of these candidates can be added to the list of Merge candidates.

All these proposed methods use the classical ARMC reordering the final list of merge candidates to reorder it. JVET X0087 re-uses the cost computed during the reordering of the non-adjacent and History based candidates, to avoid additional computation costs. JVET-X0133 applies a systematic reordering on all candidates on the final list of merge candidates.

New ARMC

Since the first implementation of ARMC, the method was added to several other modes. The ARMC is applied additionally to the Regular, and Template matching Merge mode, Subblock Merge modes and also for IBC, MMVD, Affine MMVD, CIIP, CIIP with template matching and BM Merge mode. In addition, the principle of ARMC to reorder the list of candidates based on template matching cost is also applied to the AMVP Merge candidates derivation as well as for the Intra method TIMD to select the most probable predictors.

In addition, the principle is added for the sign residual prediction method for Affine MVD, AMVP and SMVD method.

There are also additional tests of the usage of this reordering for GEO Merge mode and GEO with template matching as well as for reference frame index prediction.

In addition to this almost systematic usage of the ARMC, there was several additional modifications of the derivation process for some candidates.

Figure 19:
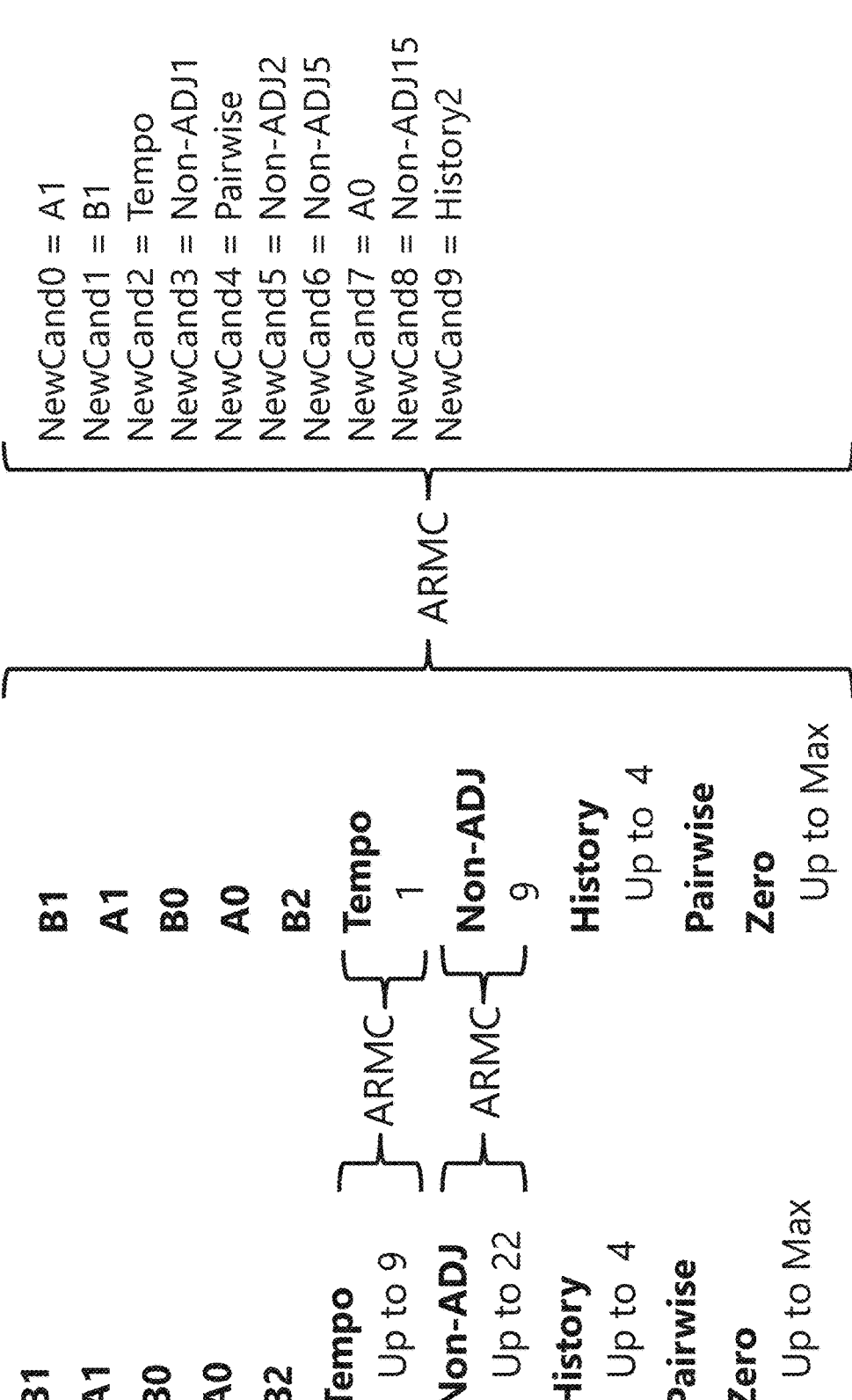
FIG. 19 illustrates the pairwise candidate derivation during the reordering process of the list of Merge mode candidates.

For example, the ECM4.0 derivation includes a cascading ARMC process for the candidates derivation of the regular, TM and BM merge modes as depicted for the regular and TM Merge mode in FIG. 19.

Compared to the previous Merge candidates derivation, firstly, 10 temporal positions are checked and added to the list of the temporal candidates after a non-duplicate check. This temporal list can contain a maximum of 9 candidates. Moreover, there is a particular threshold for this temporal list as the MV threshold is always 1 and not depend on the Merge mode compared to the motion threshold used for the Merge candidate derivation. Based on the list of maximum 9 first non-duplicate positions, the ARMC process is applied and only the first temporal candidate is added in the traditional list of Merge candidates if it is not duplicate compared to previous candidates.

In the same way the non-Adjacent spatial candidates are derived among 59 positions. The first list of non-duplicate candidates which can reach 18 candidates is derived. But the Motion Threshold is different to those used in for temporal derivation and for the rest of the list and doesn't depends on the regular or template Merge modes. It is set equal to the mv the of BDMVR. Up to 18 non-adjacent candidates are reordered and only the 9 first non-Adjacent candidate are kept and added in the Merge candidates list. Then the other candidates are added except if the list contain already the maximum number of candidates. In addition, for the TM Merge mode the maximum number of candidates in the list MaxCandInitialList is higher than the maximum number of candidates that the final list can contain Maxcand.

Then the ARMC process is applied for all candidates of the intermediate list, containing MaxCandInitialList, as depicted in FIG. 19. The maximum number of candidates Maxcand are set in the final list of candidates.

A similar modification is applied also for the BM Merge mode as the template matching Merge mode.

ARMC Template Cost Algorithm

Figure 17:
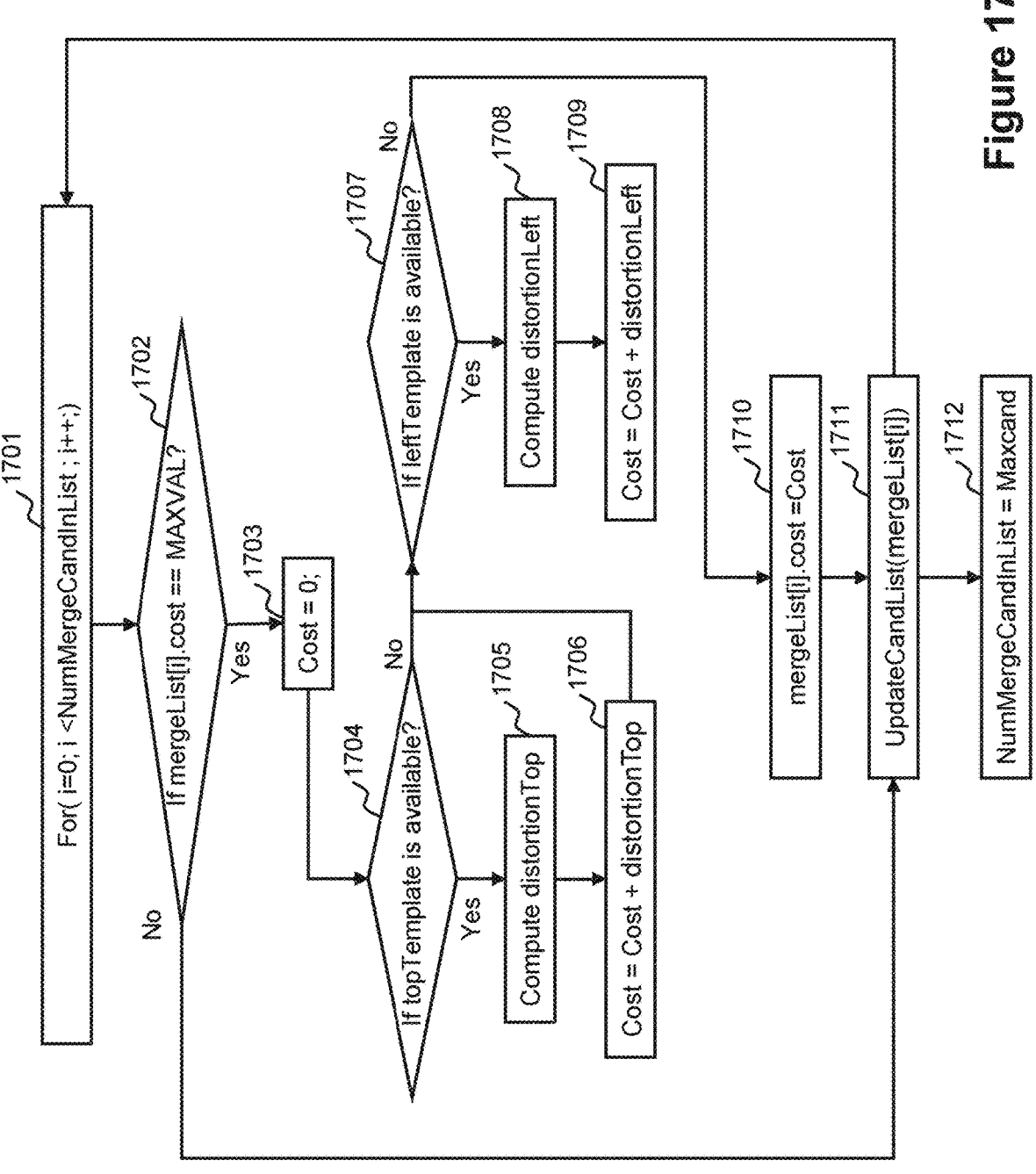
FIG. 17 illustrates the costs determination of a list candidates.

FIG. 17 illustrates the template cost computation of the ARMC method. The number of candidates considered in this process, NumMergeCandInList, is greater than or equal to the maximum number that the list can contain Maxcand (1712).

For each candidate in the list (1701), if the cost was not computed during the first ARMC processes for temporal and non-adjacent candidates (1702), the cost is set equal to 0 (1703). In the implementation a cost non computed associated to a candidate "i", mergeList[i].cost, was set equal to the maximum value MAXVAL. If the top template for the current block is available (1704), the distortion compared to the current block template is computed (1705) and added to the current cost (1706). Then or otherwise, if the left template for the current block is available (1707), the distortion compared the current block template is computed (1708) and added to the current cost (1709). Then the cost of the current Merge candidate, mergeList[i].cost, is set equal to the computed cost (1710) and the list is updated (1711). In this example we consider that the current candidate i is set to a position regarding its cost compared to the cost of the other candidates. When all candidates have been proceeded the number of candidates in the list, NumMerge-CandInList, is set equal to the maximum number of possible candidates in the list Maxcand.

Figure 20:
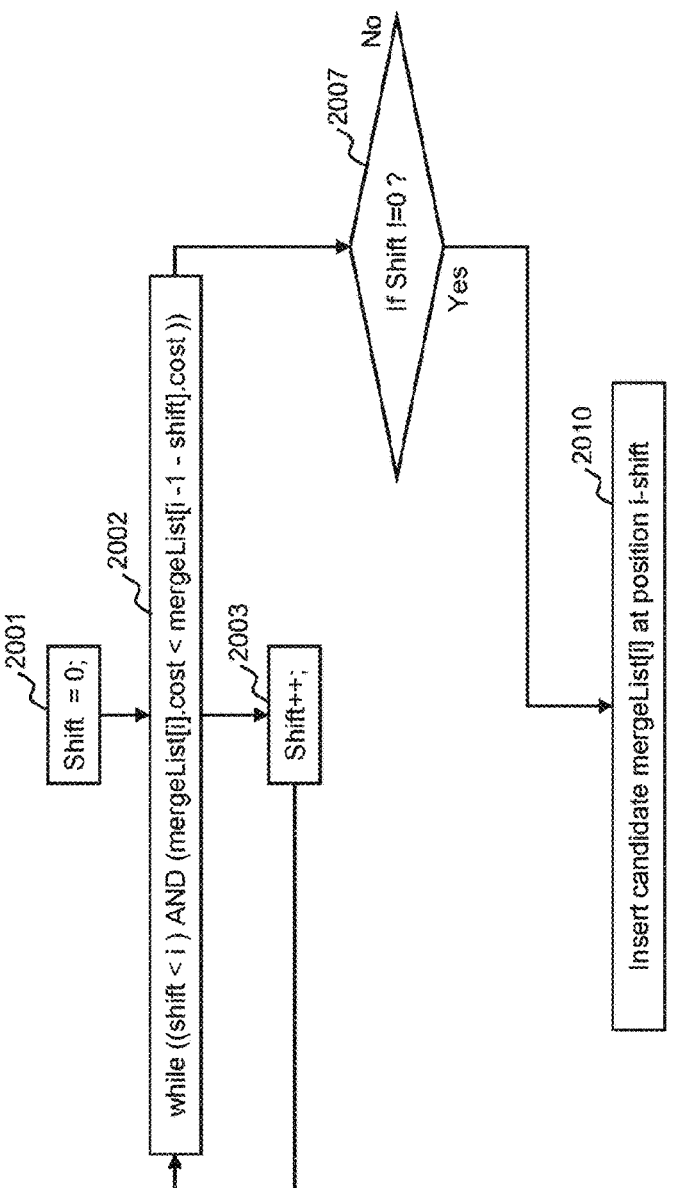
FIG. 20 illustrates the ordering process of predictors based on distortion values.
Figure 22:
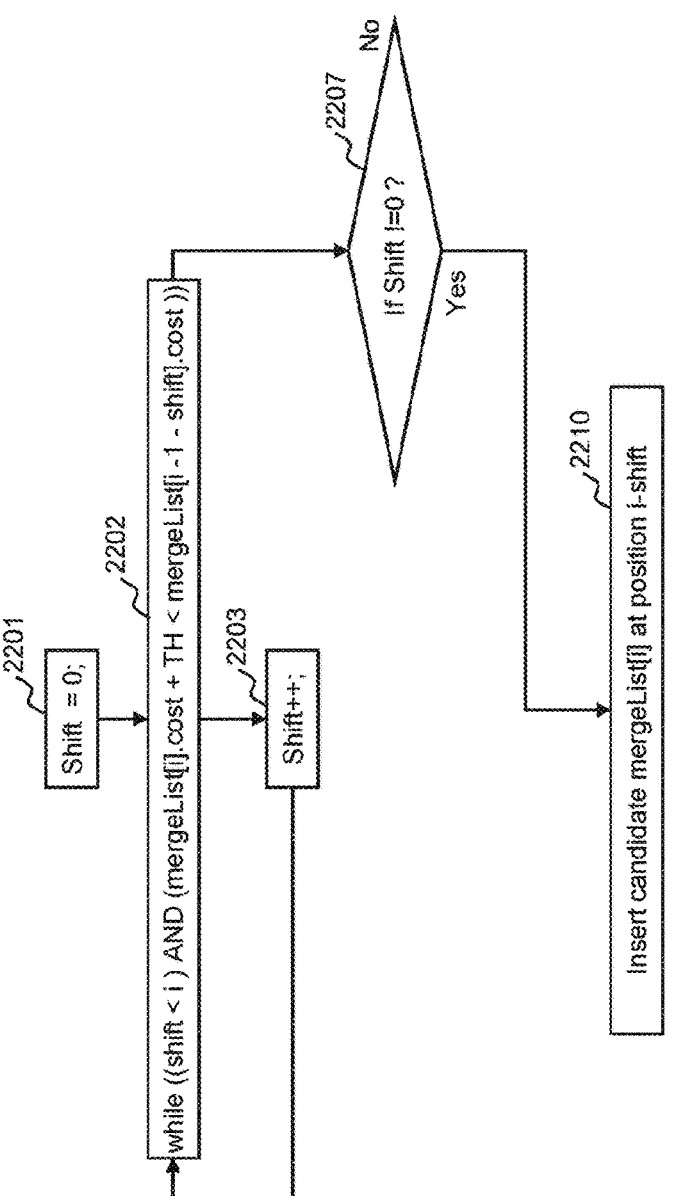
FIG. 22 illustrates one reordering process of predictors based on distortion values of an embodiment of the present invention.

FIG. 20 shows an illustration of the update of candidate list (1710) of FIG. 17. First a variable Shift is set equal to 0. Then while the Shift is less than to the current candidate i of the FIG. 17 and that the related cost of the current candidate is less than the cost of the previous candidate number i−1-shift, (2002) the variable shift is incremented (2003).

When this loop is finished and if the variable shift is different to 0 (2007), a candidate number i is inserted at the position i-shift (2010).

Multiple Hypothesis Prediction (MHP)

The Multiple Hypothesis Prediction (MHP) was also added in the ECM. With this method it is possible to use up to four motion-compensated prediction signals per block (instead of two, as in VVC). These individual prediction signals are superimposed in order to form the overall prediction signal. The motion parameters of each additional prediction hypothesis can be signalled either explicitly by specifying the reference index, the motion vector predictor index, and the motion vector difference, or implicitly by specifying a Merge index. A separate multi-hypothesis Merge flag distinguishes between these two signalling modes.

For spatial candidates, non-adjacent Merge candidates and history based Merge candidates, the multiple hypothesis parameters values 'addHypNeighbours' are inherited from the candidate.

For temporal candidates, and zero candidate and pairwise candidate, the multiple hypothesis parameters values 'add-HypNeighbours' are not kept (they are clear).

LIC

In the ECM, the Local Illumination Compensation (LIC) have been added. It is based on a linear model for illumination changes. The linear model is computed thanks to neighboring samples of the current block and the neighboring samples of the previous blocks.

In the ECM, LIC is enabled only for unidirectional prediction. LIC is signaled by way of a flag. For the Merge modes no LIC flag is transmitted but instead the LIC flag is inherited from the merge candidates in the following manner.

For spatial candidates, Non-adjacent merge candidates and history-based Merge candidates the value of the LIC flag is inherited.

For temporal candidates, and zero candidates the LIC flag is set equal to 0.

Figure 16:
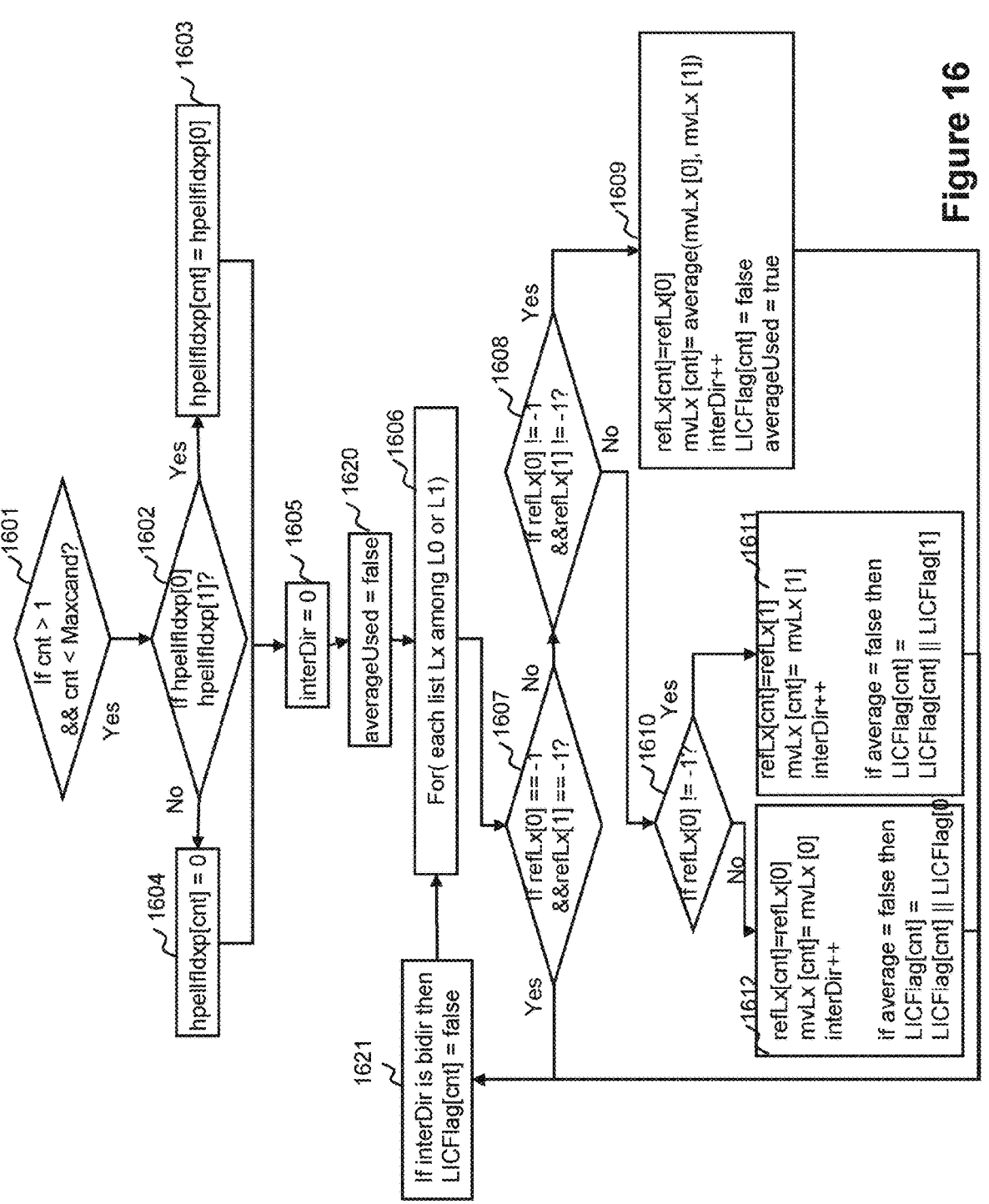
FIG. 16 illustrates a modification of the derivation of a pairwise candidate shown in FIG. 12.

For pairwise candidates, the value of the LIC flag it is set as depicted in FIG. 16. This figure is based on FIG. 12 and modules 1620 and 1621 have been added and modules 1609, 1612 and 1611 have been updated. A variable average is set equal to false (1620), if for the current list the average for the pairwise have been computed the LIC flag for the pairwise LICFlag[cnt] is set equal to false and the variable averageUsed equals to true (1609). If only candidate have a motion information for the list (1612 1611) the LIC flag is updated if the average wasn't used. And it is set equal to a OR operation with its current value and the value of the LICflag of the candidate.

And when the pairwise candidate is Bidir (e.g. equal 3) the LIC flag is equal to false.

However, the algorithm as shown in FIG. 16 only allows the LICflag to be equal to something different to true if the 2 candidates have motion information for one list and each candidate has its own list. For example, the candidate 0 has motion information for L0 only and Candidate 1 has motion information for L1 only. In that case the LIC flag can be equal to something else different to 0 but as LIC is only for uni-direction it will never happen. So the LIC flag for the pairwise is always equal to false. Consequently the pairwise candidate can't use LIC when it is potentially needed. So this reduces the efficiency of the candidate and avoid the propagation of LIC for the following coded blocks and consequently decreases the coding efficiency.

Furthermore, the duplicate check in the ECM software introduces some inefficiencies. As depicted in FIG. 14 and FIG. 15, each candidate is added in the list and the duplicate check (1440, 1441, 1442, 1443, 1444, 1445, and 1530) has an impact only on the increment of the variable cnt (1405, 1409, 1413, 1417, 1423, 1427, 1508). In addition, as described in FIG. 16, the variable BCWidx is not initialized for the pairwise candidate. Consequently, if the last candidate added in the list was a duplicate candidate, the value BCWidx for the pairwise candidate is the value of this previous duplicate candidate. This was not the case in VVC as candidates are not added when they are considered as duplicate.

Embodiments

In one embodiment, when a list of predictors is ordered according to cost values computed for each predictor, this cost value includes a threshold and a cost computed based on decoded samples to obtain the cost which will be compared. So, the cost is computed based on samples which are not the original block or in the final decoded samples of the current block.

This embodiment consists in changing the module 2002 of the FIG. 20 by the "while ((shift<i) AND (merge List[i].cost+TH<mergeList[i−1−shift].cost))" where a threshold TH is added.

FIG. 21 illustrates an alternative embodiment; this figure is based on FIG. 20. In this figure, the condition for the loop (2102) is the same as FIG. 20. When the Shift value has been determined (2102) (2103), and, if the cost for the current candidate mergeList[i].cost plus a threshold TH is superior or equal to the cost of the candidate at the position i−1-shift (2108), the candidate will not (2109) be inserted at the position i-shift (2110). So, the current candidate keeps its position even if its cost, mergeList[i].cost, was better.

Alternatively, and mathematically equivalently, in one embodiment, when a list of predictors is ordered according to cost values computed for each predictor, the difference value or the absolute difference value between two costs is compared to a threshold. The cost includes a cost based on samples which are not the original block.

This embodiment is illustrated by the FIGS. 23 to 28. For example, in FIG. 23, the absolute value between costs are computed (2305) to determine if the candidate needs to be set to another position.

The advantage of these embodiments is that the candidates can be re-ordered to improve the diversity in the ordering of the candidate list, thereby increasing the likelihood that an earlier candidate in the list is selected which results in a coding efficiency improvement.

In one embodiment, when a list of predictors is ordered according to cost values computed for each predictor, and among this initial list of candidates some candidates will be removed, this cost value includes a threshold and a cost computed based on decoded samples to obtain the cost which will be compared. So, the cost is computed based on samples which are not the original block or on the final decoded samples of the current block.

This embodiment can be obtained by modifying FIG. 21, in order that the candidate doesn't reach the condition defined with the threshold TH (2108), is set at the end of the list or completely removed from the list. To set a candidate at the end of the list the Shift value is set equal to −Maxcand+1+i (2109) and the candidate mergeList[i] is inserted at position i-shift (2110), so at position Maxcand−1.

Alternatively, and mathematically equivalently, in one embodiment, at least one candidate is removed from the list according to cost value, computed for each predictor, the difference value or the absolute difference value between two costs is compared to a threshold. The cost includes a cost based on samples which are not the original block.

The advantage of these embodiments is that candidates which do not provide sufficient diversity in terms of costs can be removed or moved to end of the list as it is unlikely to be selected, this optimizes the ordering of the list which results in a coding efficiency improvement.

The list of predictors can be Intra or Inter.

Some Criteria which May be Applied

In one embodiment, at least one syntax element in the bitstream is associated to the list of predictors and this ordering influences the value of the syntax element. So, when the ordering is applied and when this ordering is different to the ordering without considering the cost, the syntax element value associated to the list of predictors can be different.

The advantage is a coding efficiency improvement as the predictors are ordered according to some correlations between these predictors and data representing the current block which is generally more efficient than a preordering.

In one embodiment, each predictor of the list represents a value of a syntax element. For example, the method is applied to Sign MVD prediction method for the motion vector residual coding of Affine, regular and SMVD inter modes. For these modes the reordered list is used by one or more syntax elements.

In one embodiment, some predictors of the list represent an index. This embodiment corresponds to Merge index coding of MVD coding of the Merge MMVD and Merge Affine MMVD method, or to the classical Merge index coding of Merge modes including IBC and GEO modes. In the same way, the index of inter predictors as inter mode (AMVP), affine, IBC, SMVD can be also considered. This embodiment can be applied also for the TIMD intra mode where a list of predictors is reordered. Especially, the number of reordered candidates is higher than the maximum possible index value that the syntax element is able to signal. This means that MaxCandInitialList is superior to Max-Cand.

Possible Cost Computation

The accuracy of the process of determining the relative 'cost' of the candidates at the decoder side is a determiner of how effective the reordering process is. The following embodiments provide improvements to the cost determination process which result in a more accurate list, a lower complexity of calculating cost, or both.

It is important to note that the algorithm for performing the reordering based may be altered to prioritize either accuracy or complexity (speed) of the reordering process.

The embodiments below aim to produce an accurate indication of the relative cost while minimizing the overall complexity of the operation.

In one example, the reordering is based on cost which includes a measure between samples. A sample associated with each candidate is compared to another sample to produce a relative measure of the cost.

For example, the cost for a candidate can be computed based on neighboring samples of that predictor's block and the neighboring samples of the current block. Such samples are readily available at the decoder side.

The cost can be computed between the samples of two block predictors corresponding to the candidates in the list. For example, when a candidate is a bi-prediction candidate, the cost can be the distortion between the two block predictors. Bi-prediction candidates are discussed in more detail below.

The cost can also be computed compared to another predictor candidate. For example, one other predictor candidate can be a most probable candidate or predictor. The cost of a candidate is computed thanks to its samples and the samples of this most probable candidate.

The cost can be computed on a sub-set of neighboring samples or a sub-set of samples of the predictors. For example, if there are a plurality of neighboring samples that could be used to determine a cost, these are sampled so as to decrease the complexity of the calculation.

The cost can be computed based on samples corresponding to an image from another resolution. A high similarity with an image from a higher resolution is a good indication of a low cost (i.e. a good predictor).

The values of samples used to compute cost can be pre-processed. Given that only relative cost values are required (i.e. only the order is important) pre-processing values means a simpler calculation and is unlikely to significantly affect the efficacy of the reordering process. Depending to the pre-processing, the costs computed improves the reordering process.

In the above examples, the cost could be a measure of distortion such as Sum of Absolute Difference (SAD), Sum of Absolute Transformed Differences (SATD), Sum of Square Errors (SSE) or Structural Similarity Index Measure (SSIM).

Alternatively, the cost is a measure of distortion and a weight can be applied to this distortion. A rate or estimated rate can be also considered. Or a threshold.

The cost may also be a weighted cost where the weight differs in dependence on the type of predictor or candidate, or the candidate's initial position in the list.

In an embodiment, the cost is proportional to a number of samples.

For example, the number of samples is the number of samples for the current blocks, and the distortion (cost based on sample values) is divided by this number.

In an alternative embodiment, the number of samples is the number of samples used in the computation of the distortion or the number of comparisons in the distortion. And the distortion (cost based on sample value) is divided by this number.

In one embodiment the cost based on sample values, is divided by the number of comparisons for the distortion and multiply by the number of samples is the block.

For example, for the template matching with the up line and left row of the block, (only one sample for the line and the row), the cost associated to a candidate I, mergeList[i].cost, is set equal to mergeList[i].cost=((height×width)×mergeList[i].cost)/(height+width)

The advantage of this embodiment is that a cost proportional to the block size, consequently, the parameters for the criterion is adaptable to all block sizes. More precisely, this offers a more efficient usage of the lambda value as defined in the following embodiments.

Further Criteria

In one embodiment the threshold is a lagrangian parameter Lambda ($\lambda$) as used in the rate distortion criterion $J=D+\lambda R$. The rate distortion criterion is used at encoder side to determine the best coding possibility for a block or more generally to select a best coding possibility among a set coding possibilities.

This embodiment offers a significant coding efficiency improvement. If we consider two candidates or predictors cand1 and cand2 which have respectively their distortion D1 and D2. And if D1>D2 but their RD cost J1 and J2 are J1<J2 we can consider that these candidates are too close or to redundant in the RD sense as the rate to signal cand2 is higher than its distortion benefit. This can be writing as:

$$J1 < J2$$
$$\Leftrightarrow D1 + \lambda R1 < D2 + \lambda R2$$
$$\Leftrightarrow D1 - D2 < \lambda(R2 - R1)$$
$$\Leftrightarrow (D1 - D2)/(R2 - R1) < \lambda$$

As many indexes in video codec used an unary max code. We can consider that R2−R1=1. So D1−D2<$\lambda$. So, we can consider that cand1 and cand2 are redundant if |D1−D2|<$\lambda$ or D1<D2+$\lambda$ So, in this embodiment, a candidate is considered as redundant when the absolute value between distortions of the current candidate and another candidate is inferior to lambda.

This embodiment is illustrated in FIGS. 21 to 28. For example, in FIG. 23, the min absolute distortion difference (2305) is compared to the lambda value (2308).

This formula is particularly efficient and also when the rate difference between a candidate and its previous candidate is not 1.

The previous embodiment doesn't consider the rate difference between two candidates/predictors to determine if they are redundant. So, to improve the coding efficiency this rates difference is computed to determine if a candidate is redundant compared to another one. This embodiment is useful when the syntax element related to the list of candidates/predictors is coding with something else than an unary code. For example, the merge Motion difference of the regular MMVD or Affine MMVD are coded with a Golomb code. In that case, the number of bins or bits difference between one index value and its following index value can be 0, 1, 2 or more.

In an additional embodiment, the real rate is considered. So, the real rate when using CABAC is taken into account. In that case this embodiment can be applied also when the index is coded with a unary max code.

This embodiment can implemented by changing the lambda value in FIGS. 23 to 28 by $\lambda(R2-R1)$ or changing the cost for a candidate by adding lambda multiply by the rate. Similarly, for FIGS. 20 to 22, the criterion can be D2+$\lambda$×R2<D1+$\lambda$×R1 or D2+$\lambda$(R2−R1)<D1, where D2 is mergeList[i].cost. (In FIG. 20 the criterion in the loop (2002) look for a candidate better than the current one. But the criterion to determine if a candidate is redundant is D1<D2+$\lambda$(R2−R1). For example, this embodiment consists in changing the module 2002 of the FIG. 20 by the "while ((shift<i) AND (mergeList[i].cost+TH*mergeList[i].rate<mergeList[i−1−shift].cost+TH*mergeList[i−1−shift].rate))"

In one embodiment, when the candidates are reordered after a first ordering, as described in FIGS. 23 to 28, the criterion used to determine that a candidate is redundant (2305) includes a multiplication of the threshold of one distortion for example D2–Th.D1<0 or alternatively Th.D2–D1<0 or Th2.D2–Th1.D1<0.

The advantage of this embodiment is coding efficiency improvement. Especially, this criterion is able to adapt the redundancy of two candidates based on the proportionality of distortions. Thanks to this criterion, two candidates with small distortions are not considered as redundant. In opposite two candidates with high distortions will be considered as redundant more frequently, than with the previous criterion.

In one embodiment, the criterion includes at least one threshold which balances the 2 distortions and a threshold is added. For example, the criterion as defined previously becomes: |D2–Th.D1|–λ<0 or alternatively |Th2.D2–Th1.D1|–λ<0.

The advantage of this embodiment is coding efficiency improvement for some cases, where a penalty on a distortion for some candidates gives a coding efficiency improvement. For example, this penalty depends on a distance of the current block and the type of the candidate.

Lambda Settings

The lambda value, in encoder implementation, depends on several parameters which have an impact on the compromise between distortion and rate as well as how the distortion is computed and how the rate is estimated.

In one embodiment the lambda depends on one or more parameters and the value of lambda is computed at decoder side. The advantage is that no additional rate is needed to transmit the lambda value.

In one embodiment, the lambda value (or threshold value) is derived or obtained at encoder side and transmitted at decoder side (in the bitstream).

The advantage of this embodiment is that the encoder implementation can set a lambda value which corresponds more to the implementation or to the sequence type.

In an embodiment, the lambda used at decoder side or transmitted depends on the QP value used for the current slice or picture. In a further embodiment when the QP is set at block level the lambda value is adapted at block level based on the block QP value. The QP value is the most important parameters which influences the quality of the reconstructed blocks with block residual and consequently to the rate distortion compromise.

In an embodiment, the lambda used at decoder side or transmitted depends on the Picture Order Count distances or the temporal distance between the current frames and its reference frame. As some modes, as the regular Merge mode, the POC distances for one candidate can be different than one another. So, it is preferable when several POC distances are possible to consider the minimum POC or minimum temporal distance between the current frame and its reference frames. The temporal distance between the current frame and its reference frames or to the closest reference frame influences the quality of the block predictor. Consequently, it influences the reconstructed block quality with and without block residual.

In an embodiment, the lambda used at decoder side or transmitted depends on temporal ID. In many video coding standards, a frame has a temporal ID indicating the depth for the temporal scalability. So, this temporal ID can influence the quality compromise needed for a frame, so the lambda can depend also on this parameter.

In an embodiment, the lambda used at decoder side or transmitted depends on the temporal direction. The temporal direction means that the reference frames come from the past or from the future or from both directions. It is known that when the block predictors coming from the both directions, in average, the quality of the inter predictors is better. So, it has an influence on the rate distortion compromise. As some modes, as the regular Merge mode, the temporal direction of one candidate can be different to one another, it is preferable that the lambda depends on the high number of temporal direction, so, from one temporal direction or from 2 temporal directions.

In an embodiment, the lambda used at decoder side or transmitted depends on the uni-prediction or bi-prediction. It is known that when the block predictor coming from two block predictors, in average, the quality of this predictor is better even if the two reference blocks come from both the same temporal direction. So, it has an influence on the rate-distortion compromise. As in some modes, such as the regular Merge mode, one candidate can be bi-predicted and one another uni-predicted, it is preferable that the lambda depends on the whether the bi-prediction may or may not be used.

In one embodiment, the lambda used at decoder side or transmitted depends on the QP values of the reference frames of the current slice. In an embodiment, to avoid complex lambda settings for some modes, it depends on the QP value of the closest reference frame in each or both directions or on the minimum QP value of each reference frame direction. When combined with previous embodiment it can depend on the difference between the QP value of the QP selected for the reference frame. The QP of reference influence the quality of the reference and consequently the QP of the current frame so the it influences the rate distortion compromise.

In an embodiment, the lambda used at decoder side or transmitted depends on the measure of distortion used. It is known that the lambda depends on the distortion (SAD, SSE, etc. . . . ) used at encoder side. So, for decoder side, lambda depends also on the distortion's type.

In an embodiment, the lambda used at decoder side or transmitted depends on the type of samples used to compute the distortion. Indeed, as described previously, the criterion can be applied for different reordering or removing algorithms based on different type of samples. This can also be considered to set the lambda value. As, for example, the template matching uses less samples than the current block so the distortion is computed for less samples so can be taken into account.

As also mentioned previously an alternative to this embodiment is to adapt the distortion according to the number of samples.

In an embodiment, the lambda used at decoder side or transmitted depends on the type of prediction. At encoder side, the lambda value can depend on the type of prediction Intra/Inter, the lambda used at decoder side depends also on this characteristic.

In an embodiment, the lambda used at decoder side or transmitted depends on GOP configuration type. For example, the Lambda can be shifted or be a lambda based upon another QP than the QP of the current frame depending on the type of the configuration as Random-Access configuration RA or Low Delay configuration or Intra only configuration.

In an embodiment, the lambda used at decoder side or transmitted is based on the lambda formula used at encoder to select among the best candidate/predictors etc of the list and is used at decoder side. The formula used may be signalled in the bitstream to the decoder e.g. by an index which indicates which formula to use from a predetermined list of available formulae to calculate lambda.

It is noted that in other embodiments the threshold or lambda value may depend on a combination of any of the factors above, which can be optimally introduced to provide the best balance of coding efficiency and complexity.

One possible implementation of setting a correct lambda is to use a traditional formula to derive it which generally depends on the QP value and shift this QP value according to the parameters as defined previously. In a particular example, which gives significant gain, the lambda formula used to select among the best merge candidate is used. When the current frame is in Random Access configuration, the lambda formula is set with QP-4. Where QP is the QP for the current slice/frame. And when the frame is in low delay configuration the QP value used to obtain the lambda value at decoder is the current QP.

Of course, the lambda can be stored in a predefined table instead of using a formula. In that case each value of the table is related to a QP value.

Threshold (TH) is not Lambda

As described for the previous embodiments, the lambda value is theoretically a good value to be be used for the criterion but it depends on several parameters and relates to the encoder implementation. So in other embodiments another value may be used as the threshold value.

Figure 25:
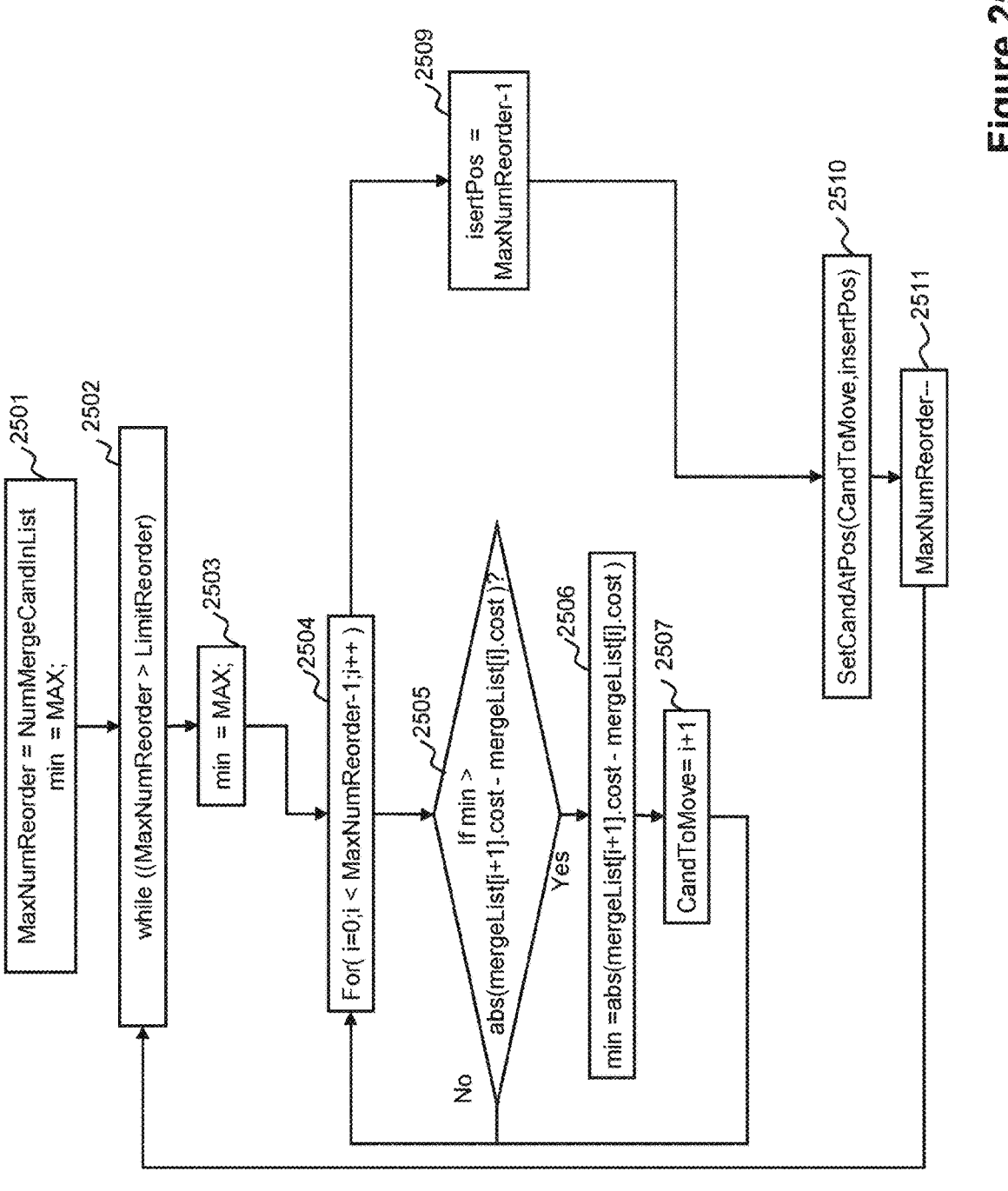
FIG. 25 illustrates one reordering process of predictors based on distortion values of an embodiment of the present invention.

In an embodiment, the threshold is the minimum value as depicted in FIG. 25, which is described below under the heading 'Algorithms'

In an embodiment, the threshold value is computed based on the cost values of all candidates (NumMergeCandInList) or according to the first Maxcand candidates.

In an embodiment the threshold value is the average of differences between distortions of each candidate compared to its previous one. With this criterion all algorithms related to the FIGS. 21 to 28 are valid and the 2 value or TH value is replace by this average.

The advantage of these embodiments is that the Threshold value doesn't depend on several parameters or needed to be transmitted.

Possible Algorithms

The algorithm to reorder a list based on the defined criterion or to remove candidates based on the criterion can be made specific as the cost is computed at decoder side from samples which are not the samples of the current block and further each mode has its specificities.

In one embodiment, the criterion of the invention is applied during the ordering process as described FIG. 20 this consist of changing the criterion of the loop. In a further example of an implementation, FIGS. 21 and 22 also relate to this embodiment.

The advantage of this embodiment is the small impact on the complexity as only one loop is needed to apply the proposed criterion.

Figure 23:
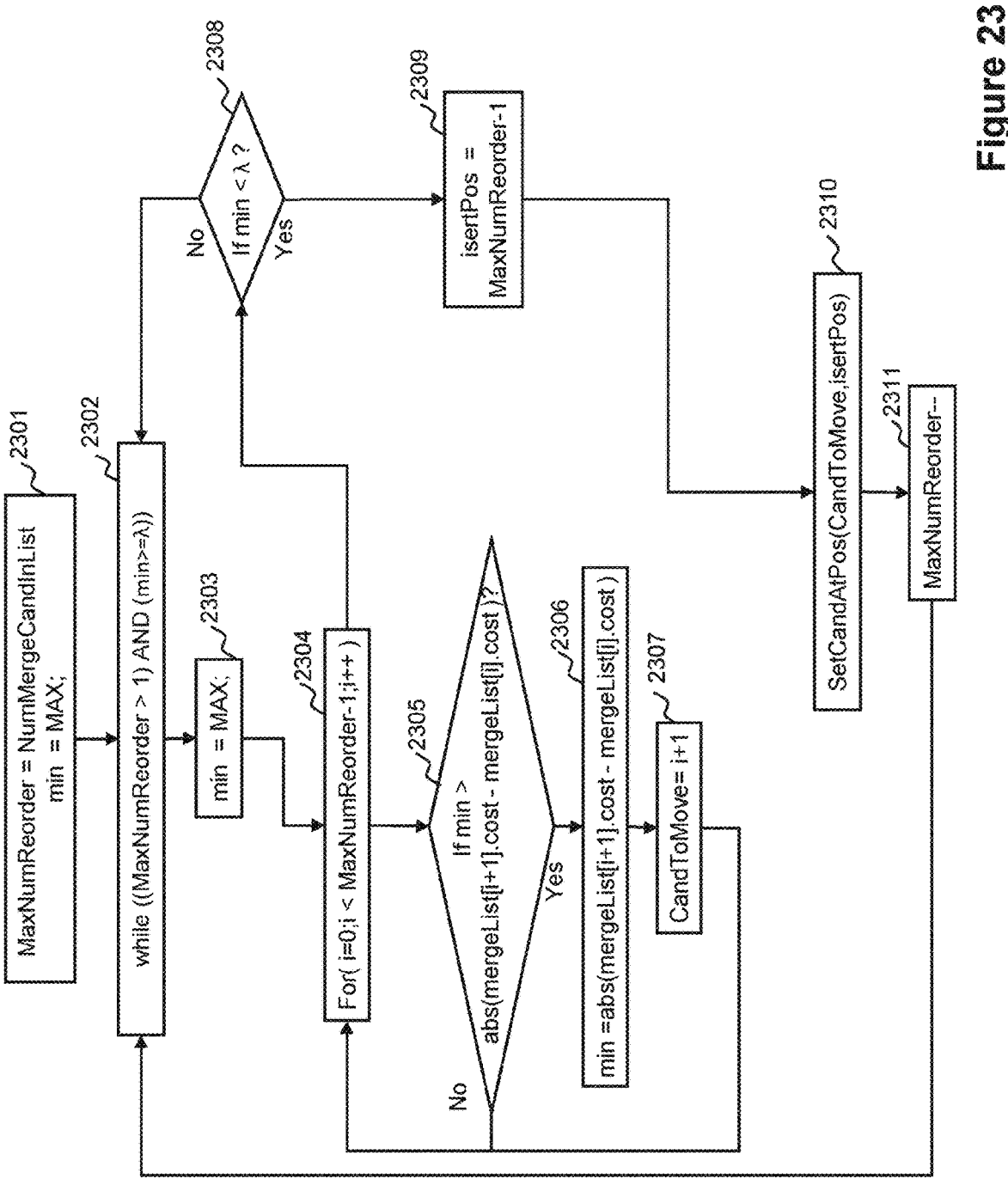
FIG. 23 illustrates one reordering process of predictors based on distortion values of an embodiment of the present invention.

FIG. 23 illustrates one algorithm applied after a first ordering based on the cost. So, at the beginning of this algorithm all candidates of the list are ordered according to their cost/distortion. For example, after the ARMC method. The list of candidates contains NumMergeCandInList candidates and NumMergeCandInList can be greater than or equal to the maximum number of candidates used in the final list Maxcand.

In this figure, the number of reordering MaxNumReorder is limited to the number of candidates in the list NumMerge-CandInList minus one (2301) (2302). The algorithm is applied while the number of possible reorderings is greater than 1 and the minimum difference between a candidate and its following candidate is greater than or equal to the lambda (threshold) value as defined in the embodiments (2302), for example. The minimum cost difference between a candidate i and its followed candidate i+1 (2304) (2305) (2306) is determined and the variable CandToMove is set equal to this following candidate i+1. This candidate is considered as redundant compared to its predecessor. If this minimum cost is inferior to the lambda (threshold) (2308), this candidate is moved (2310) from its position to the position MaxNum-Reorder−1 (2309). So, the candidate is set at a farthest position but before previous candidates considered as redundant by the algorithm. Then the MaxNumReorder is decremented.

This algorithm can be summarised as:

Determine the minimum cost difference between 2 consecutive candidates.

If this minimum difference is smaller than Lambda (or other threshold), set this candidate at a farthest position in the list (and particularly before previous candidates considered redundant by the algorithm)

FIG. 29 gives an example of the reordering obtained by this algorithm. In this example, lambda (i.e. a threshold) is set equal to 16. At beginning of the first step, 'Step 1', a list of 6 merge candidates are ordered according their costs (mergeList[i].cost), form the lowest one 2264 to the highest one 2750. Then the absolute cost difference between each candidate and its predecessor is computed (2305) and the minimum is identified (2306). In this example of FIG. 29, the minimum absolute cost difference is 5 (min=5) in Step 1, and the related candidate CandToMove is the candidate index i=4. This cost, 5, is less than the lambda value equal to 16 (2308). Consequently, the candidate index 4 is moved the end of the list in 'Step 2', and MaxNumReorder is decremented. So, this candidate will not be considered for the second step of the loop. In Step 2, the list considered contains 5 candidates and the minimum absolute costs difference is 8 corresponding to the merge candidate index i=1. This candidate is inserted at position 4 in the merge candidate list for step 3 and not considered for step 3. During, 'Step 3', the minimum absolute cost difference is 18 which is greater than the lambda value 16 (2308) so the algorithm stops as defined in (2302). As the end of Step 3, the merge list candidates are not ordered according to their cost values (from minimum to the maximum) but according to the algorithm which provides an improvement in diversity by moving candidates which may be redundant (due to their similarity in terms of costs to other candidates) towards the end of the list. More specifically, the redundant candidate is moved to a position that follows a candidate, so far, considered to be non-redundant.

One advantage of this embodiment compared to the embodiment of FIG. 21 is that the redundancy is ordered based on the most redundant candidates. Another advantage is that this reordering firstly removes redundant candidates by setting at the end according to this redundancy, and then the less redundant candidates are in the final set. Moreover, the number of removals/reordering is also limited. So, it produces a coding efficiency improvement compared to the embodiment as FIG. 21. But this needs a second reordering process which introduce more complexity.

In another embodiment, MaxNumReorder is not set equal to the number of candidates but it is set the Maxcand or alternatively to a smaller value. Indeed, when the list is significantly large (NumMergeCandInList) compared to the number of candidates that have an index (Maxcand), the proposed reordering set candidates which are not efficient. So, it is preferable to limit the possible reordering to a small number of values. For example, the Merge MMVD with ARMC, the list of MVD positions contains 96 candidates, and the maximum index to signal the MVD is only 12. So, in that case it is preferable to use MaxNumReorder set equal to 12.

FIG. 25 illustrates, in an embodiment, an alternative algorithm to the algorithm of FIG. 23. In this algorithm there is no comparison to the lambda/threshold (2502) and the minimum cost difference in contrast to the previous embodiment. The most redundant candidate, CandToMove, is always inserted at the end of the list. To obtain coding efficiency, the maximum number of possible reorderings MaxNumReorder is limited (2502) by a variable LimitReorder compared to the embodiment of FIG. 23. So, in that case, only LimitReorder reorderings can be applied. Please note that this embodiment is similar to FIG. 23 with a lambda/threshold set equal to a maximum value always greater than the possible absolute difference between 2 distortions.

The advantage of this embodiment is that the lambda value doesn't need to be derived or transmitted at decoder side, so it is adapted to all encoder selection algorithms. But the coding efficiency is decreased. Yet for some modes, this limitation is efficient.

In an alternative embodiment to the embodiment of FIG. 23, the algorithm only removes candidates. This can be achieved by modifying the criterion of the loop (2302). In that case the loop stops when MaxNumReorder is greater than or equal to Maxcand instead of 1. Additionally, for better coding efficiency, the minimum distortion difference (2304) (2305) (2306) (2307) is determined only in the first part of the list. For example, the candidates which will be (currently) in the final list (Maxcand). This can be achieved by changing the criterion of 2304 and by limiting i to Maxcand.

Only removing candidates is not efficient, on average, compared to the reordering and removal as described for FIG. 23, except if it influences the maximum number of candidates in the final list Maxcand.

In one embodiment the candidates considered as redundant are removed from the list and the maximum value of the final list is consequentially decreased.

Figure 24:
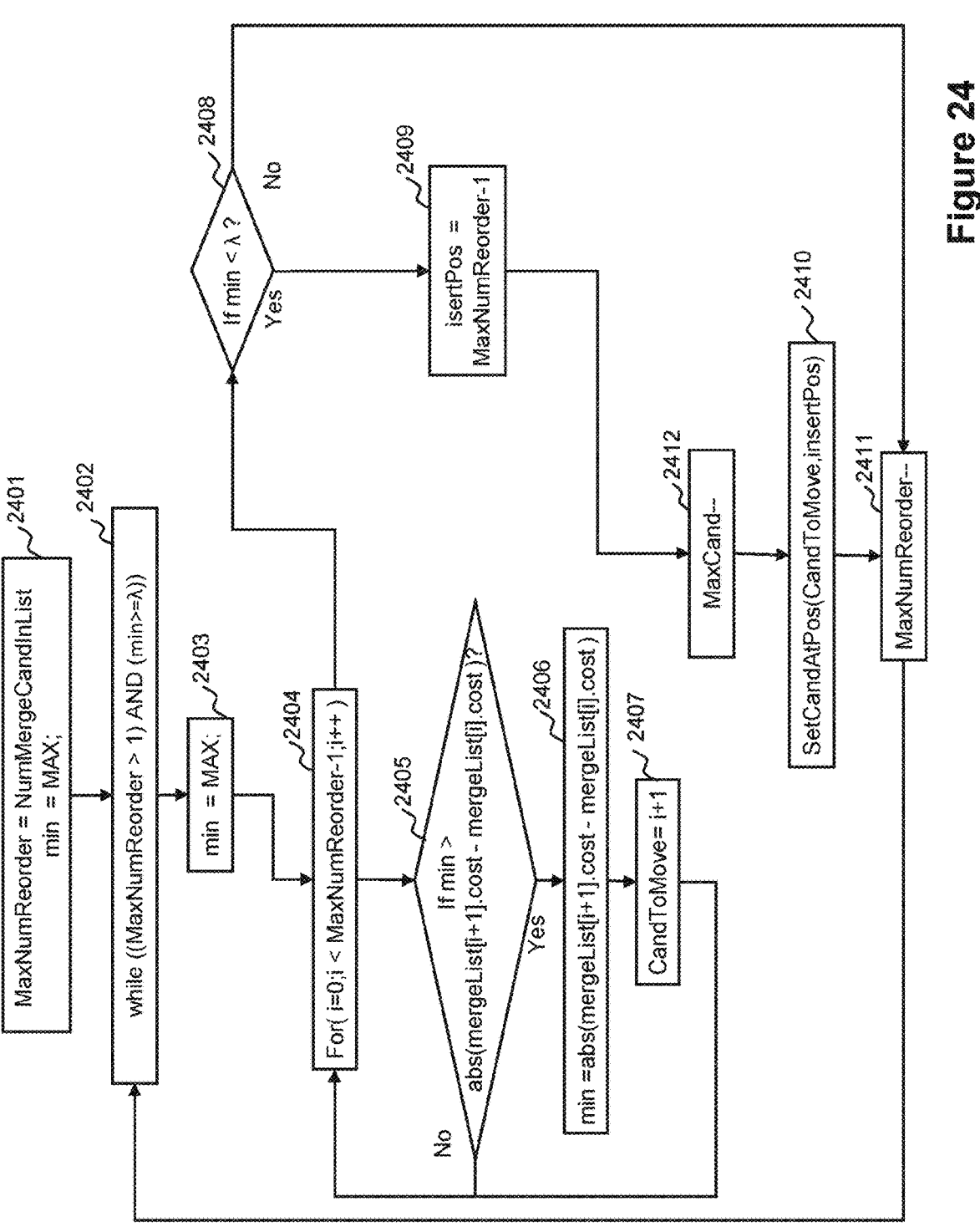
FIG. 24 illustrates one reordering process of predictors based on distortion values of an embodiment of the present invention.

FIG. 24 illustrates this embodiment, in this figure similar to FIG. 23, the maximum number of candidates in the final list, Maxcand, is decreased (2412) each time that a candidate is set at the end of the list (2410). This is particularly efficient when the related syntax element is not coded with a unary max code or when Maxcand value is small. But this creates a parsing issue as the decoder needs a full reconstruction to parse the related syntax elements.

Figure 26:
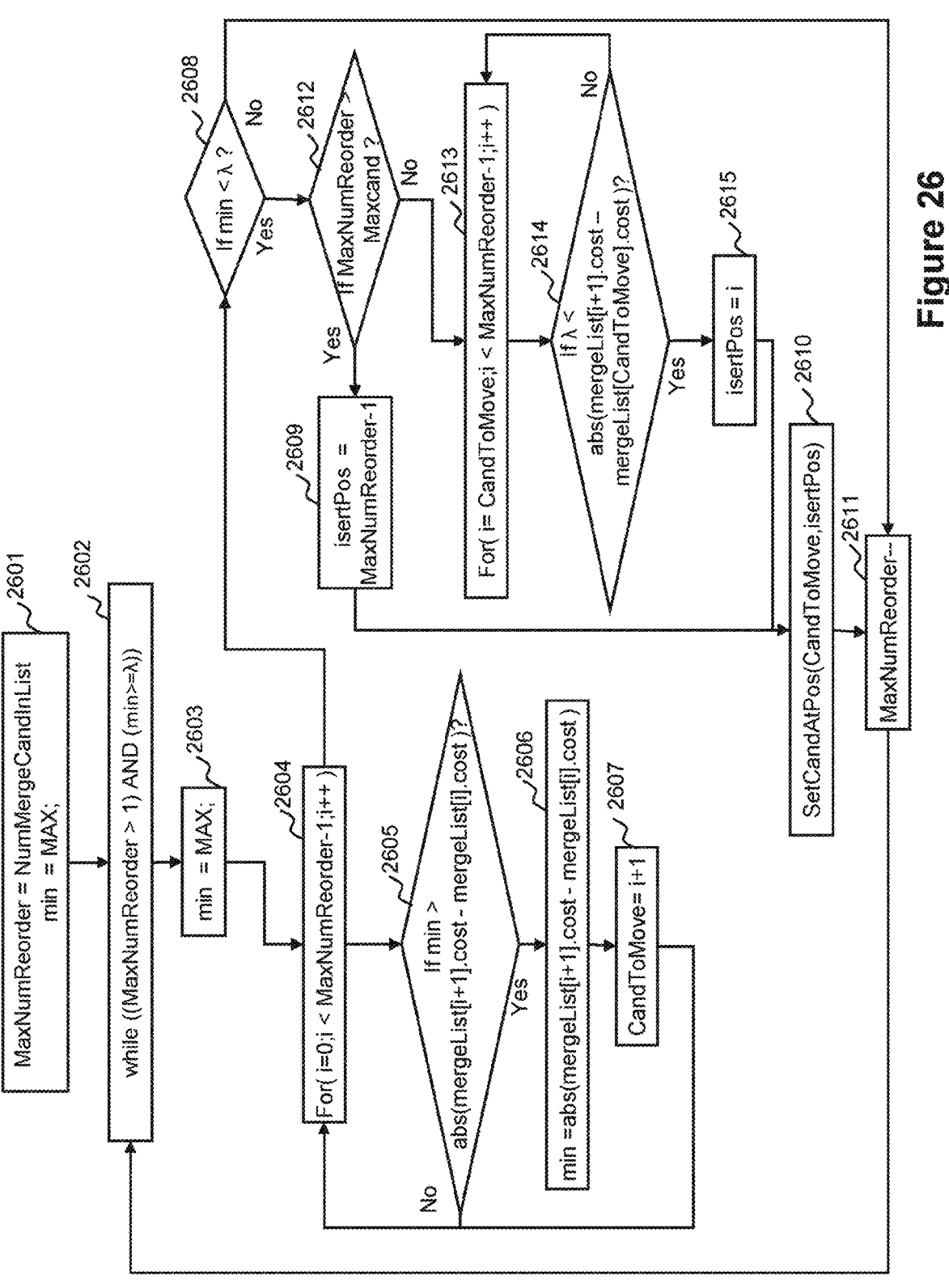
FIG. 26 illustrates one reordering process of predictors based on distortion values of an embodiment of the present invention.

FIG. 26 illustrates one alternative algorithm to the algorithm of FIG. 23. Compared to FIG. 23, the position where the redundant candidate is inserted is not always the MaxNumReorder−1 (2309) but the first position where the candidate becomes non-redundant (2613) (2614) (2615). This is achieved by identifying among candidates after the current redundant candidate (2613) (CandToMove), the first one (2614) for which the distortion difference between the redundant candidate, CandToMove, and this candidate, is larger than Lambda (threshold). The inserted position isertPos for the redundant candidate is set equal to the position of this second candidate i (2615).

This algorithm can be summarised as:
determining the minimum cost difference between 2 consecutive candidates.
If this minimum difference is smaller than Lambda, the consecutive candidate is considered as redundant
compare the distortion of the redundant candidate to the distortion of followed candidate in the list
identify position of the first followed candidate which has a distortion difference higher than lambda
set the redundant candidate at this identified position.

In an additional embodiment when the value of the maximum number of possible reorderings MaxNumReorder is greater than the maximum number of candidates in the final list, Maxcand (2612), the isertPos stays equal to MaxNumReorder−1.

Compared to the embodiment of FIG. 23, this embodiment improves the coding efficiency. Indeed, the distortion cost is not the real distortion compared to the original block, and the first reordering is often correct, so this limitation on position change for the candidate considered redundant is often correct.

This embodiment is particularly efficient for the regular merge mode, template matching merge mode and BM merge mode and when enabled for IBC merge mode.

Please note that the algorithm of this figure can be adapted. For example, one additional step can check if the number of Merge candidates in the list, NumMergeCandInList, is greater than 2 to apply the algorithm. To avoid applying the algorithm when it is sure that the candidates will not be reordered. Indeed, the algorithm can change the order of candidates only if the list contains more than 2 candidates. Additionally, the number of candidates considered in the algorithm can be the number of candidates which have been reordered by ARMC as the other candidates do not have associated distortion. In another possible implementation, the step 2602 may be changed to a "for" loop (instead of a "while" loop) from the maximum number of reorder candidates, NumMergeCandInList to 2 and the step 2611 can be removed. The algorithm stops when the minimum, min, is inferior to. All algorithms described can be based on a table associating the initial candidate position and its reordered position and one another containing the related cost of each candidate. In that case the swapping for the final list of reordered candidates can be made only at the end of the ARMC algorithm and the diversity reordering algorithm in order to avoid complex swapping.

FIG. 27 shows, in an embodiment, another possible implementation of a reordering algorithm after a first reordering based on distortion. In contrast to the algorithm of FIG. 23, it is not based on the minimum distortion difference but dedicated to identifying the non-redundant candidates.

For each candidate cand (2702) of the list (2701), the algorithm looks for the first followed candidate cand2 (2704) which is not redundant (2705) in the sense of the criterion defined in this invention. If no candidate is non-redundant, the next candidate is considered and the criterion applied to determine if the candidate is redundant or non-redundant. Otherwise, the first non-redundant candidate (2706) is inserted (2707) after the candidate (isertPos=cand+1). Of course the insertion implies the removal of this non-redundant candidate from its original position.

This algorithm can be summarised as:
For a candidate, determine the first, following, non-redundant candidate in the list
Insert this non-redundant candidate after the candidate
This embodiment is especially efficient for a list where the candidates are almost all redundant. So, for example, this embodiment is efficient for the MMVD merge, affine or regular, where the MVD residual positions are close. In the same way, this algorithm is particularly efficient for the MVD sign prediction for the same reason.

Figure 28:
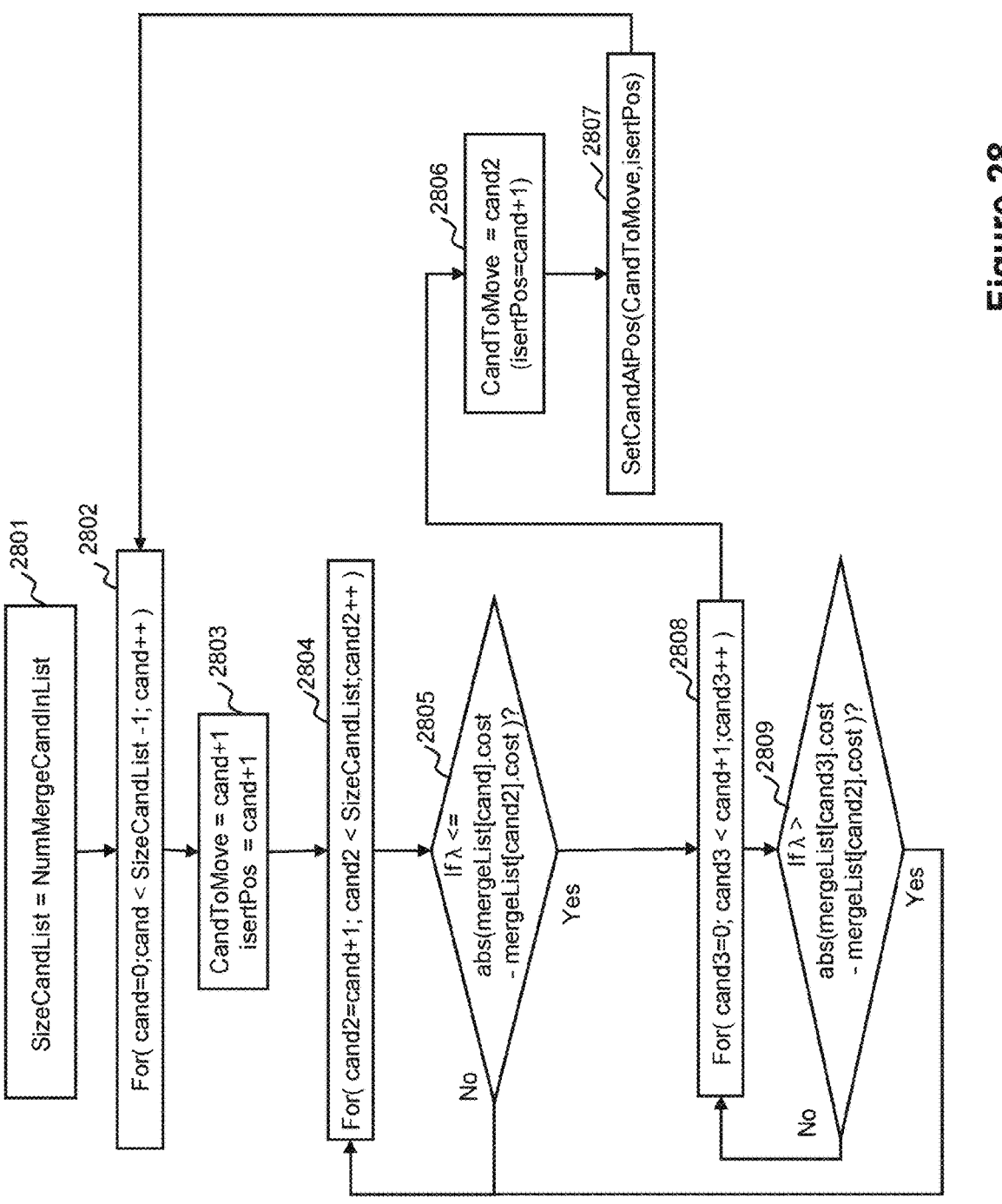
FIG. 28 illustrates one reordering process of predictors based on distortion values of an embodiment of the present invention.

FIG. 28 illustrates additional steps of FIG. 20. In this figure when a candidate is considered as non-redundant (2805), it also tested if this candidate is not redundant compared to all previous candidates (2808) of the current candidate (2809).

This algorithm can be summarised as:

For a candidate, determine the first, following, non-redundant candidate in the list Insert this non-redundant candidate after the candidate except if this non-redundant candidate is redundant compared to all previous candidates of the candidate.

As the previous embodiment this embodiment is especially efficient for list where the candidates are almost all redundant. So, for example, this embodiment is efficient for the MMVD merge, affine or regular, where the MVD residual positions are close. In the same way, this algorithm is particularly efficient for the MVD sign prediction for the same reason. Thanks to this further limitation of reordering the better coding efficiency is obtained compared to the previous one. Even if the algorithm of FIG. 26 gives better results than this embodiment for regular, TM, BM merge mode, this algorithm gives also significant gain for these modes.

In an alternative embodiment, SizeCandList is not set equal to the number of candidates NumMergeCandInList (2701) (2801) but it is set the Maxcand or alternatively to a smaller value. Indeed, when the list is significantly large compared to the number of candidates that have an index, the proposed reordering will set candidates which are not efficient. So, it is preferable to limit the possible reordering to a small number of values. For example, the Merge MMVD with ARMC, the list of MVD position for one candidate is 96 and the index to signal the MVD is only 12. So, in that case it is preferable to use MaxNumReorder set equal to 12. Please note that this restriction of Maxcand (2701) (2801) could be optional if the difference between NumMergeCandInList and Maxcand is not high.

Other Embodiments

The following features may be usefully combined with the embodiments described above to form other embodiments of the invention.

In an embodiment, when the list contains only 2 candidates, the proposed method is not applied. This is equivalent to setting the Th equal to 0. This produces a coding efficiency gain when using embodiment of FIG. 20 for example. Indeed, when there are only 2 candidates in the list of candidates it is preferable to set the candidate which has the best distortion as the first candidate.

For the other embodiments where the reordering is applied after a first ordering as for example for FIG. 23 when there are only 2 candidates, the criterion doesn't change anything.

In an embodiment, when only one template for the current block is available, the cost for all candidates of the list are set proportionally with respect to the cost of the available template.

For example, when the unavailable template is the left template the cost for the current block is cost=CostUp+ (CostUp×height)/width Where height and width correspond to the height and width of the block as here we consider that the up template is the up line above of the block and the left template is the left line on the left of the block. But longer or shorter templates can be considered with an adaptation of the formula. The multiplication and division can be replaced by shift operations to reduce the complexity.

The advantage of this embodiment is a coding efficiency improvement. Indeed, the lambda value is fixed for some Rate distortion compromises. Lambda is consequently adapted for this rate distortion compromise. With a distortion which corresponds to an equivalent number of samples for all blocks of the same size, a coding improvement is observed.

Alternatively, in that case the lambda can be modified instead of modifying each distortion cost. For the same example when the left template is unavailable the lambda or threshold becomes lambda=lambda/(1+ (height)/width). This computation can be modified to use only shift and not division for less complexity.

The advantage of this embodiment, compared to the previous one, is complexity reduction as in that case the new lambda is computed once instead of changing each distortion cost.

In the current ECM, the motion vector threshold, for the regular, TM and BM merge modes is different for each type of candidate. This creates a kind of diversity inside the sub set of candidates.

In one embodiment when the proposed invention is applied the MV threshold for derivation is the same for all merge candidate types. For example, the motion vector thresholds for the temporal and non-adjacent candidates are the same as the motion vector threshold for all other types of candidates.

This improves the coding efficiency as the diversity is created by the proposed method of the invention which is more efficient than the usage of different motion vector thresholds.

In the same way, the ARMC based on Merge types, as depicted in FIG. 19, gives some gains as there is a control of diversity based on merge types.

In one embodiment, when the method of the invention is enabled, the ARMC process is applied for all candidates derived and ordered with ARMC. For example, compared to FIG. 19, up to 9 temporal candidates and up to 22 (or 18 depending on the implementation) non-adjacent candidates are added to the list of the others Merge candidates (B1, A1, etc. . . . ). To use at least the same number of ARMC comparisons as the ARMC per merge types process, the initial list of candidates is not limited to the MaxCandForFirstList as defined but to MaxCandForFirstList+the number of temporal candidates and the number non-Adjacent candidates. Yet, this number can be limited to a maximum number that the buffer of Merge candidates can contain. For example, it can be fixed to 30.

One advantages of this embodiment is a coding efficiency increase, as it is preferable to control the diversity thanks to the method proposed in this invention. In addition, this embodiment reduces the complexity, as ARMC is not apply to the duplicate candidates in the temporal list or non-adjacent list.

In one embodiment, the number of temporal candidates and/or the number of non-Adjacent candidates is reduced. The advantage is complexity reduction of the cost computation for all these candidates.

The pairwise candidates when added after the ARMC process have shown a coding efficiency improvement. But, in competition with the ARMC process based on merge type the gain was significantly reduced as the number of possible candidates is significantly increased.

In one embodiment, when the proposed method is enabled, the pairwise candidates are added during or after the ordering process. Optionally, the pairwise candidates in that case are built based on the first candidate given by the ordering of ARMC and one or more other candidates of the list. Optionally, these added candidates are reordered compared to their cost and the cost of other candidates in the list thanks to the criterion proposed in this invention or a second reordering process is applied after this first reordering process.

The advantage is coding efficiency improvement. Indeed, the pairwise candidates are sometimes candidates too close to the existing candidates in the list. Consequently, with the ordering based on cost using ARMC, these candidates too redundant are in the top of the list without creating enough diversity. When the embodiments of the present invention are applied to the list, the list is more diverse and the pairwise candidates are ordered differently or removed when they are too redundant. Thus, coding efficiency gains can be obtained.

In one additional embodiment, when the pairwise are added after the reordered process of other traditional candidates, they are in an independent list. In that case a table contains the order of each candidate and one another contain the related cost. These tables are set during the ARMC process and the diversity reordering process. Then the final list is set based on candidates from both lists according to the order determined. The advantage is complexity reduction as the maximum size of the buffer can be reduced.

In one embodiment, the number of pairwise candidates is limited to a fixed value. For example, the value is 4.

The advantage of this embodiment is to limit the maximum number of candidates for which the ARMC process is applied.

In one embodiment, the maximum number of pairwise candidates which can be added is defined as the number of target candidates in the final list or to a fixed value. This maximum number of pairwise candidates is considered to limit the maximum number of candidates in the initial list (before ARMC process). So, in that case the NumMerge-CandInList is set equal NumMergeCandInList minus the maximum of number of pairwise candidates which can be added. An offset (positive or negative can be also added). It should be noted that it is not possible to know the real number of pairwise candidates which can be added as the pairwise are build after the first reordering.

The advantage of this embodiment is a complexity reduction and limitation. As the maximum number of candidates which have an ARMC cost computation is limited.

In one embodiment, the pairwise candidates are not added for some Modes. For example, the pairwise candidates are not added to the TM merge list.

The advantage is also a complexity reduction.

Predictive Coding Application(s)

Embodiments above have been described as implementations for predicting an image portion (prediction unit) in the context of video or image encoding and decoding. However, it is envisaged that the methods above are applicable to any compression technique where a predictor or predictor candidate may be used. For example, in point cloud coding, the predictors may be for points in the cloud or for elements of a mesh. Alternatively, the predictors could be for audio data portions where audio data to be encoded or decoded is predicted from another piece of audio data.

All the described embodiments can be combined unless explicitly stated otherwise. Indeed, many combinations are synergetic and may produce efficiency gains greater than a sum of their parts.

Reordering the First Candidate

For some particular list of predictors, ARMC is not applied for the one or more first candidates. As described previously, for example, ARMC is not applied for the subblock temporal predictor (STMVP) of the subblock merge list. The diversity criterion and the related algorithm can be adapted for these particular cases.

Figure 30:
FIG. 30 illustrates the ARMC reordering process for the subblock merge list.

In addition, ARMC is applied for several modes and these modes are then competing all together. ARMC set the most probable predictor at the beginning of each list. This most probable predictor can be considered to be a so-called "zeroth" predictor, as it is often desirable to exclude the predictor from reordering, such that the zeroth predictor is at a position at the beginning of the list both initially (as Cand0) and after any reordering process (as NewCand0, see FIG. 30). However, similar candidates are set at the beginning of each list which is not desirable in term of coding efficiency as there is not enough diversity between prediction modes.

Figure 31:
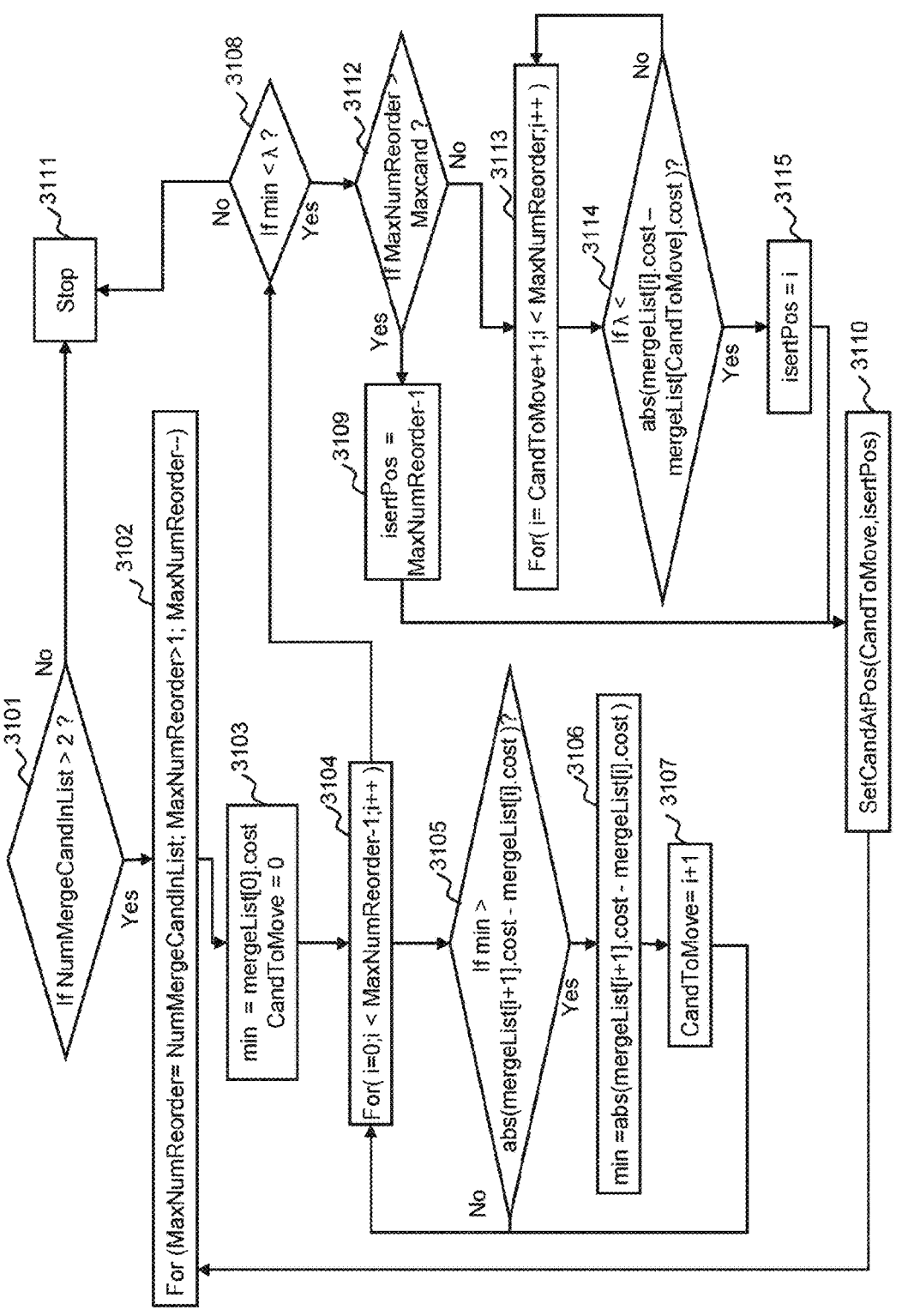
FIG. 31 illustrates one reordering process of predictors based on distortion values of an embodiment of the present invention.

In one embodiment, the reordering based on the diversity criterion is applied on the candidates which have a cost. For the example of the STMVP candidate which is not reordered and for which no cost is computed, it stays at the beginning of the list. In the same way, the candidate NewCand1 obtained after ARMC (as depicted in FIG. 31) stays at the second position of the list with the diversity criterion.

One alternative embodiment is to compute the cost of the STMVP candidate and to apply the diversity algorithm to all Subblock merge candidates. In that case the computation of the STMVP candidate can be conditional to the enabling of the diversity algorithm or to the threshold/Lambda value of the diversity criterion. If it is equal to zero the cost for STMVP is not computed.

In one embodiment, the cost of the candidate at the beginning of the list is not evaluated is set equal to 0 and the diversity algorithm uses this candidate as the zeroth candidate of the list. In the example of the STMVP candidate, the distortion cost is not computed for STMVP but the related value is set equal to 0 and the diversity algorithm is applied on all Subblock candidates in the list including this candidate. Of course, the diversity algorithm doesn't change the position of the STMVP candidate, but the position of the "first" candidate (although it takes a position subsequent to the zeroth candidate) NewCand1 of FIG. 31 can change. In this embodiment, when the first candidate is considered as to be reordered, it means that its cost is close to 0.

The advantage of this embodiment is a coding efficiency improvement compared to the previous embodiment. In this embodiment, the first candidate is considered as too redundant compared to its own cost and to the threshold value of the diversity criterion. Compared to the previous embodiment, this candidate can be move to another position.

One alternative of this embodiment, is to compute the cost of the STMVP candidate and set it at the beginning of the list whatever the computed cost. So ARMC algorithm doesn't consider this cost for the reordering. The diversity criterion may then be applied on all candidates of the list.

Compared to the previous embodiment, the diversity criterion can correctly evaluate the diversity between the zeroth candidate (i.e. the STMVP candidate) and its successors NewCand1. Please note, that in the diversity algorithm, the candidate at the second position of the list is not always the same depending on each loop.

So, the advantage of this embodiment is a coding efficiency improvement as the criterion is computed according to correct data.

Consider the Zeroth Candidate in the Reordering

In one embodiment, the diversity algorithm can reorder all candidates of the list or all candidates with a cost. For the candidate at the beginning of the list, as there is no previous candidate, and to consider it in the diversity algorithm, its cost is compared to the threshold value. If we consider that the threshold value is the lambda value and if we consider that D0 is the distortion of NewCand0, the diversity criterion become: $D0 < \lambda$.

FIG. 31 illustrates this embodiment, based on FIG. 26. In this figure only, the step 3103 is changed compared to step 2603. So, the minimum cost is initialized by the cost of the first candidate in the list and the variable CandToMove, representing the index of the candidate which could be moved is initialized by the value 0.

The advantage of this embodiment is a coding efficiency improvement as the candidate at the beginning of the list is also considered for the reordering.

In one additional embodiment, the possibility to reorder the zeroth candidate is restricted to some modes. For example, the possibility to reorder the zeroth candidate is limited to the BM merge mode or to the TM merge mode. Indeed, the TM and BM are more efficient when each other is not enabled. This means that these 2 modes produce similar block predictors as well as the regular merge mode. There are differences in term of candidates derivation to obtain a kind of diversity between set of candidates for these modes. But the proposed method gives better results as it produces a diversity between sets. Compared to FIG. 31, the step 3103 is applied only for the related mode otherwise the minimum value is set equal to MAX.

The advantage of this embodiment is a coding efficiency improvement thanks to the diversity created between candidates set.

In one embodiment, for the zeroth candidate in the list the threshold is different than the one used in the diversity algorithm of the other candidates.

In that case, the criterion is $D0 < \lambda_1$ for the zeroth candidate of the list and $|D_i - D_{(i+1)}| < \lambda_2$ for the other candidates. For the example of FIG. 31, the step 3108 is adapted to change the lambda value when CandToMove is equal to 0 or other cases as well as step 3114;

The advantage is a better setting of parameters as the possibility to reorder the zeroth candidate is different to the reordering of the other predictors.

In one embodiment the threshold for the zeroth candidate is inferior to the threshold of the diversity criterion.

Indeed, the moving or the removing of the zeroth candidate is limited compared to the other candidates.

All embodiments described previously related to the threshold value or lambda value (for example, methods of setting or calculating the threshold value or lambda value) can be applied to the above embodiments.

In one embodiment, the candidates can be moved or removed based on their cost values according to the criterion $D_i < \lambda$.

In one embodiment, all candidates which have a distortion is inferior to lambda are removed from the set of predictors.

For example, when the maximum number of predictors in the current list (MaxNumReorder) is superior to maximum number of predictors that the final list can contains (Maxcand), all predictors which have their cost inferior to lambda are removed from the list until that MaxNumReorder is set equal to Maxcand.

In one embodiment all candidates for which the distortion is inferior to lambda are moved to another position where the previous candidate has its cost distortion higher than the lambda value.

Figure 32:
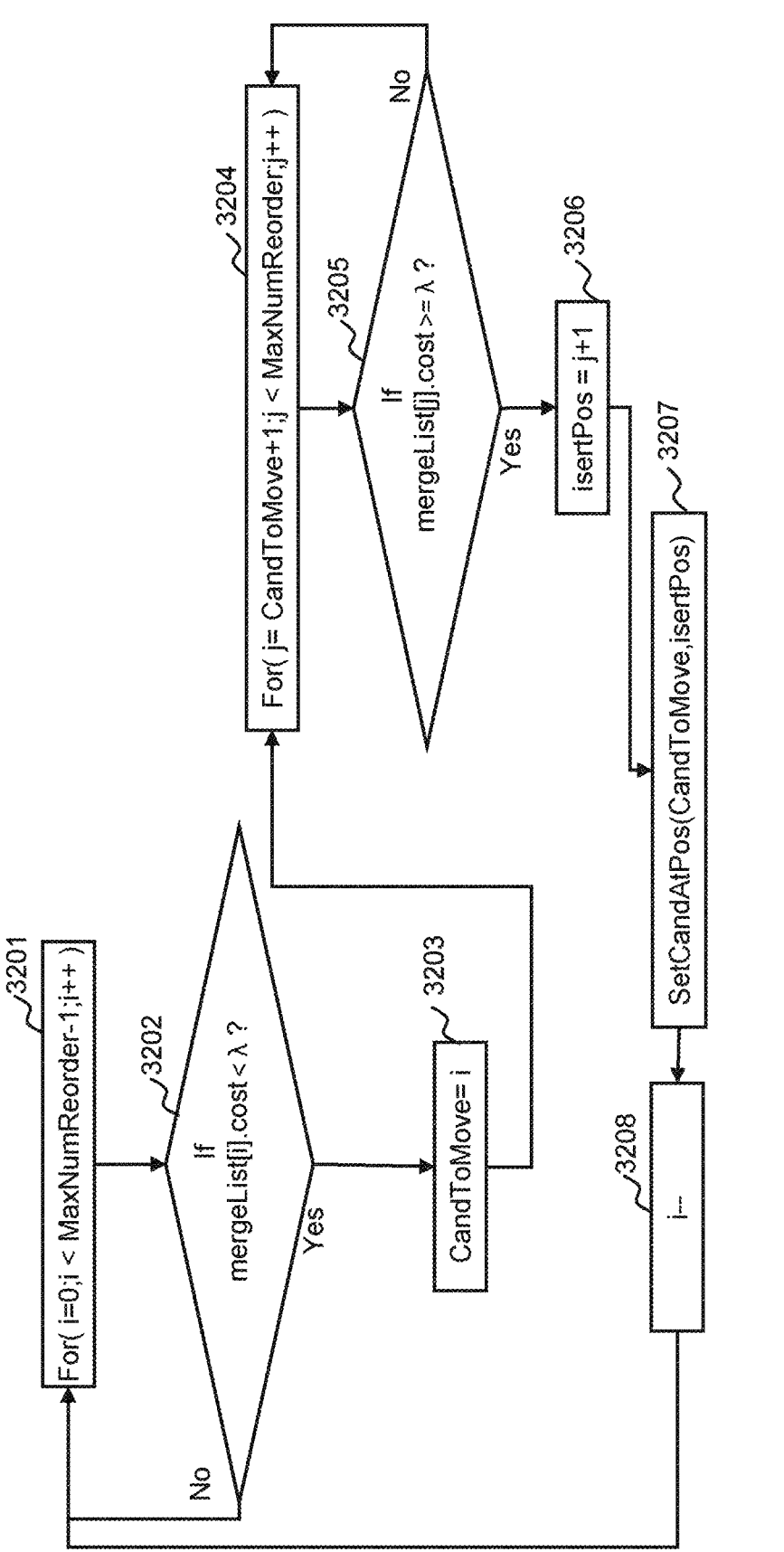
FIG. 32 illustrates one reordering process of predictors based on distortion values of an embodiment of the present invention.

FIG. 32 illustrates this embodiment. For each candidate (3201), it is tested if its cost is inferior to lambda (3202). If it is the case, this candidate (3203) is move to the first position where a candidate cost is superior or equal to the lambda 3205, and the current candidate (3203) is inserted in an immediately subsequent position (3207). Of course, this algorithm is applied only if it exists at least one candidate which has its cost value superior or equal to lambda.

In one alternative embodiment, the candidates which have their cost inferior to lambda are moved at the end of the list.

The advantage is that all candidates are considered according to the criterion and these candidates with a cost inferior to lambda are more penalized compared to the previous embodiment. This embodiment is more efficient when the number of predictors in the list of predictors is high.

In one additional embodiment, the proposed moving or removing is applied only for some modes. For example, the possibility to reorder the first candidate is limited to the BM merge mode or to the TM merge mode. Indeed, the TM and BM are more efficient when the other is not enabled as explained previously.

The advantage of this embodiment is a coding efficiency improvement thanks to the diversity created between candidates set.

Implementation of the Invention

Figure 33:
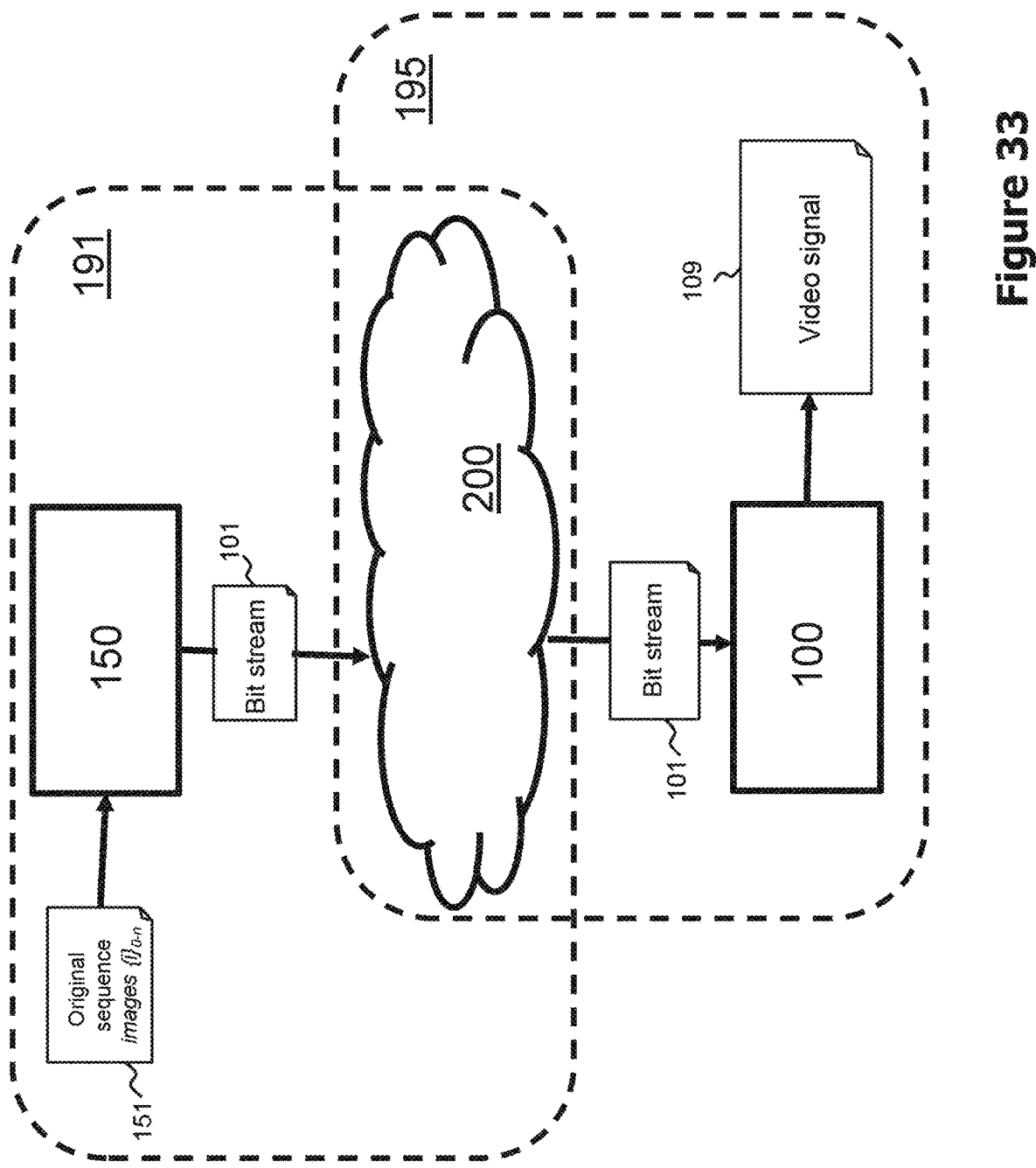
FIG. 33 is a diagram showing a system comprising an encoder or a decoder and a communication network according to embodiments of the present invention.

FIG. 33 shows a system 191 195 comprising at least one of an encoder 150 or a decoder 100 and a communication network 199 according to embodiments of the present invention. According to an embodiment, the system 195 is for processing and providing a content (for example, a video and audio content for displaying/outputting or streaming video/audio content) to a user, who has access to the decoder 100, for example through a user interface of a user terminal comprising the decoder 100 or a user terminal that is communicable with the decoder 100. Such a user terminal may be a computer, a mobile phone, a tablet or any other type of a device capable of providing/displaying the (provided/streamed) content to the user. The system 195 obtains/receives a bitstream 101 (in the form of a continuous stream or a signal—e.g. while earlier video/audio are being displayed/output) via the communication network 199. According to an embodiment, the system 191 is for processing a content and storing the processed content, for example a video and audio content processed for displaying/outputting/streaming at a later time. The system 191 obtains/receives a content comprising an original sequence of images 151, which is received and processed (including filtering with a deblocking filter according to the present invention) by the encoder 150, and the encoder 150 generates a bitstream 101 that is to be communicated to the decoder 100 via a communication network 191. The bitstream 101 is then communicated to the decoder 100 in a number of ways, for example it may be generated in advance by the encoder 150 and stored as data in a storage apparatus in the communication network 199 (e.g. on a server or a cloud storage) until a user requests the content (i.e. the bitstream data) from the storage apparatus, at which point the data is communicated/ streamed to the decoder 100 from the storage apparatus. The system 191 may also comprise a content providing apparatus for providing/streaming, to the user (e.g. by communicating data for a user interface to be displayed on a user terminal), content information for the content stored in the storage apparatus (e.g. the title of the content and other meta/storage location data for identifying, selecting and requesting the content), and for receiving and processing a user request for a content so that the requested content can be delivered/ streamed from the storage apparatus to the user terminal. Alternatively, the encoder 150 generates the bitstream 101 and communicates/streams it directly to the decoder 100 as and when the user requests the content. The decoder 100 then receives the bitstream 101 (or a signal) and performs filtering with a deblocking filter according to the invention to obtain/generate a video signal 109 and/or audio signal, which is then used by a user terminal to provide the requested content to the user.

Any step of the method/process according to the invention or functions described herein may be implemented in hardware, software, firmware, or any combination thereof. If implemented in software, the steps/functions may be stored on or transmitted over, as one or more instructions or code or program, or a computer-readable medium, and executed by one or more hardware-based processing unit such as a programmable computing machine, which may be a PC ("Personal Computer"), a DSP ("Digital Signal Processor"), a circuit, a circuitry, a processor and a memory, a general purpose microprocessor or a central processing unit, a microcontroller, an ASIC ("Application-Specific Integrated Circuit"), a field programmable logic arrays (FPGAs), or other equivalent integrated or discrete logic circuitry. Accordingly, the term "processor" as used herein may refer to any of the foregoing structure or any other structure suitable for implementation of the techniques describe herein.

Embodiments of the present invention can also be realized by wide variety of devices or apparatuses, including a wireless handset, an integrated circuit (IC) or a set of JCs (e.g. a chip set). Various components, modules, or units are described herein to illustrate functional aspects of devices/ apparatuses configured to perform those embodiments, but do not necessarily require realization by different hardware units. Rather, various modules/units may be combined in a codec hardware unit or provided by a collection of interoperative hardware units, including one or more processors in conjunction with suitable software/firmware.

Embodiments of the present invention can be realized by a computer of a system or apparatus that reads out and executes computer executable instructions (e.g., one or more programs) recorded on a storage medium to perform the modules/units/functions of one or more of the above-described embodiments and/or that includes one or more processing unit or circuits for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more processing unit or circuits to perform the functions of one or more of the above-described embodiments. The computer may include a network of separate computers or separate processing units to read out and execute the computer executable instructions. The computer executable instructions may be provided to the computer, for example, from a computer-readable medium such as a communication medium via a network or a tangible storage medium. The communication medium may be a signal/bitstream/carrier wave. The tangible storage medium is a "non-transitory computer-readable storage medium" which may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like. At least some of the steps/functions may also be implemented in hardware by a machine or a dedicated component, such as an FPGA ("Field-Programmable Gate Array") or an ASIC ("Application-Specific Integrated Circuit").

Figure 34:
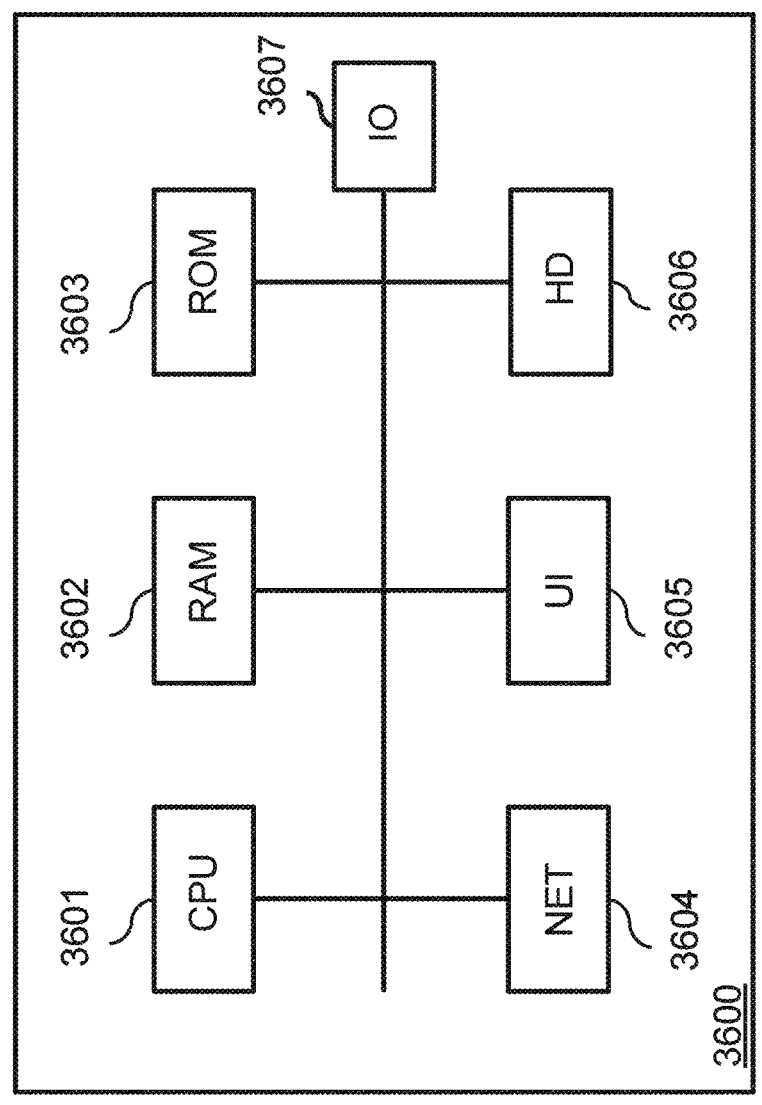
FIG. 34 is a schematic block diagram of a computing device for implementation of one or more embodiments of the invention.

FIG. 34 is a schematic block diagram of a computing device 3600 for implementation of one or more embodiments of the invention. The computing device 3600 may be a device such as a micro-computer, a workstation or a light portable device. The computing device 3600 comprises a communication bus connected to: —a central processing unit (CPU) 3601, such as a microprocessor; —a random access memory (RAM) 3602 for storing the executable code of the method of embodiments of the invention as well as the registers adapted to record variables and parameters necessary for implementing the method for encoding or decoding at least part of an image according to embodiments of the invention, the memory capacity thereof can be expanded by an optional RAM connected to an expansion port for example; —a read only memory (ROM) 3603 for storing computer programs for implementing embodiments of the invention; —a network interface (NET) 3604 is typically connected to a communication network over which digital data to be processed are transmitted or received. The network interface (NET) 3604 can be a single network interface, or composed of a set of different network interfaces (for instance wired and wireless interfaces, or different kinds of wired or wireless interfaces). Data packets are written to the network interface for transmission or are read from the network interface for reception under the control of the software application running in the CPU 3601; —a user interface (UI) 3605 may be used for receiving inputs from a user or to display information to a user; —a hard disk (HD) 3606 may be provided as a mass storage device; —an Input/Output module (IO) 3607 may be used for receiving/ sending data from/to external devices such as a video source or display. The executable code may be stored either in the ROM 3603, on the HD 3606 or on a removable digital medium such as, for example a disk. According to a variant, the executable code of the programs can be received by means of a communication network, via the NET 3604, in order to be stored in one of the storage means of the communication device 3600, such as the HD 3606, before being executed. The CPU 3601 is adapted to control and direct the execution of the instructions or portions of software code of the program or programs according to embodiments of the invention, which instructions are stored in one of the aforementioned storage means. After powering on, the CPU 3601 is capable of executing instructions from main RAM memory 3602 relating to a software application after those instructions have been loaded from the program ROM 3603 or the HD 3606, for example. Such a software application, when executed by the CPU 3601, causes the steps of the method according to the invention to be performed.

It is also understood that according to another embodiment of the present invention, a decoder according to an aforementioned embodiment is provided in a user terminal such as a computer, a mobile phone (a cellular phone), a table or any other type of a device (e.g. a display apparatus) capable of providing/displaying a content to a user. According to yet another embodiment, an encoder according to an aforementioned embodiment is provided in an image capturing apparatus which also comprises a camera, a video camera or a network camera (e.g. a closed-circuit television or video surveillance camera) which captures and provides the content for the encoder to encode. Two such examples are provided below with reference to FIGS. 37 and 38.

Figure 35:
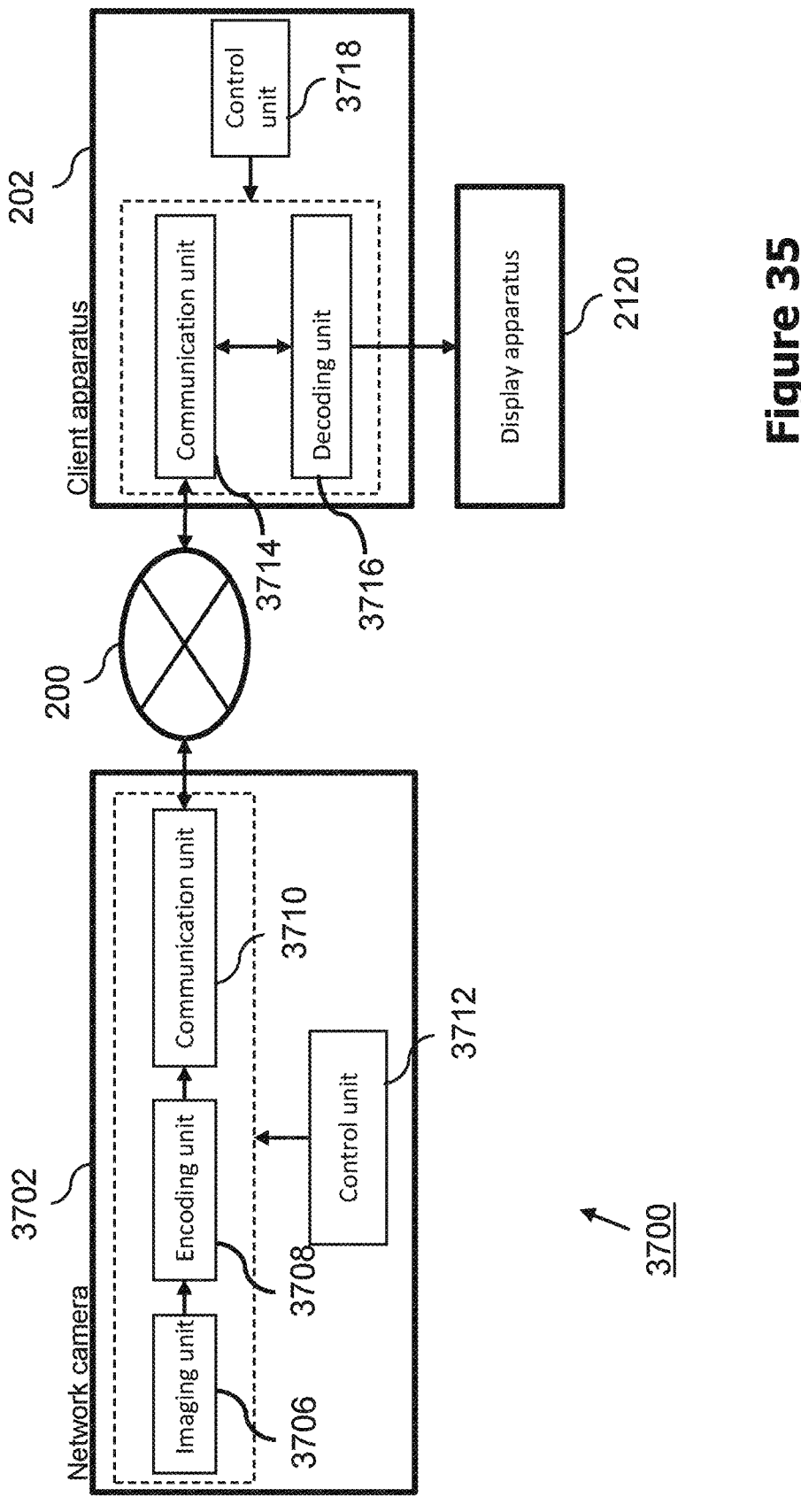
FIG. 35 is a diagram illustrating a network camera system.

FIG. 35 is a diagram illustrating a network camera system 3700 including a network camera 3702 and a client apparatus 202.

The network camera 3702 includes an imaging unit 3706, an encoding unit 3708, a communication unit 3710, and a control unit 3712.

The network camera 3702 and the client apparatus 202 are mutually connected to be able to communicate with each other via the network 200.

The imaging unit 3706 includes a lens and an image sensor (e.g., a charge coupled device (CCD) or a complementary metal oxide semiconductor (CMOS)), and captures an image of an object and generates image data based on the image. This image can be a still image or a video image.

The encoding unit 3708 encodes the image data by using said encoding methods explained above. or a combination of encoding methods described above.

The communication unit 3710 of the network camera 3702 transmits the encoded image data encoded by the encoding unit 3708 to the client apparatus 202.

Further, the communication unit 3710 receives commands from client apparatus 202. The commands include commands to set parameters for the encoding of the encoding unit 3708.

The control unit 3712 controls other units in the network camera 3702 in accordance with the commands received by the communication unit 3712.

The client apparatus 202 includes a communication unit 3714, a decoding unit 3716, and a control unit 3718.

The communication unit 3714 of the client apparatus 202 transmits the commands to the network camera 3702.

Further, the communication unit 3714 of the client apparatus 202 receives the encoded image data from the network camera 3712.

The decoding unit 3716 decodes the encoded image data by using said decoding methods explained above, or a combination of the decoding methods explained above.

The control unit 3718 of the client apparatus 202 controls other units in the client apparatus 202 in accordance with the user operation or commands received by the communication unit 3714.

The control unit 3718 of the client apparatus 202 controls a display apparatus 2120 so as to display an image decoded by the decoding unit 3716.

The control unit 3718 of the client apparatus 202 also controls a display apparatus 2120 so as to display GUI (Graphical User Interface) to designate values of the parameters for the network camera 3702 includes the parameters for the encoding of the encoding unit 3708.

The control unit 3718 of the client apparatus 202 also controls other units in the client apparatus 202 in accordance with user operation input to the GUI displayed by the display apparatus 2120.

The control unit 3718 of the client apparatus 202 controls the communication unit 3714 of the client apparatus 202 so as to transmit the commands to the network camera 3702 which designate values of the parameters for the network camera 3702, in accordance with the user operation input to the GUI displayed by the display apparatus 2120.

Figure 36:
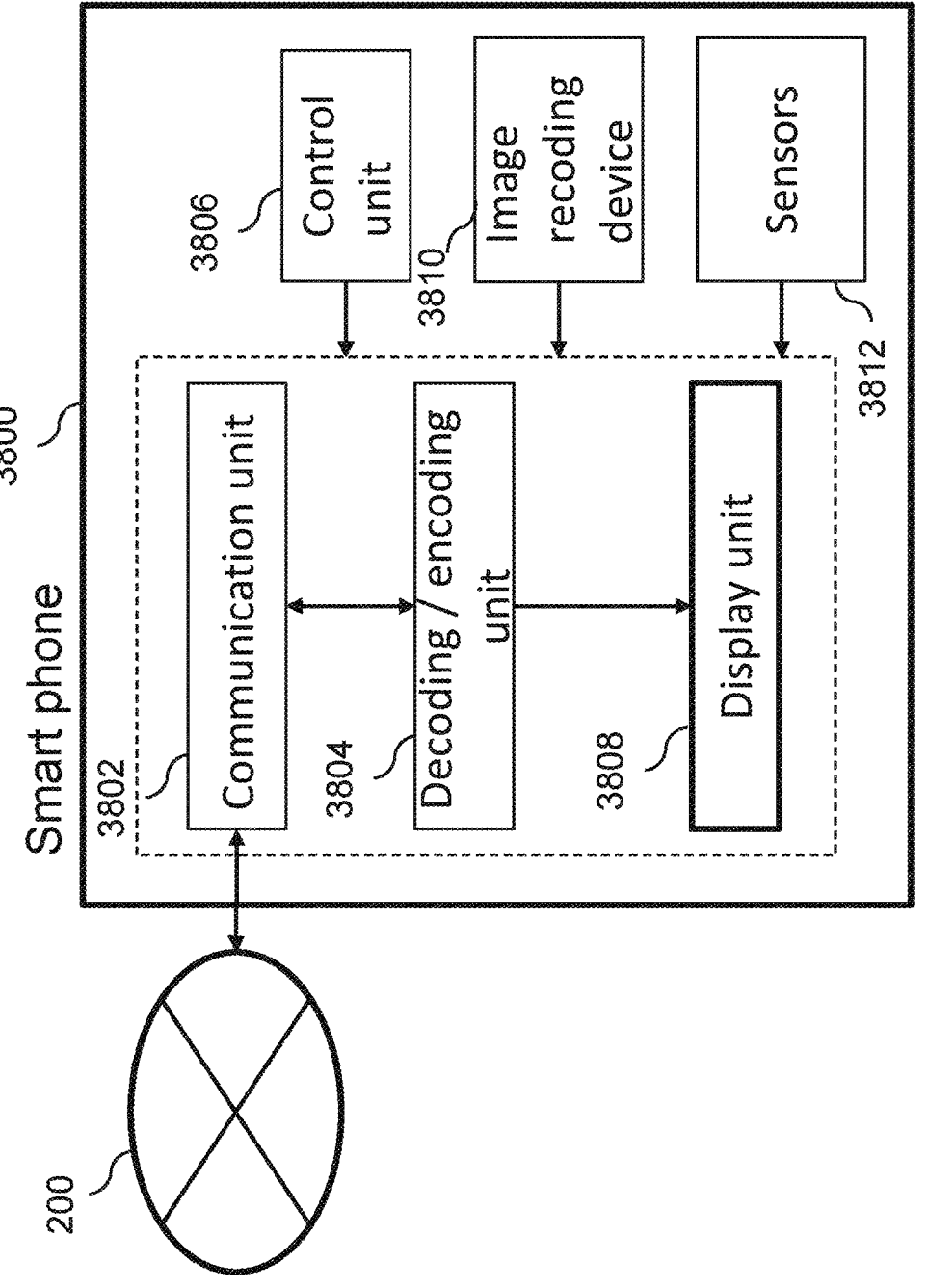
FIG. 36 is a diagram illustrating a smart phone.

FIG. 36 is a diagram illustrating a smart phone 3800.

The smart phone 3800 includes a communication unit 3802, a decoding unit 3804, a control unit 3806 and a display unit 3808.

the communication unit 3802 receives the encoded image data via network 200.

The decoding unit 3804 decodes the encoded image data received by the communication unit 3802.

The decoding/encoding unit 3804 decodes/encodes the encoded image data by using said decoding methods explained above.

The control unit 3806 controls other units in the smart phone 3800 in accordance with a user operation or commands received by the communication unit 3806.

For example, the control unit 3806 controls a display unit 3808 so as to display an image decoded by the decoding unit 3804. The smart phone 3800 may also comprise sensors 3812 and an image recording device 3810. In such a way, the smart phone 3800 may record images, encode the images (using a method described above).

The smart phone 3800 may subsequently decode the encoded images (using a method described above) and display them via the display unit 3808—or transmit the encoded images to another device via the communication unit 3802 and network 200.

Alternatives and Modifications

While the present invention has been described with reference to embodiments, it is to be understood that the invention is not limited to the disclosed embodiments. It will be appreciated by those skilled in the art that various changes and modification might be made without departing from the scope of the invention, as defined in the appended claims. All of the features disclosed in this specification (including any accompanying claims, abstract and drawings), and/or all of the steps of any method or process so disclosed, may be combined in any combination, except combinations where at least some of such features and/or steps are mutually exclusive. Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

It is also understood that any result of comparison, determination, assessment, selection, execution, performing, or consideration described above, for example a selection made during an encoding or filtering process, may be indicated in or determinable/inferable from data in a bitstream, for example a flag or data indicative of the result, so that the indicated or determined/inferred result can be used in the processing instead of actually performing the comparison, determination, assessment, selection, execution, performing, or consideration, for example during a decoding process.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

Reference numerals appearing in the claims are by way of illustration only and shall have no limiting effect on the scope of the claims.

The invention claimed is:

1. A method of decoding image data from a bitstream, the method comprises:

obtaining a list of predictors, the list of predictors having at least two predictors;

determining whether to modify the list of predictors based on a criterion using a first cost related to a first predictor in the list and a second cost related to a second predictor in the list; and modifying the list of predictors based on the determination, wherein the criterion is based on a threshold value, wherein if the criterion is met the second predictor is moved to the first position at which a difference in costs with respect to a subsequent predictor in the list is higher than the threshold value, and wherein when the maximum number of possible reorderings is greater than the maximum number of candidates permitted in a final list, the second predictor is moved to the end of the list, even if the criterion is met.

2. The method according to claim 1, wherein the determination comprises adding the threshold value to the first or second cost and the criterion relates to a comparison of the result with the one of the first cost and second cost to which the threshold value was not added.

3. The method according to claim 2, wherein the criterion is whether the result of adding the threshold value to the first cost is less than the second cost.

4. The method according to claim 1, wherein the criterion is whether a difference between the first cost and the second cost crosses the threshold value.

5. The method according to claim 4, wherein the difference is calculated as an absolute value and the criterion is whether it is less than the threshold value.

6. The method according to claim 1, wherein the modifying the list comprises removing the first predictor or second predictor from the list of predictors.

7. The method according to claim 1, wherein the modifying the list comprises changing a position of one or more predictors in the list.

8. The method according to claim 7, wherein changing the position of one or more predictors comprises moving the first predictor or second predictor to a different position in the list.

9. The method according to claim 1, wherein the first and second costs are based on a sub-set of neighboring samples or samples of the predictors.

10. The method according to claim 1, wherein the first and second costs are based on samples corresponding to another image from a different resolution.

11. The method according to claim 1, wherein the processing of the predictors is applied at least one of a Regular Merge mode, a template matching Merge mode a bi-lateral matching (BM) merge mode and an Intra Block Copy, IBC, mode.

12. The method according to claim 1, wherein the list of predictors is for predicting motion in an image portion.

13. The method according to claim 12, wherein the predictors in the list are any one of intra block predictor candidates and inter motion information predictor candidates.

14. A method of encoding image data into a bitstream, wherein the method comprises:

obtaining a list of predictors, the list of predictors having at least two predictors;

determining whether to modify the list of predictors based on a criterion using a first cost related to a first predictor in the list and a second cost related to a second predictor in the list; and modifying the list of predictors based on the determination, wherein the criterion is based on a threshold value, wherein if the criterion is met the second predictor is moved to the first position at which a difference in costs with respect to a subsequent predictor in the list is higher than the threshold value, and wherein when the maximum number of possible reorderings is greater than the maximum number of candidates permitted in a final list, the second predictor is moved to the end of the list, even if the criterion is met.

15. An apparatus for encoding image data into a bitstream, the apparatus comprising at least one processor configured to function as:

an obtaining unit which obtains a list of predictors, the list of predictors having at least two predictors;

a determiner which determines whether to modify the list of predictors based on a criterion using a first cost related to a first predictor in the list and a second cost related to a second predictor in the list;

a modifier which modifies the list of predictors based on the determination;

wherein the criterion is based on a threshold value, wherein if the criterion is met the second predictor is moved to the first position at which a difference in costs with respect to a subsequent predictor in the list is higher than the threshold value, and wherein when the maximum number of possible reorderings is greater than the maximum number of candidates permitted in a final list, the second predictor is moved to the end of the list, even if the criterion is met.

16. An apparatus for decoding image data from a bitstream, the apparatus comprising at least one processor to function as:

an obtaining unit which obtains a list of predictors, the list of predictors having at least two predictors;

a determiner which determines whether to modify the list of predictors based on a criterion using a first cost related to a first predictor in the list and a second cost related to a second predictor in the list;

a modifier which modifies the list of predictors based on the determination;

wherein the criterion is based on a threshold value, wherein if the criterion is met the second predictor is moved to the first position at which a difference in costs with respect to a subsequent predictor in the list is higher than the threshold value, and wherein when the maximum number of possible reorderings is greater than the maximum number of candidates permitted in a final list, the second predictor is moved to the end of the list, even if the criterion is met.

17. A non-transitory computer-readable storage medium carrying a computer program comprising program instructions adapted to perform, when executed in a computing device, a method of decoding image data from a bitstream, wherein the method comprises:

obtaining a list of predictors, the list of predictors having at least two predictors;

determining whether to modify the list of predictors based on a criterion using a first cost related to a first predictor in the list and a second cost related to a second predictor in the list;

modifying the list of predictors based on the determination, wherein the criterion is based on a threshold value, wherein if the criterion is met the second predictor is moved to the first position at which a difference in costs with respect to a subsequent predictor in the list is higher than the threshold value, and wherein when the maximum number of possible reorderings is greater than the maximum number of candidates permitted in a final list, the second predictor is moved to the end of the list, even if the criterion is met.

18. A non-transitory computer-readable storage medium carrying a computer program comprising program instructions adapted to perform, when executed in a computing device, a method of encoding image data into a bitstream, wherein the method comprises:

obtaining a list of predictors, the list of predictors having at least two predictors;

determining whether to modify the list of predictors based on a criterion using a first cost related to a first predictor in the list and a second cost related to a second predictor in the list;

modifying the list of predictors based on the determination, wherein the criterion is based on a threshold value, wherein if the criterion is met the second predictor is moved to the first position at which a difference in costs with respect to a subsequent predictor in the list is higher than the threshold value, and wherein when the maximum number of possible reorderings is greater than the maximum number of candidates permitted in a final list, the second predictor is moved to the end of the list, even if the criterion is met.

\* \* \* \* \*